(12) United States Patent
Shipman et al.

(10) Patent No.: US 10,807,667 B2
(45) Date of Patent: *Oct. 20, 2020

(54) ADJUSTABLE SEATPOST

(71) Applicant: SRAM, LLC, Chicago, IL (US)

(72) Inventors: Christopher Shipman, Chicago, IL (US); Brian Jordan, Highland Park, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,665

(22) Filed: Jun. 6, 2019

(65) Prior Publication Data

US 2019/0283827 A1 Sep. 19, 2019

Related U.S. Application Data

(63) Continuation of application No. 15/399,105, filed on Jan. 5, 2017, now Pat. No. 10,358,180.

(51) Int. Cl.
*B62J 1/08* (2006.01)
*B62K 19/36* (2006.01)
*B62J 43/00* (2020.01)

(52) U.S. Cl.
CPC .............. *B62J 1/08* (2013.01); *B62K 19/36* (2013.01); *B62J 43/00* (2020.02); *B62J 2001/085* (2013.01)

(58) Field of Classification Search
CPC ........ B62J 1/08; B62J 2001/085; B62K 19/36
See application file for complete search history.

(56) References Cited

U.S. PATENT DOCUMENTS

| | | | | |
|---|---|---|---|---|
| 8,136,877 B2* | 3/2012 | Walsh | ........................ | B62J 1/06 297/215.13 |
| 8,308,124 B2* | 11/2012 | Hsu | ............................ | B62J 1/08 248/161 |
| 8,317,261 B2* | 11/2012 | Walsh | .................... | B62K 19/36 297/215.13 |
| 8,398,104 B2* | 3/2013 | Hsu | ............................ | B62J 1/08 267/117 |
| 8,826,935 B2* | 9/2014 | Nakada | ..................... | G01F 1/00 137/486 |
| 9,073,592 B2* | 7/2015 | Hsu | ............................ | B62J 1/08 |
| 9,126,647 B2* | 9/2015 | Kuo | ............................ | B62J 1/08 |
| 9,616,954 B2* | 4/2017 | McPherson | ................ | B62J 1/10 |
| 9,650,084 B2* | 5/2017 | Ting | ...................... | C08L 53/025 |
| 10,106,216 B2* | 10/2018 | Shirai | ......................... | B62J 1/08 |
| 10,246,155 B2* | 4/2019 | McAndrews | .......... | B62K 25/08 |
| 2013/0221713 A1* | 8/2013 | Pelot | ......................... | B62J 1/02 297/215.13 |

* cited by examiner

*Primary Examiner* — Tony H Winner

(57) ABSTRACT

A seat post assembly for a bicycle has a first tube with a first distal end and a second tube with a second distal end. The first and second tubes are movable relative to one another to establish a distance between the first and second distal ends. A first pressure chamber has a loaded pressure proportional to a load applied along the tube axis. A second pressure chamber has a second pressure not proportional to the load. A flow path connects the first and second pressure chambers. A valve is disposed along the flow path and is configured to move between a closed position closing the flow path and an open position opening the flow path between the first and second pressure chambers. An isolator of the valve is configured to nullify any resultant force produced by the loaded pressure of the first pressure chamber acting on the isolator.

14 Claims, 40 Drawing Sheets

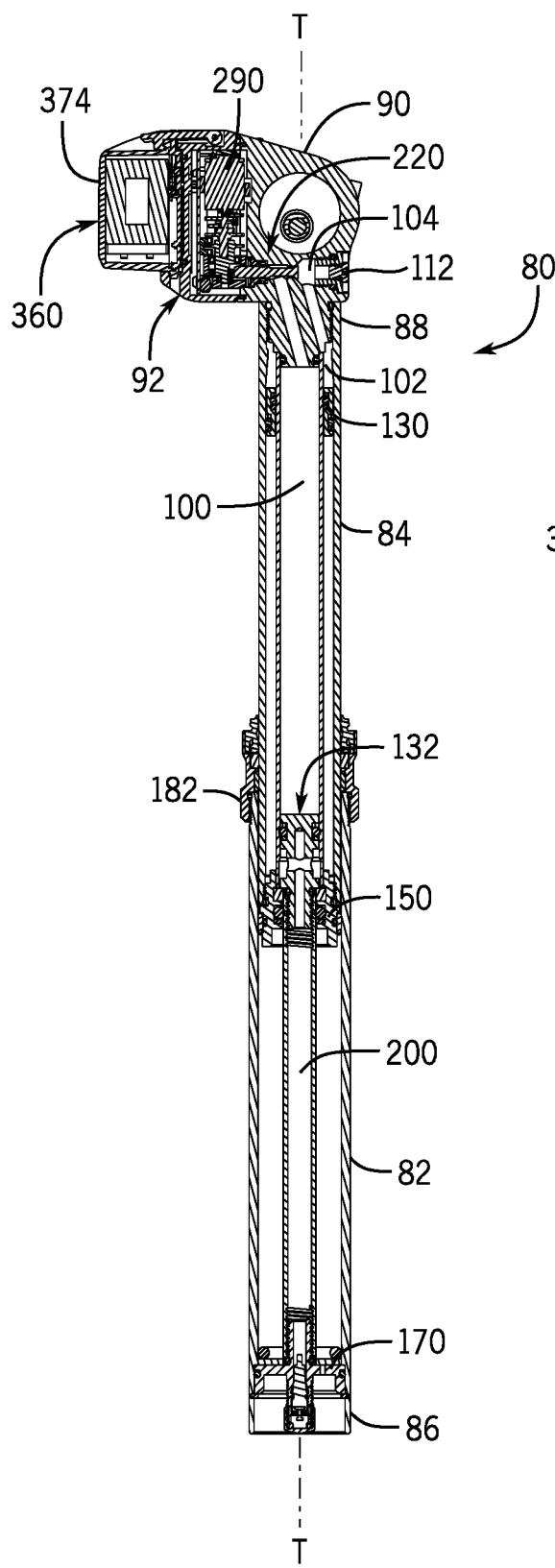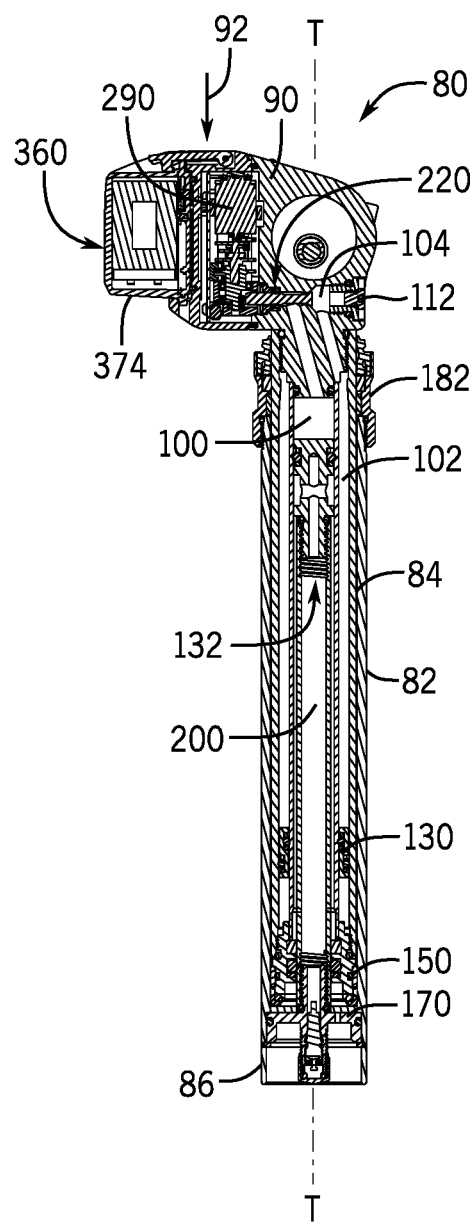
FIG. 4A
FIG. 4B

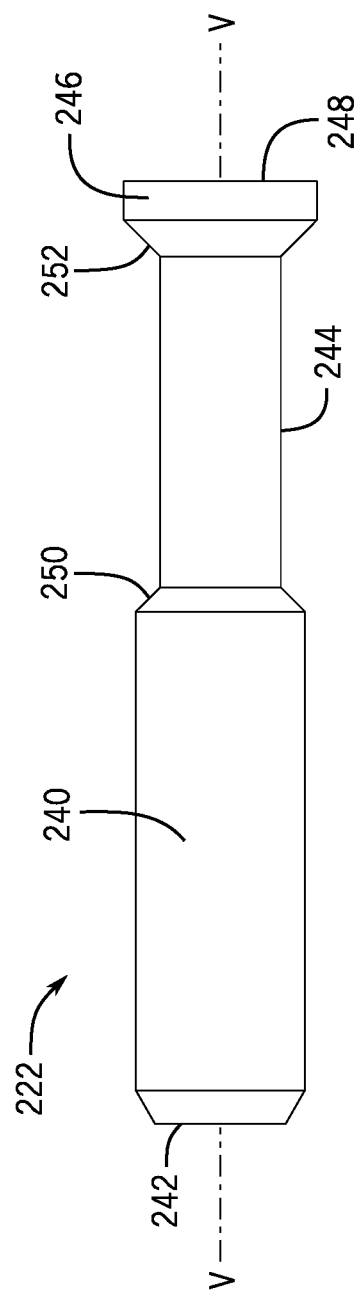

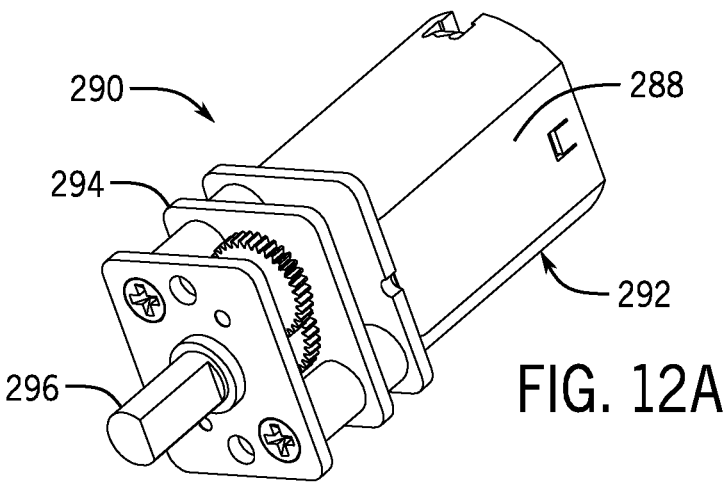
FIG. 12A
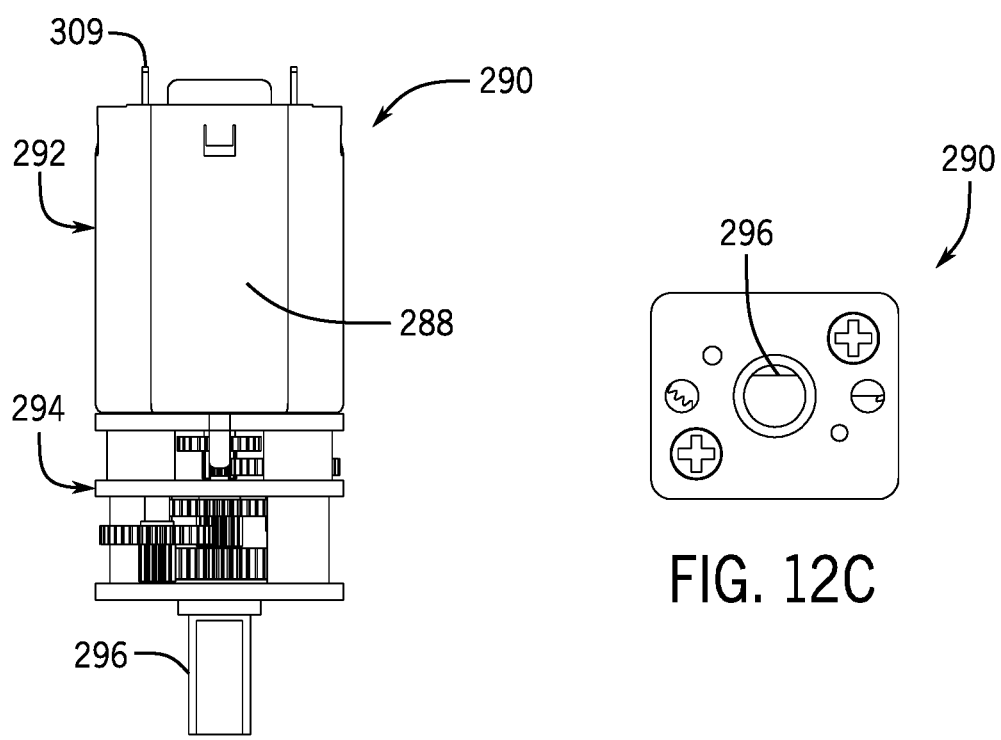
FIG. 12B
FIG. 12C

ADJUSTABLE SEATPOST

This application is a continuation of U.S. patent application Ser. No. 15/399,105, filed Jan. 5, 2017, now issued as U.S. Pat. No. 10,358,180, the contents of which are herein included by reference in their entirety.

BACKGROUND

Field of the Disclosure

The present application generally relates to seats for bicycles, and more particularly to an adjustable seat post assembly for a bicycle seat.

Description of Related Art

Bicycles are known to have a seat or saddle to support a rider in a seated position. The position of the saddle on most bicycles is also adjustable in some manner. The saddle may be adjustable so that a given bicycle can be configured to accommodate different riders of various sizes. The saddle may also be adjustable to allow a given rider to set or reset the saddle position on a specific bicycle to accommodate different riding conditions.

In one example, a bicycle may have a height adjustable seat post assembly. Thus, the height of the saddle may be selectively adjusted relative to a frame of the bicycle. The typical bicycle has a saddle mounted to a post that is mechanically clamped to a tube of the bicycle frame. When the clamp is released, the saddle and post can be slid up and down to adjust the height of the saddle. However, on more recent higher end bicycles, the seat post may be height adjustable while riding the bicycle by employing some type of hydraulic assist mechanism. For example, the assignee of the present disclosure has developed a line of manually actuated hydraulic height adjustable or "dropper" seat posts. These products are known as RockShox® Reverb™ and Reverb Stealth™ by SRAM LLC. The RockShox® seat posts use a hydraulic pressure differential within the post and require manual operation to adjust the seat post height.

Others have also developed different versions of dropper-type posts. Some product may use ANT+ wireless communication technology allowing the rider to wirelessly adjust the saddle height. Currently available products have a very slow reaction time due at least partially to the design of their internal fluid flow components. The batteries are also not very robust and require frequent recharging, partly because of the relatively large force required to open and close a valve of the flow components.

Further, some bicycle seat posts are also known that include mechanisms at the top of the seat post that allow for adjusting the fore-aft position and/or the tilt angle of the saddle or seat to be adjustable. Bicycle saddle clamps that use a single transverse bolt to clamp a bicycle saddle to the seat post are known in the industry. However, these types of clamps also typically rely on friction to hold the saddle in the selected position. Thus, this type of design is known for the saddle being able to slip under heavy loads, resulting in a loss of the selected or desired saddle position.

SUMMARY

In one example, according to the teachings of the present disclosure, a seat post assembly for a bicycle includes a first tube having a first distal end and a second tube having a second distal end. The first tube and second tube are movable relative to one another to establish a distance between the first distal end and the second distal end along a tube axis. A first pressure chamber has a loaded pressure proportional to a load applied along the tube axis. A second pressure chamber has a second pressure that is not proportional to the load. A flow path connects the first pressure chamber and the second pressure chamber. A valve has an isolator disposed along the flow path and configured to move between a closed position closing the flow path and an open position opening the flow path between the first pressure chamber and the second pressure chamber. The isolator is configured to nullify any resultant force produced by the loaded pressure of the first pressure chamber acting on the isolator.

In one example, the isolator can move between the closed position and the open position along an isolation axis.

In one example, the second pressure can be a preset pressure. An isolation force may be produced by the preset pressure in the second pressure chamber whereby the isolation force can act on a distal end of the isolator.

In one example, the isolator, in the closed position, can bias against a valve seat by an isolation force, which can be produced by a preset pressure in the second pressure chamber acting on the isolator.

In one example, a loaded force that may be produced by the loaded pressure in the first pressure chamber can act on an intermediate portion of the isolator.

In one example, an intermediate portion of the isolator can include opposing surface areas in a direction along an axis of the isolator.

In one example, a loaded force that may be produced by the loaded pressure in the first pressure chamber can act on the isolator such that the loaded force can be balanced along an isolation axis.

In one example, a loaded force can be produced by the loaded pressure in the first pressure chamber whereby the loaded force can be balanced through opposing surface areas on the isolator along an isolation axis.

In one example, an actuation axis of the isolator can be non-parallel to the tube axis.

In one example, the actuation axis can be perpendicular to the tube axis.

In one example, an actuation force may be required to actuate the valve under a larger load applied to the second distal end of the second tube. The actuation force can be less than the actuation force required to actuate the valve under a smaller load that is applied to the second distal end of the second tube.

In one example, in the closed position, the isolator can be biased closed by a fluid closing force acting on the isolator and produced by the second pressure. The fluid closing force can be greater than a fluid opening force acting on the isolator and produced by the loaded pressure, whereby the distance between the first and second distal ends is maintained. In the open position, the isolator can be opened against the fluid closing force by a combination of the fluid opening force and an actuation force that acts on the isolator whereby fluid can be exchanged between the first and second pressure chambers via the flow path and whereby the distance between the first and second distal ends can be adjusted.

In one example, the first tube can have an inner diameter and the second tube have an outer diameter that is smaller than the inner diameter so that the second tube is telescopically slidable along the tube axis to extend and retract the second tube relative to the first tube to adjust the distance between the second distal end and the first distal end.

In one example, the seat post assembly can include a first fluid reservoir including the first pressure chamber, the second chamber, and the flow path.

In one example, the isolator can be configured having opposing surfaces such that a fluid opening force acting on one surface of the opposing surfaces is balanced by a fluid closing force acting on another surface of the opposing surfaces that opposes the one surface. The fluid opening and closing forces can act along an isolation axis of the isolator.

In one example, according to the teachings of the present disclosure, a seat post for a bicycle includes a first tube having a first distal end and a second tube having a second distal end. The first tube and second tube are movable relative to one another along a tube axis to establish a height of an attachment portion of a seat post for attaching a bicycle seat. The attachment portion is carried on the second distal end. A battery pack includes a battery and a battery housing. The battery housing is configured for removable attachment to the attachment portion and configured to provide power to operate a height adjustment system of the seat post.

In one example, the height adjustment system includes a valve, which can be operable between an open position and a closed position, respectively, to selectively permit and prevent adjustment of the height of the seat post.

In one example, the height adjustment system can include a wireless actuator, which can be positioned remote from the valve and the battery pack. The wireless actuator can be operable to selectively operate the valve.

In one example, the height adjustment system can include a bleed orifice that can selectively open to a fluid pressure chamber.

In one example, the height adjustment system can include a motor, which can be operably coupled with the battery pack and which can be disposed a first radial distance from a tube axis of the seat post. The first radial distance can be greater than a second radial distance from the tube axis to an outer wall of the second tube of the seat post.

In one example, the height adjustment system can include a valve, which can include an isolator disposed along a flow path and can be configured to move between a closed state closing the flow path and an open state opening the flow path between a loaded pressure chamber and a preset pressure chamber. The system can also include a driver, which can have an eccentric bearing surface configured to contact a distal end of the isolator to actuate the valve.

In one example, the height adjustment system can include a valve driver that can have a bearing attached to an eccentric bearing surface. The bearing can have an inner race in contact with the eccentric bearing surface and an outer race that contacts the isolator.

In one example, the height adjustment system can include a valve driver that can have a bearing attached to an eccentric bearing surface. The bearing can be a ball bearing and can have an inner race in contact with the eccentric bearing surface and an outer race that contacts the isolator.

In one example, the height adjustment system can include a wireless actuator positioned remote from a valve, a motor, and a printed circuit board, which can be configured to operate the motor in response to signals received from the wireless actuator.

In one example, the height adjustment system can include a motor, which can be positioned at the second distal end of the second tube.

In one example, the height adjustment system can include a motor, which can be carried on or in the attachment portion.

BRIEF DESCRIPTION OF THE DRAWINGS

Objects, features, and advantages of the present invention will become apparent upon reading the following description in conjunction with the drawing figures, in which:

FIG. 4A shows a vertical cross-section view of the seat post assembly of FIG. 3A.

FIG. 4B shows a vertical cross-section view of the seat post assembly of FIG. 3B.

FIG. 8 shows a valve body or poppet of the valve assembly depicted in FIGS. 7A and 7B.

FIGS. 12A-C show various views of a gearmotor of the electronics module depicted in FIGS. 7A and 7B.

DETAILED DESCRIPTION OF THE DISCLOSURE

The disclosed seat post assembly solves or improves upon the above-noted and/or other problems and disadvantages with existing and prior known seat post assemblies. The disclosed seat post assembly provides a seat post that is electrically adjustable in height. The disclosed seat post assembly includes an electronics module that is carried under the seat or saddle. The disclosed seat post assembly includes an easily accessible and replaceable power supply, such as a battery or battery pack, also under the saddle. The disclosed seat post assembly is configured so that only minimal energy and/or force is required to open and close a valve of the assembly, thus reducing the energy and/or force required to adjust the saddle height. Both the valve opening and closing force and the battery load required to operate the assembly are significantly reduced.

The disclosed seat post assembly also solves or improves upon the problem of being able to hold a selected saddle tilt angle. The disclosed seat post assembly includes the addition of structural elements that positively hold the seat or saddle clamp in position to prevent it from slipping. The disclosed seat post assembly also has the additional benefit of providing a convenient mechanism and procedure for a user to fine-adjust the fore-aft and angular position or tilt angle of the saddle during installation. These and other objects, features, and advantages of the present disclosure will become apparent to those having ordinary skill in the art upon reading this disclosure.

Figure 1:
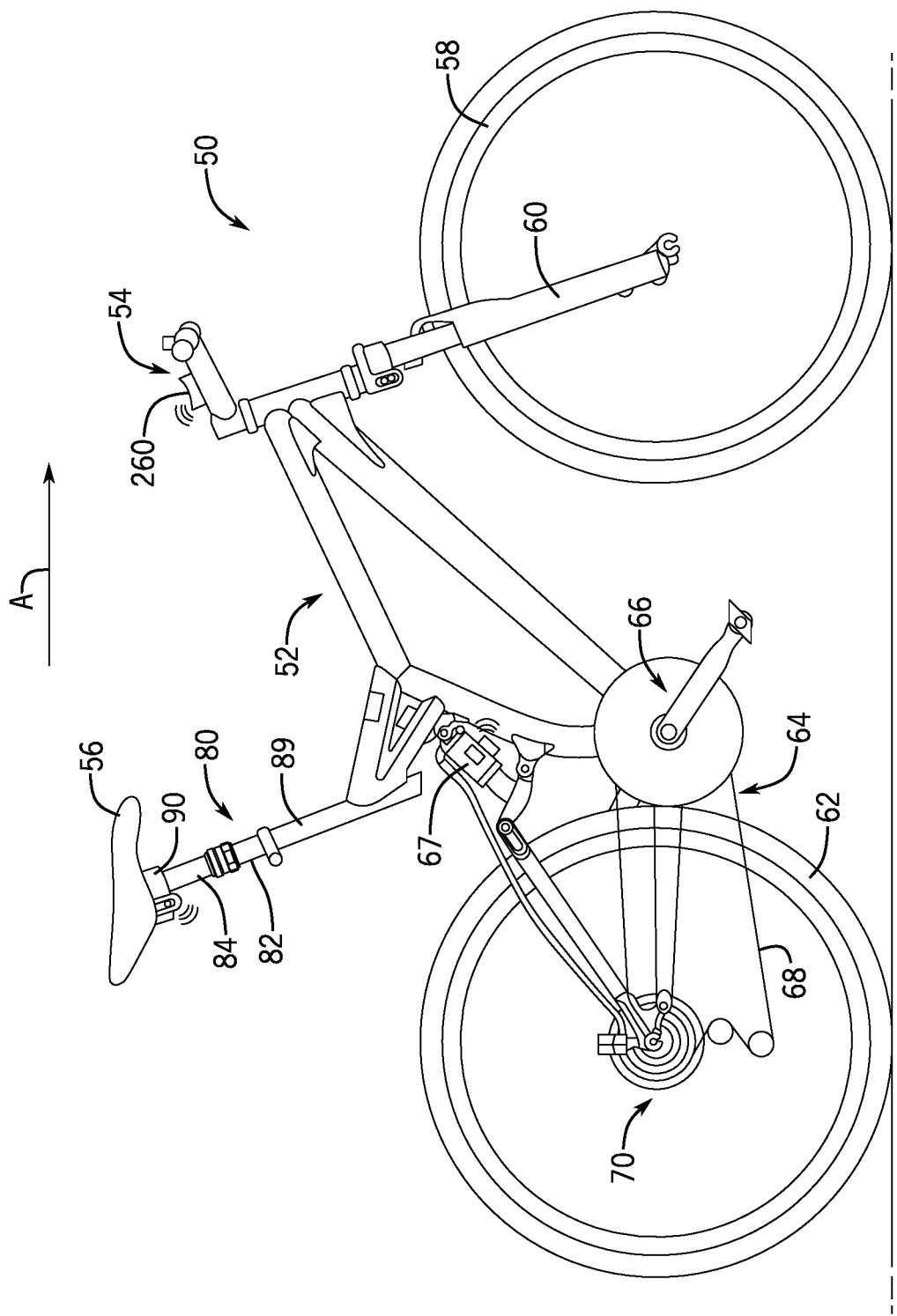
FIG. 1 shows a side view of one example of a bicycle, which may be fitted with a seat post assembly constructed in accordance with the teachings of this disclosure.

Turning now to the drawings, FIG. 1 illustrates one example of a human powered vehicle on which the disclosed seat post assembly may be implemented. In this example, the vehicle is one possible type of bicycle 50, such as a mountain bicycle. The bicycle 50 has a frame 52, handlebars 54 near a front end of the frame, and a seat or saddle 56 for supporting a rider over a top of the frame. The bicycle 50 also has a first or front wheel 58 carried by a front fork 60 of the frame 52 and supporting the front end of the frame. The bicycle 50 also has a second or rear wheel 62 supporting a rear end of the frame 52. The rear end of the frame 52 may be supported by a rear suspension component 67. The bicycle 50 also has a drive train 64 with a crank assembly 66 that is operatively coupled via a chain 68 to a rear cassette 70 near a rotation axis of the rear wheel 62. In this example, the saddle 56 is supported on a seat post assembly 80 constructed in accordance with the teachings of the present disclosure.

While the bicycle 50 depicted in FIG. 1 is a mountain bicycle, the seat post assembly 80, including the specific embodiments and examples disclosed herein as well as alternative embodiments and examples, may be implemented on other types of bicycles. For example, the disclosed seat post assembly 80 may be used on road bicycles, as well as bicycles with mechanical (e.g., cable, hydraulic, pneumatic, etc.) and non-mechanical (e.g., wired, wireless) drive systems. The disclosed seat post assembly 80 may also be implemented on other types of two-, three-, and four-wheeled human powered vehicles as well.

Figure 2:
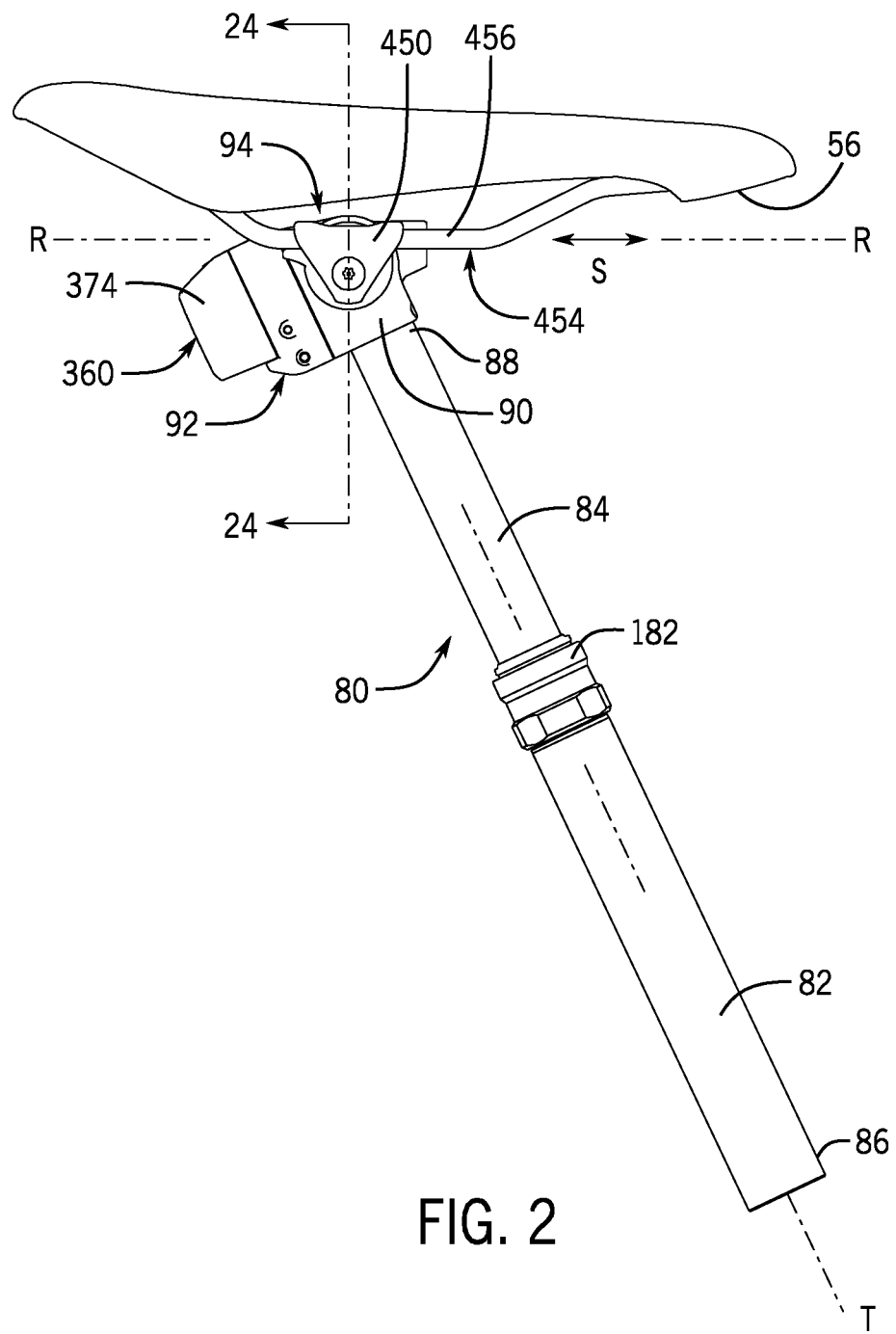
FIG. 2 shows a side view of a seat post assembly, with a saddle installed thereon, and constructed in accordance with the teachings of this disclosure.
Figure 3A:
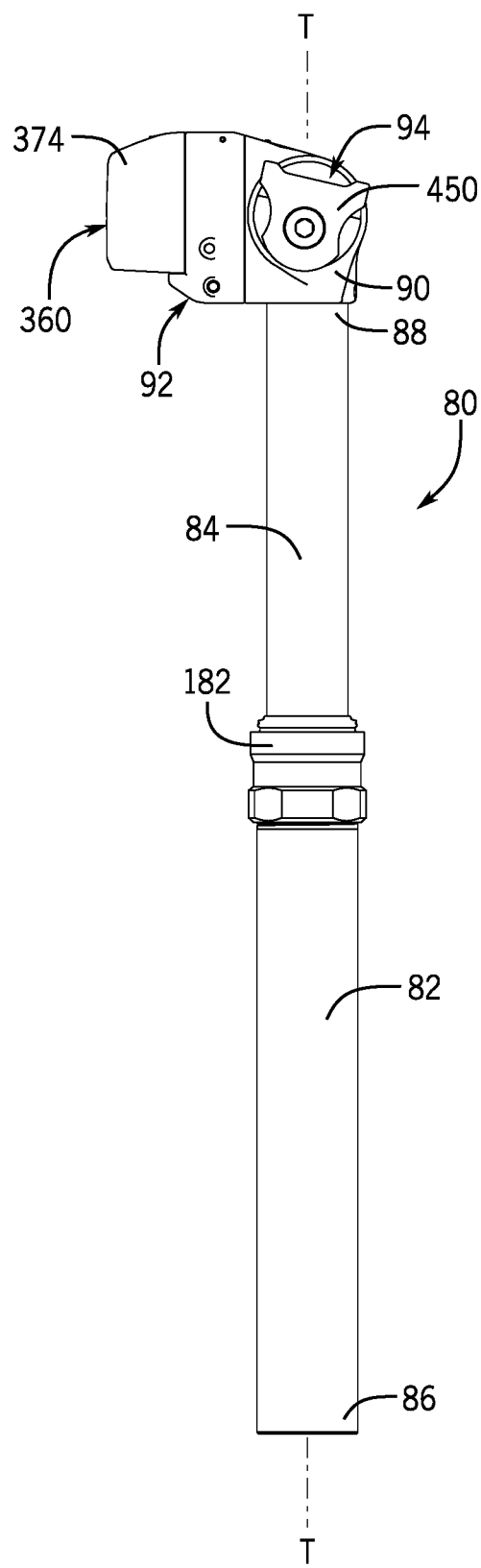
FIG. 3A shows the seat post assembly of FIG. 2 in a fully raised or extended position.
Figure 3B:
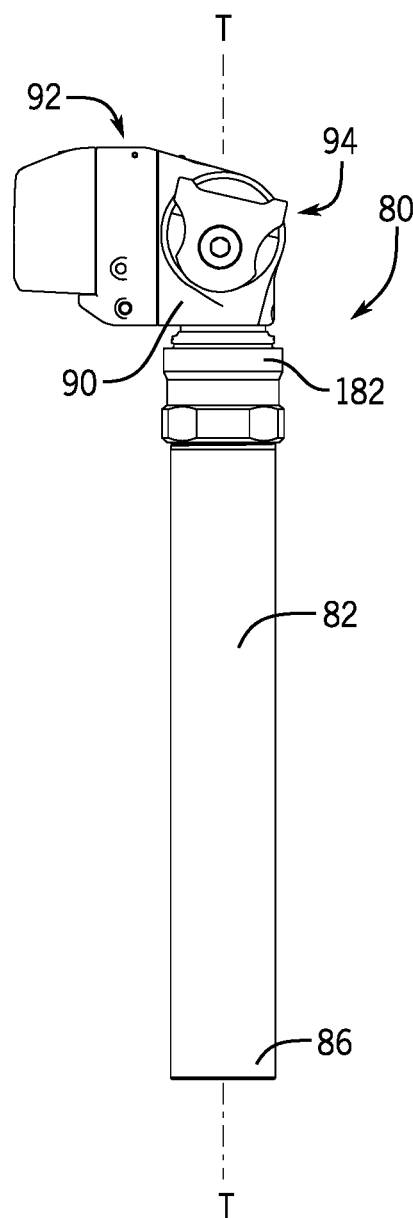
FIG. 3B shows the seat post assembly of FIG. 2 in a fully lowered or dropped position.

With that in mind and referring to FIG. 2, the saddle 56 is attached to and carried on the top of the seat post assembly 80. Referring to FIGS. 2, 3A, and 3B, the disclosed seat post assembly 80 has a first or lower post segment, i.e., a lower tube 82 and a second or upper post segment, i.e., an upper tube 84. The two tubes 82, 84 are movable relative to one another to establish a height of the saddle 56 relative to the frame 52. In this example, the lower tube 82 has a first distal end 86 defining a lower end of the seat post assembly. The upper tube 84 has a second or upper distal end 88 defining an upper end of the seat post assembly 80. In one example, the lower distal end 86 may be received in and clamped or otherwise secured in a frame tube 89 (see FIG. 1) of the frame 52 in a conventional manner. Thus, the lower tube 82 may be fixed relative to the frame 52 during use and the upper tube 84 may be slidably and telescopically received in the lower tube 82. The upper tube 84 can be slid telescopically along a tube axis T relative to the lower tube 82 to establish a distance between the second distal end 88 and first distal end 86, respectively. FIG. 3A illustrates the upper tube 84.

Also, as shown in FIGS. 2, 3A, and 3B, a head 90 is fixed to the top of the seat post assembly, i.e., to the second distal end 88 of the upper tube 84. In the disclosed example, the head 90 provides three distinct functions. First, the head 90 is configured to include an electronics module 92, which provides important functions for the seat height adjustment feature of the disclosed seat post assembly 80, as described below. Second, the saddle 56 is mounted to and carried on the head 90 to attach the saddle to the seat post assembly 80. Third, the head 90 is configured to provide a saddle clamp mechanism 94, which provides the saddle fore-aft and tilt adjustment features, also as described below.

Figure 5A:
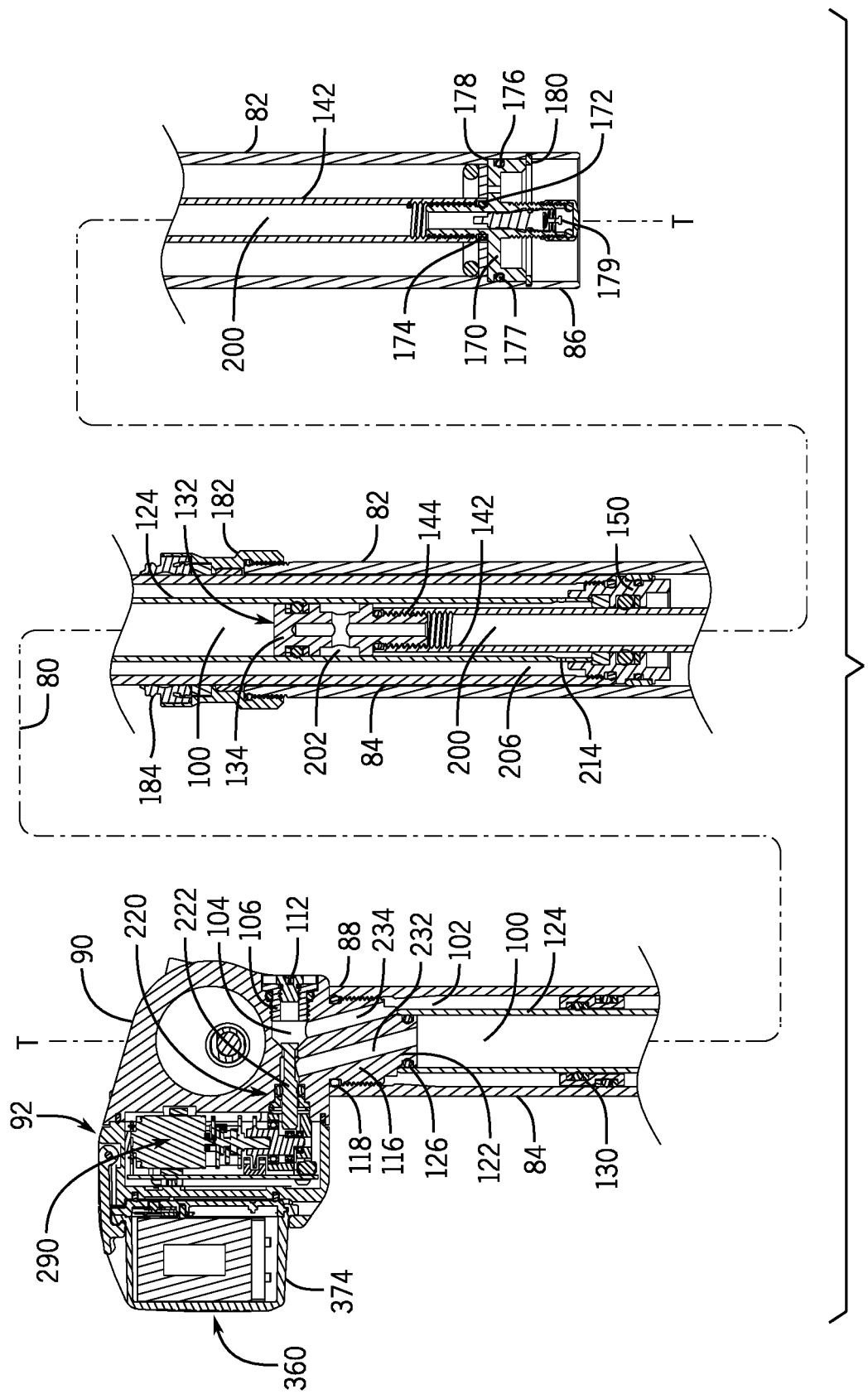
FIG. 5A shows a vertical cross section view, as in FIGS. 4A and 4B, but with the seat post assembly in an intermediate or partly extended position.

Referring to FIGS. 3A and 4A, the seat post assembly 80 may be positioned in a fully extended position with the upper tube 84 extended upward relative to the lower tube 82 to its fullest extent. Likewise, referring to FIGS. 3B and 4B, the seat post assembly 80 may be positioned in a fully retracted or contracted position with the upper tube 84 retracted into the lower tube 82 to its fullest extent. Raising or lowering the upper tube 84 relative to the lower tube 82 raises or lowers the seat or saddle 56 relative to the frame 52. The seat post assembly 80 can also be positioned in any number of intermediate positions, such as depicted in FIG. 5A, between the fully extended and the fully contracted positions, according to the desire of the rider.

How the height of the seat post assembly 80 is adjusted is now described below. For the purposes of describing the construction and operation of the seat post assembly 80, it will be helpful to describe the seat post assembly by way of two different portions, a hydraulic portion and an electronic portion.

Hydraulic Portion

In general, the hydraulic portion of the seat post assembly 80 has two pressure systems including a hydraulic system and a pneumatic system. Referring to FIGS. 4A, 4B, 5A, 5B, 6A, and 6B, an incompressible fluid, such as for example a mineral oil, is contained within the hydraulic system, which includes two hydraulic volumes or pressure chambers. These volumes include a first pressure chamber 100 and a second pressure chamber 102 defined within the head 90 and the upper tube 84. In order to fully understand and appreciate the two pressure chambers 100, 102, specific details of the head 90 and upper tube 84 are now described.

The head 90 includes a hydraulic fluid space, defined in more detail below, and a bore 104 in communication between the outside of the head and the hydraulic fluid space. An insert 106 is threadably seated in the bore 104 of the head 90. The insert 106 defines a bleed orifice 107 between the hydraulic fluid space and the exterior of the head 90 through the insert. A seal or O-ring 108 is contained in a groove 110 formed in a wall of the head 90. The O-ring 108 creates a seal between the insert 106 and the wall of the bore 104 in the head 90. A bleed screw 112 is threadably received in the bleed orifice 107 of the insert 106. Another O-ring 114 is contained in a seat 115 formed between the bleed screw 112 and the insert 106. The O-ring 114 seals the bleed orifice 107 when the bleed screw is tightened. The bleed orifice 107 may be opened by loosening the bleed screw 112, as needed.

Figure 6A:
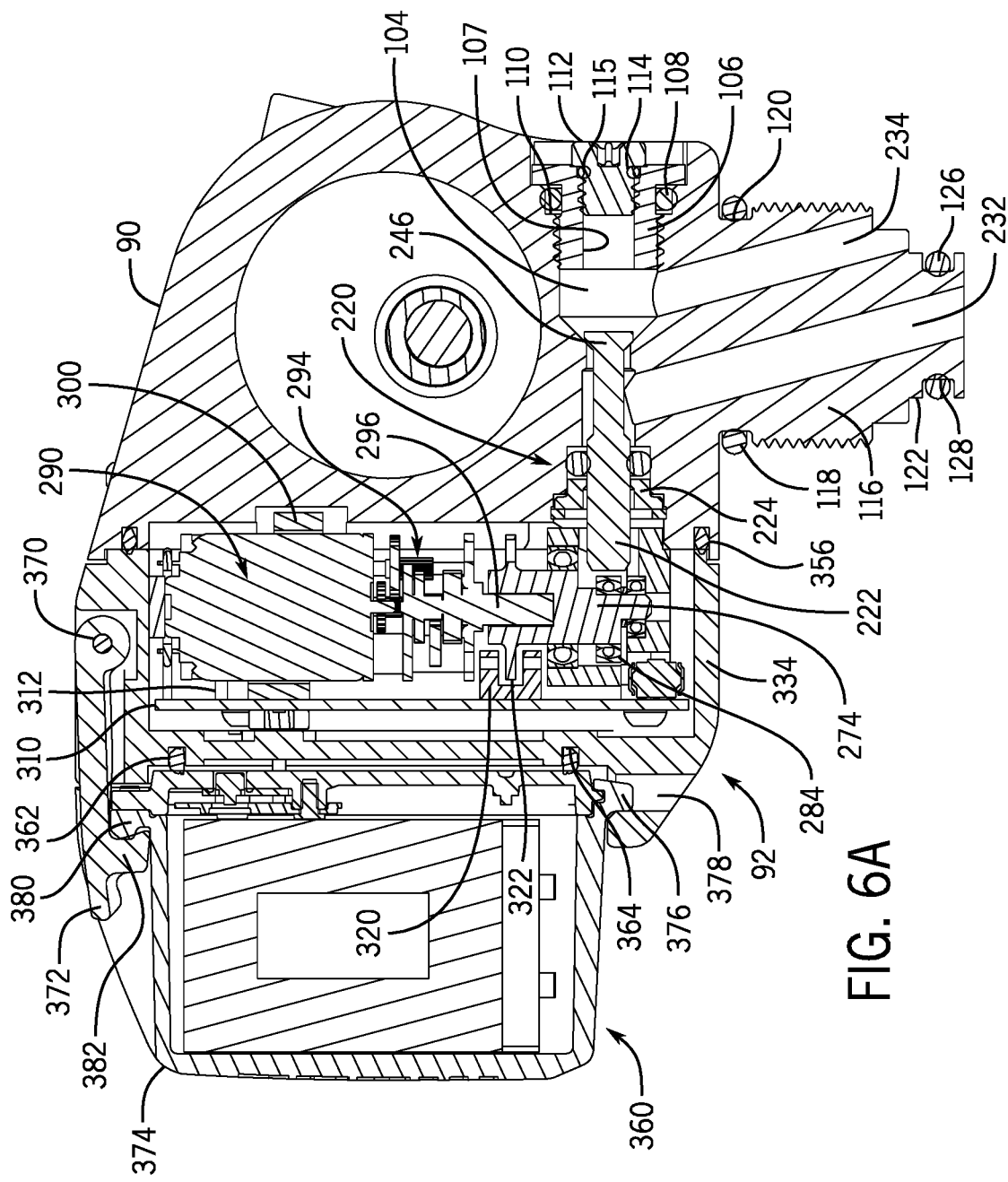
FIG. 6A shows an enlarged close-up view in cross-section of an electronics module disposed at the upper end of the seat post assembly of FIGS. 4A and 5A.
Figure 6B:
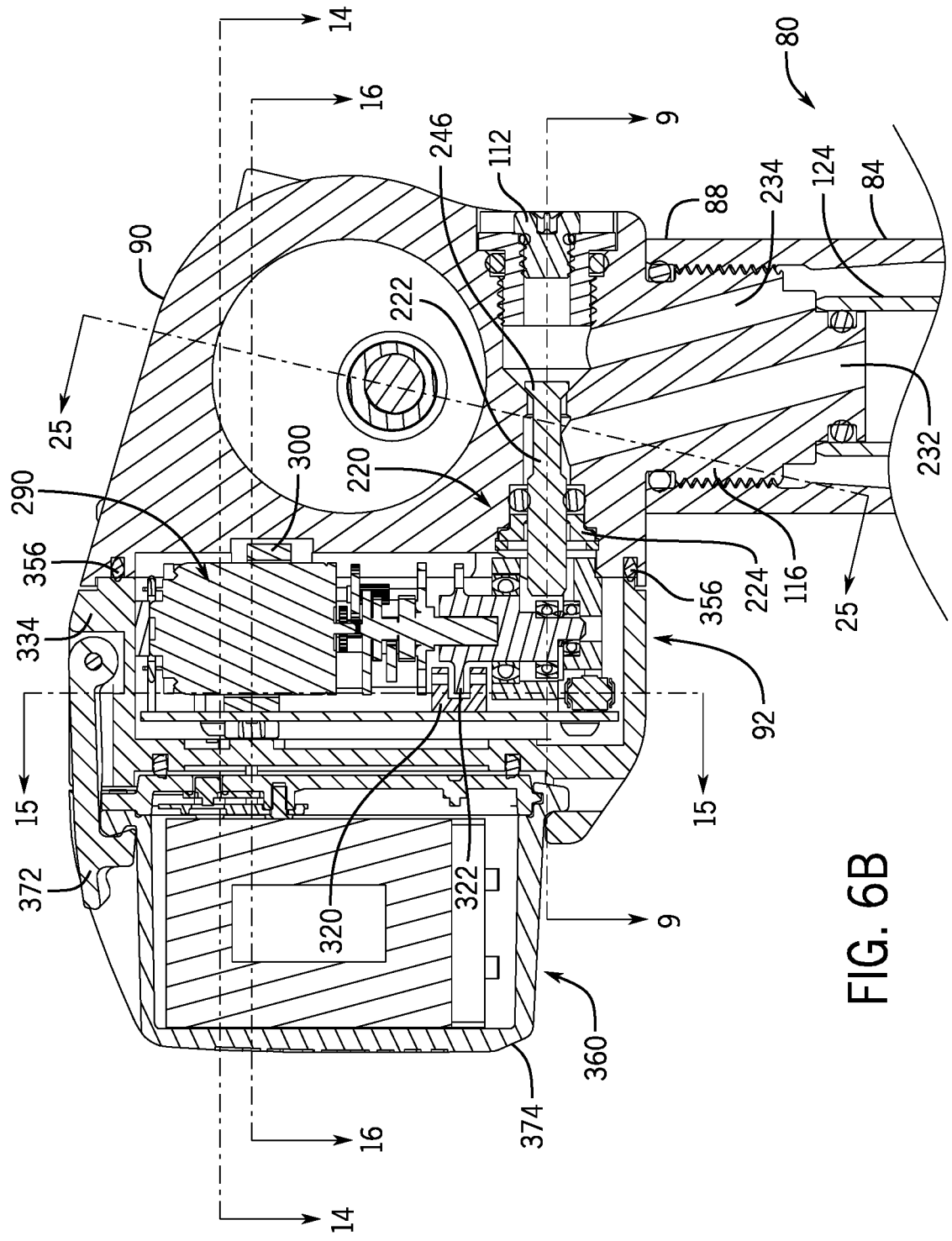
FIG. 6B shows the electronics module of FIG. 6A and depicting multiple cross-section lines utilized for additional views.

As best illustrated in FIGS. 6A and 6B, the second distal end 88 of the upper tube 84 is threaded onto a boss 116 that protrudes from the bottom of the head 90. Another O-ring 118 is contained within a groove 120 formed around the circumference of the boss 116. The O-ring 118 creates a seal between the boss 116 and the upper tube 84. A stepped-down, smaller diameter second boss 122 protrudes from the free end of the boss 116 and is within the upper tube 84. A piston cylinder 124 is attached to the second boss 122. Another O-ring 126 is contained within a groove 128 formed around the circumference of the second boss 122 to form a seal between the second boss and the piston cylinder 124. The piston cylinder 124 is concentrically disposed within the upper tube 84 and its upper end bottoms against the face of the boss 116. The piston cylinder 124 may be threaded onto the second boss 122, or may simply be press fit onto the second boss and retained thereon by friction and by the assembled structure of the seat post assembly 80.

Figure 5B:
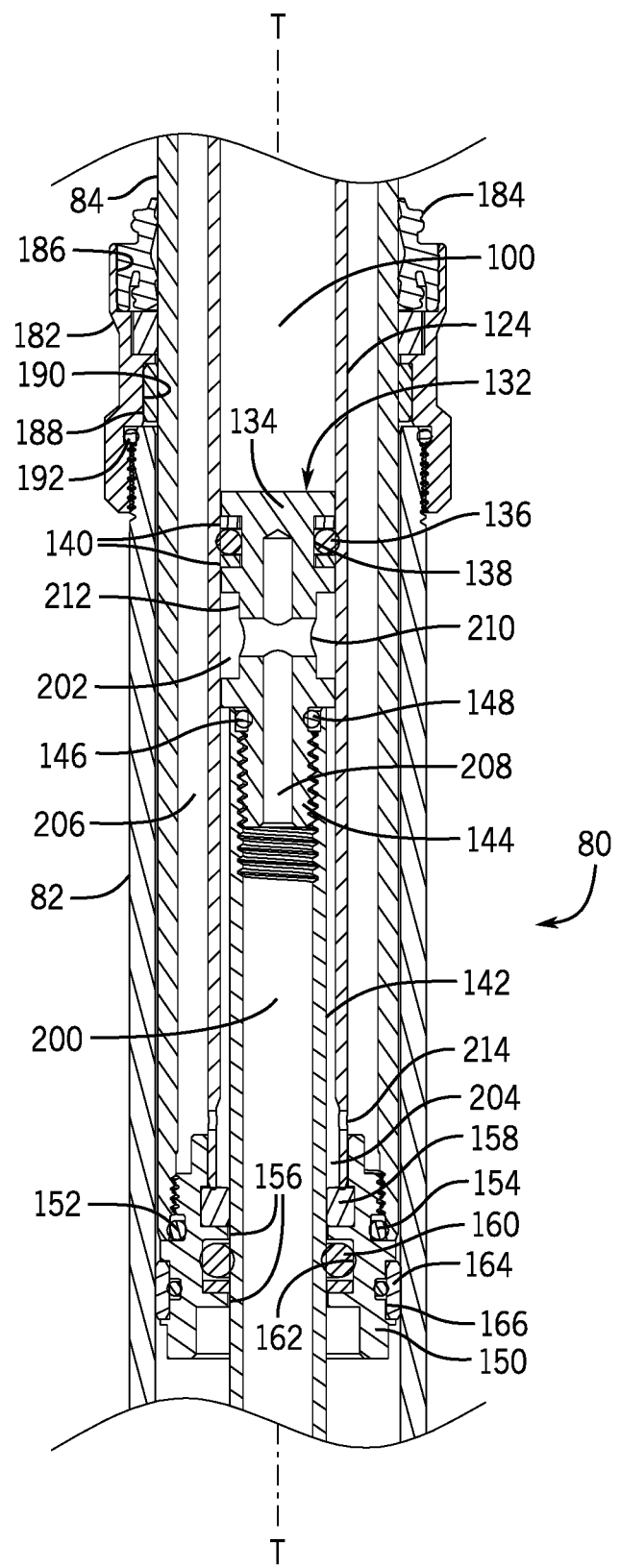
FIG. 5B shows an enlarged close-up view of a central portion of the seat post as depicted in the middle of FIG. 5A.

Referring to FIGS. 5A and 5B, a floating piston 130 resides in the circumferential space between an inner surface of the upper tube 84 and an outer surface of the piston cylinder 124. The floating piston 130 is ring-shaped and creates a movable seal between the outer surface of the piston cylinder 124 and the inner surface of the upper tube 84. A piston 132 is also received within the interior of the piston cylinder 124 and has a piston head 134 at an upper end. An O-ring 136 is seated in a groove 138 around the circumference of the piston head 134. The O-ring 136 is sandwiched between a pair of back-up O-rings 140 that are also received in the groove 138. The O-ring 136 and back-up O-rings 140 create a seal between the piston head 134 and the inner surface of the piston cylinder 124. A piston shaft 142 is threadably connected to a stem 144 that protrudes from the piston head 134 on the lower end of the piston 132. Another O-ring 146 is contained within a seat 148 formed between the stem 144 of the piston 132 and the inner surface of the piston shaft 142.

Also, referring to FIGS. 5A and 5B, a cap ring 150 is threaded on and attached to the lower end of the upper tube 84. An O-ring 152 is positioned in a groove 154 around the circumference of the cap ring 150 and forms a seal between the cap ring and the upper tube 84. The lower end of the piston cylinder 124 is received within a bore 156 formed axially through the cap ring 150, bottoming against a stop ring 158 captured in the bore. An O-ring 160 is seated in an internal groove 162 in the bore 156 and creates a seal between the bore 156 of the cap ring 150 and the outer surface of the piston shaft 142, which extends through the cap ring. A guide bushing 164 is captured in a seat 166 around the circumference of the cap ring, below the O-ring 152, and is disposed between the outer surface of the cap ring 150 and the inner surface of the lower tube 82.

Referring to FIG. 5A, an end cap 170 is threaded into the lower end of the piston shaft 142. An O-ring 172 is contained within a groove 174 around the circumference of the end cap 170 to form a seal between the end cap and the inner surface of the piston shaft 142. The end cap 170 is received in a larger diameter bore 176 in the lower end of the lower tube 82. The bore 176 terminates at a step or shoulder 178 and the end cap 170 butts against the shoulder. The end cap 170 is captured between the shoulder 178 and a retaining ring 180 within the lower end of the lower tube 82 securing the end cap therein. A valve 179, such as a Schrader or American style valve, is threadably attached to the bottom end of the end cap 170.

Referring to FIG. 5B, a collar 182 is threadably connected to the upper end of the lower tube 82 and closely surrounds the upper tube 84. An O-ring 192 is seated in a groove in the inner surface of the collar 182 and provides a seal between the collar and the upper end of the lower tube 82. A wiper or wipe seal 184, for example an elastomeric wiper, is pressed into a bore 186 at the upper end of the collar 182. Wiping surfaces of the wiper 184 contact the outer surface of the upper tube 84. An upper guide bushing 188 is contained within a seat 190 around an inner surface of the collar 182 above the threaded connection to the lower tube 82. The upper guide bushing 188 also bears against the outer surface of the upper tube 84.

Still referring to FIGS. 5A and 5B, the lower tube 82, the collar 182, the piston 132, the piston shaft 142, and the end cap 170 are essentially fixed relative to one another and thus are constrained to not move relative to each other. Since the lower tube 82 is clamped in the frame tube 89 of the bicycle frame 52, these components will always be in the same fixed position relative to the bicycle frame. On the other hand, the head 90, electronics module 92, the upper tube 84, the piston cylinder 124, and the cap ring 150 are fixed to one another and thus are constrained to always move together as a unit. These parts telescope vertically within and relative to the lower tube 82 along the tube axis T. In one example, an anti-rotation system (not shown) of keys and keyways may be employed to prevent or inhibit rotation of the head 90 relative to the lower tube 82. In one example, the anti-rotation system may include three keys that are spaced 120 degrees apart around the seat post assembly 80. The three keys may be provided in and protruding from corresponding recesses in the outer surface of the upper tube 84, and may engage corresponding keyways provided along the inner surface of the lower tube 82. These keyways in the lower tube 82 may be configured to extend longitudinally in the direction of the tube axis T and may extend over a majority of, or even over most of, its length.

The first pressure chamber 100 is a hydraulic volume in the form of a substantially cylindrical volume inside the piston cylinder 124. The first pressure chamber 100 is bounded at one end by the head 90, i.e., by the exposed end of the second boss 122 and at the other end by the piston 132. The second pressure chamber 102 is also a hydraulic volume in the form of a substantially annular space between the outer surface of the piston cylinder 124 and the inner surface of the upper tube 84. The second pressure chamber is bounded at one end by the floating piston 130 and at its other end by the head 90, i.e., by an exposed step on the boss 116.

Referring to FIGS. 4A, 4B, and 5A, a compressible fluid or gas, such as air, is contained within the pneumatic system, which includes multiple pneumatic chambers. Referring again to FIGS. 5A and 5B, the pneumatic system in this example is pressurized with air via the valve 179 in the end cap 170 in the lower end of the lower tube 82. In one example, the pneumatic system may initially be pressurized to a preset or established pressure, such as 250 pounds per square inch (psi) with the seat post assembly 80 in the fully extended position shown in FIGS. 3A and 4A. The pressurized medium, such as air, is contained within the multiple pneumatic volumes, which include volumes 200, 202, 204, and 206 in this example. The pressurized medium may be added to the pneumatic system such that the first through fourth pneumatic volumes 200, 202, 204, 206 at a predetermined or preset pressure. As noted below, this preset pressure may then be applied, through interaction between the hydraulic and pneumatic systems, to a part of the hydraulic system.

With reference to FIG. 5B, a first pneumatic volume 200 includes the volume inside the piston shaft 142 and within a longitudinal bore 208 and a transverse bore 210 that communicate with one another and that are each provided within the stem 144 and head 134 of the piston 132. A second pneumatic volume 202 includes the substantially annular volume created by an annular recess 212, which is formed around the circumference of the piston head 134 and bound between the piston head and the inner surface of the piston cylinder 124. The volume 202 is also disposed on the piston head 134 between the O-ring 136 and the upper end of the piston shaft 142. A third pneumatic volume 204 includes the substantially annular volume between the outer surface of the piston shaft 142 and the inner surface of the piston cylinder 124. The third volume 204 is bounded by the bottom of the piston head 134 at the upper end of the piston shaft 142 and the top of the stop ring 158 on the cap ring 150 at the lower end of the piston cylinder 124. A fourth pneumatic volume 206 includes the substantially annular volume between the outer surface of the piston cylinder 124 and the inner surface of the upper tube 84. The fourth volume 206 is bounded by the floating piston 130 (see FIG. 5A) and the top of the cap ring 150.

A cross bore or hole 214 through and near the lower end of the piston cylinder 124 allows air in the third pneumatic volume 204 to communicate freely with air in the fourth pneumatic volume 206. Since there are no seals isolating them from each other, and particularly below the groove 138, the pneumatic volumes 200, 202, 204, and 206 are all in free communication with each other all the time.

Figure 7A:
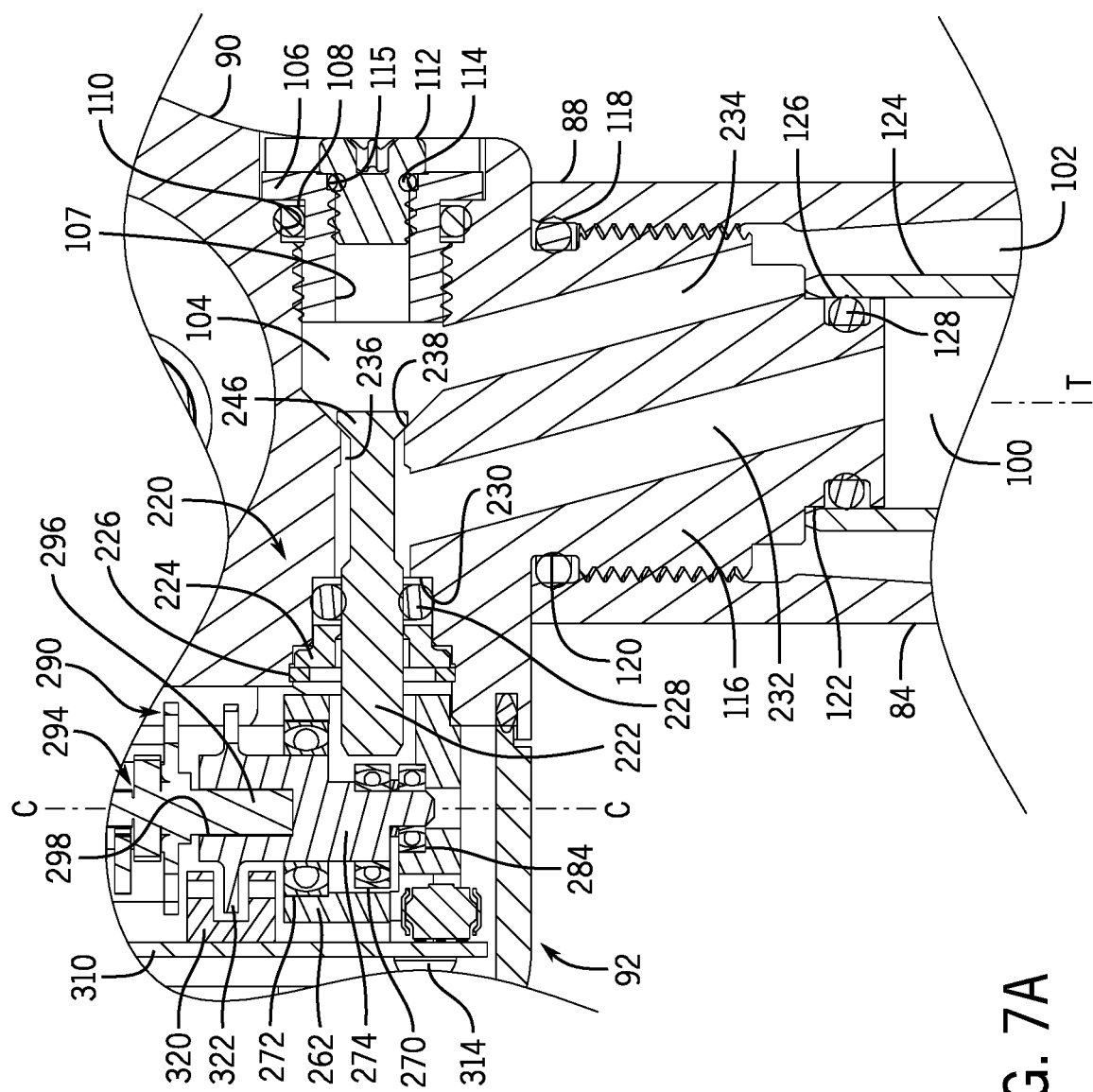
FIG. 7A shows an enlarged close-up view of the electronics module of FIG. 4A and depicting a cam and a valve assembly in a closed position.
Figure 7B:
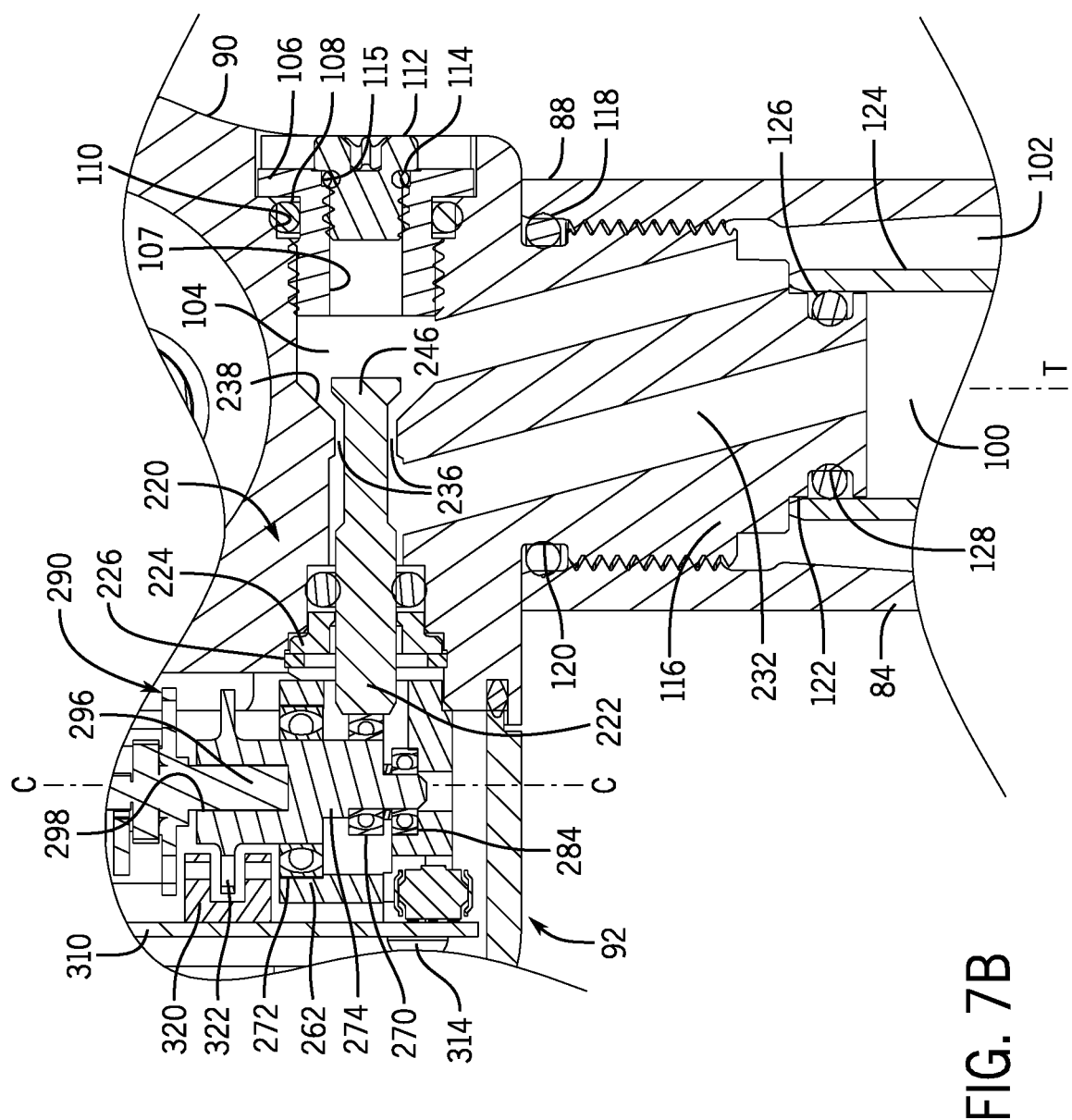
FIG. 7B shows the electronics module of FIG. 7A but depicting the cam and the valve assembly in an open position.

Referring to FIGS. 7A and 7B, the head 90 and the electronics module 92 together define a valve 220 that includes the hydraulic fluid space within the head. The hydraulic fluid space in this example is defined in part by the bore 104 formed across the head 90. One end of the bore 104 is selectively closed off by the above-described insert 106 and bleed screw 112. A valve body or poppet, i.e., an isolator 222 is received in the bore 104 in the head 90 and a portion of the isolator 222 extends through the opposite end of the bore. A bushing 224 is seated in the opposite end of the bore 104 and is secured by a retaining ring 226. An O-ring 228 is contained within the bore 104 between the retaining ring 226 and a step shoulder 230 formed in the bore.

Referring to FIG. 7A, the head 90 in this example includes a first fluid conduit or first passage 232 that extends through the boss 116 and opens at one end into the bore 104 and opens at its other end into the first pressure chamber 100 at the end of the second boss 122. The first passage 232 provides fluid communication between the bore 104 and the first pressure chamber 100 within the piston cylinder 124 connected to the boss 116. The head 90 also includes a second fluid conduit or second passage 234 that extends through the boss 116 adjacent the first passage 232. The second passage 234 opens at one end into the bore 104 and opens at its other end into the second pressure chamber 102 at the end of the boss 116 but to the side of the second boss 122. The second passage 234 provides fluid communication between the bore 104 and the second pressure chamber 102 in the space between the upper tube 84 and the piston cylinder 124. A flow path 236 is defined at a smaller diameter mid-region within the bore 104. The part of the bore 104 on one side (left side in FIG. 7A) of the flow path 236 is a part of the first pressure chamber 100. The part of the bore 104 on the other side (right side in FIG. 7A) of the flow path 236 is a part of the second pressure chamber 102. A tapered or conical shaped surface, i.e., a valve seat 238 is formed in the head material within the bore 104 and adjacent the flow path 236. The valve seat 238 faces the second pressure chamber 102 side of the bore 104. The flow path allows fluid communication between the first and second pressure chambers 100, 102.

FIGS. 7A, 7B, and 8 show details of the isolator 222 for the valve 220. The isolator 222 is configured to selectively isolate the fluid in the first pressure chamber 100 from the fluid in the second pressure chamber 102. The isolator 222 is configured to nullify any resultant force produced by the loaded pressure of the first pressure chamber acting on the isolator. The isolator 222 is essentially a cylinder with a first portion 240 having a first diameter and defining a first end 242 of the isolator. The isolator 222 has a second portion 244 coupled to the first portion 240, the second portion having a second diameter that is smaller than the first diameter. The isolator 222 also has a plug 246 on an end of the second portion 244 opposite the first end 242, whereby the plug defines a second end 248 of the isolator. The isolator 222 has a lengthwise valve axis V, as shown in FIG. 8, along a length of the isolator between the first end 242 and the second end 248. The plug 246 has a diameter that is larger than the second diameter of the second portion 244, and may be larger than, the same size as, or smaller than the first diameter of the first portion 240. A tapered or angled annular first surface 250 transitions between the larger diameter first portion 240 and the smaller diameter second portion 244. A tapered or angled second surface or plug surface 252 transitions between the smaller diameter second portion 244 and the larger diameter plug 246.

In this example, the first end 242 has a flat face or surface, which is disposed and faces outside the head 90. The second end 248 also has a flat face or surface, which is exposed to the second pressure chamber 102. As shown in FIG. 7A, when the isolator 222 is in a closed position, the second surface 252 of the plug 246 is borne against the valve seat 238 adjacent the flow path 236. This closes the flow path 236 and isolates the first pressure chamber 100 and the second pressure chamber 102 from one another. The shape and/or angle of the valve seat 238 and the shape and/or angle of the second surface 252 should complement one another to assure a sufficient fluid tight seal in the closed position. As shown in FIG. 7B, when the isolator 222 is in an open position, the plug 246, and thus the second surface 252, is spaced from the valve seat 238. This opens the flow path 236 allowing fluid communication between the first pressure chamber 100 and the second pressure chamber 102.

The upper tube 84, the piston cylinder 124, and the cap ring 150 (see FIGS. 5A and 5B) are fixed relative to each other and thus are constrained to move together as a unit. Hydraulic system pressure acts on these parts, and exerts a net upward force on the parts. Thus, the head 90, the upper tube 84, the piston cylinder 124, and the cap ring 150 are all biased upward. However, since the hydraulic fluid in the first pressure chamber 100 is incompressible, a downward force on the head 90 pressurizes the fluid but the head is unable to move downward toward the piston 132. Furthermore, when the rider sits on the saddle 56, a force resulting from the rider's weight is transferred downwards through the saddle to the head 90. However, since the fluid in the first pressure chamber 100 is incompressible, the head 90 pressurizes the fluid but the head is unable to move downward towards the piston 132. Thus, the incompressible fluid in the first pressure chamber 100 supports the rider's weight and reacts against the forces created by the weight of the rider sitting on the saddle 56, holding the head 90, and thus the saddle in position. In other words, the first pressure chamber 100 might be said to have a loaded pressure, i.e., under load from the saddle 56 and the fluid pressure itself, that is proportional to a load applied along the tube axis T.

Fluid in the first pressure chamber 100 is in communication with the isolator 222 via the first passage 232 in the head 90. Fluid in the first pressure chamber 100 is pressurized either by the rider's weight on the saddle 56 as described below, by a preset pressure, such as a pneumatic preset pressure, also as below, or by both. Referring to FIGS. 7A and 8, fluid pressure from the first pressure chamber 100 acts on the first surface 250 and the outer surface of the second portion 244, as well as on a portion of the outer surface of the first portion 240 and a portion of the second surface 252 when the isolator 222 is in the closed position of FIG. 7A.

The isolator 222 and bore 104 are configured so that hydraulic fluid contacts the outer surfaces around the entire circumferences of the first and second portions 240, 244. Thus, a net force, applied by hydraulic fluid pressure, on the outer surface of the first portion 240 is close to or equal to zero. Likewise, a net force on the outer surface of the second portion 244 is also close to or equal to zero. The exposed surface area of the first surface 250, the entirety of which is exposed to the pressure of the fluid in the first pressure chamber 100, is nearly equal to the surface area of the exposed portion (i.e., not in contact with the valve seat 238) of the second surface 252, and which is exposed to the pressure of the fluid in the first pressure chamber 100. Thus, force exerted on the opposed first and second surfaces 250, 252 by fluid pressure in the first pressure chamber 100 is nullified. The forces applied to these two surfaces 250, 252 oppose each other and thus produce a net neutral force that is near zero on the isolator 222. The result is that, although the fluid pressure in the first pressure chamber 100 acts on the isolator 222, the fluid pressure in the first pressure chamber 100 has a net force of equal to or near zero on the isolator. An important implication of this is that, although the fluid pressure in the first pressure chamber 100 will vary directly according the weight of the rider applied to the saddle 56 and the downward force that the rider's body exerts on the saddle while riding, the net forces acting on the isolator 222 are substantially independent of these factors. Thus, the energy and/or forces required to open the valve 220 will be largely, if not entirely, independent of rider weight/load.

Referring to FIG. 5A, fluid, i.e., air pressure in the pneumatic system within the fourth pneumatic volume 206 acts with upward force through the floating piston 130 to pressurize the hydraulic fluid in the second pressure chamber 102. Referring to FIG. 7A, hydraulic fluid in the second pressure chamber 102 is in communication with the isolator 222 via the second passage 234 in the head 90. Referring to FIGS. 7A and 8, fluid pressure from the first pressure chamber 100 acts on the circumference or outer perimeter of the plug 246 and on the second end 248. The net force on the outer perimeter surface of the plug 246 is zero. The net force on the second end 248 of the isolator 222 biases the isolator into contact with the valve seat 238, i.e., to the left in FIG. 7A, forming a fluid-tight seal. The position of the isolator 222 in FIG. 7A is again referred to as an isolated or closed position because the isolator isolates the first and second pressure chambers 100, 102. In other words, in the closed position, the isolator 222 blocks fluid flow through the flow path 236 between the first and second passages 232, 234 and thus between the first and second pressure chambers 100, 102. When the isolator 222 is in the isolation or closed position of FIG. 7A, the valve 220 is closed.

When a rider is not seated on the saddle 56, the balance of forces in the system is such that the fluid pressure in the second pressure chamber 102 is greater than the fluid pressure in the first pressure chamber 100. If the rider actuates the valve 220 (as described below), a portion of the electronics module 92 (also described below) pushes the isolator 222 from the isolation or closed position of FIG. 7A to the open or actuated position of FIG. 7B. Referring to FIG. 7B, the isolator 222 is positioned such that fluid may flow through the flow path 236 between the first and second passages 232, 234 and thus between the first and second pressure chambers 100, 102. Further, since the fluid pressure in the second pressure chamber 102 is greater than the fluid pressure in the first pressure chamber 100, fluid flows from the second pressure chamber via the second passage 234, through the flow path 236, to the first pressure chamber 100 via the first passage 232. As hydraulic fluid is forced into the first pressure chamber 100, the head 90 and upper tube 84, along with all the parts that are fixed to these parts, are pushed upward to accommodate the resulting increase in fluid volume in the first pressure chamber 100. As the head 90 rises, the saddle 56 rises. The rider can choose to allow the saddle 56 and upper post 84 to rise to the fully extended position of FIGS. 3A and 4A or, if desired, can adjust the saddle to a lesser intermediate height.

When the isolator 222 is positioned as shown in FIG. 7B, the valve 220 is open. The balance of forces (i.e. fluid pressures) acting on the isolator 222 will tend to bias the isolator toward the valve seat 238. However, if the electronics module 92 is still operated to open the valve 220, as described below, the isolator 222 is retained in the open position. When the electronics module 92 is operated accordingly, however, a portion of the module will release the isolator 222. The balance of the fluid forces within the head 90 will then push isolator 222 toward the valve seat 238 until the isolator 222 is again positioned as shown in FIG. 7A in the closed position against the valve seat. With the valve 220 closed, hydraulic fluid is again prevented from flowing via the flow path 236 between the first and second pressure chambers 100, 102. Thus, the head 90 and the saddle 56 will remain in the vertical height position at the instant the valve 220 closed.

When a rider is seated on the saddle 56, the rider's weight is, as previously described, supported by the incompressible fluid in the first pressure chamber 100. The fluid in the first pressure chamber 100, therefore, becomes highly pressurized by the rider's weight, and exceeds the fluid pressure in the second pressure chamber 102. However, as described above, the zero or near zero net force on the isolator 222 of the valve 220 keeps the isolator in the closed position. If the rider operates the electronics module 92 to actuate the isolator 222, as described in detail below, the isolator will move from the closed position of FIG. 7A to the open position of FIG. 7B. The isolator 222 will move in this manner by operation of the electronic portion, as described below, of the valve 220 against the fluid pressure in the second pressure chamber 102. Hydraulic fluid will then flow from the first pressure chamber 100 via the first passage 232, through the flow path 236, and into the second pressure chamber 102 via the second passage 234. With less fluid in the first pressure chamber 100, the head 90 and upper tube 84, and thus the saddle 56, can move downward toward the piston 132, thus lowering the height of the saddle. The rider can choose to move the saddle and upper post 84 to the fully retracted position of FIGS. 3B and 4B or can choose a greater intermediate height. When the rider operates the electronics module 92 accordingly, the isolator 222 can again be released. The balance of forces on the isolator 222 will force the isolator to the closed position with the plug 246 abutting the valve seat 238, as shown in FIG. 7A. With the isolator 222 again in the isolation or closed position, hydraulic fluid is prevented from flowing between the first and second pressure chambers 100, 102. The head 90 and upper tube 84 will thus remain in the vertical position attained at the instant the valve 220 closed.

Electronic Portion

The electronic portion of the seat post assembly 80 includes the electronics module 92, as depicted in FIGS. 6A, 6B, 7A, and 7B, which is incorporated as a part of the head 90 and the valve 220. The electronics module 92 is configured to receive wireless signals from a wireless actuator 260 that is mounted to the handlebars 54 (see FIG. 1). The wireless actuator 260 is configured to operate the electronics module 92 to open or close the valve 220. To do so, a transmission signal is initiated by a rider by using an actuator of some type, such as a lever or a button, on the wireless actuator.

Figure 9A:
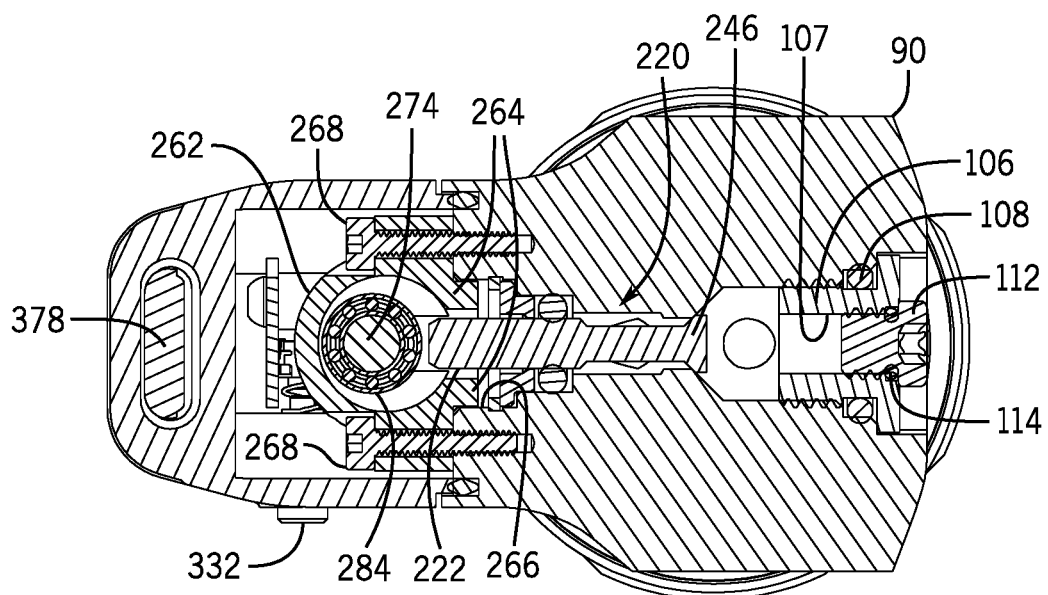
FIG. 9A shows a cross-sectional view taken along line 9-9 of the electronics module of FIG. 6B, and showing the cam and the valve assembly in the closed position of FIG. 7A.
Figure 9B:
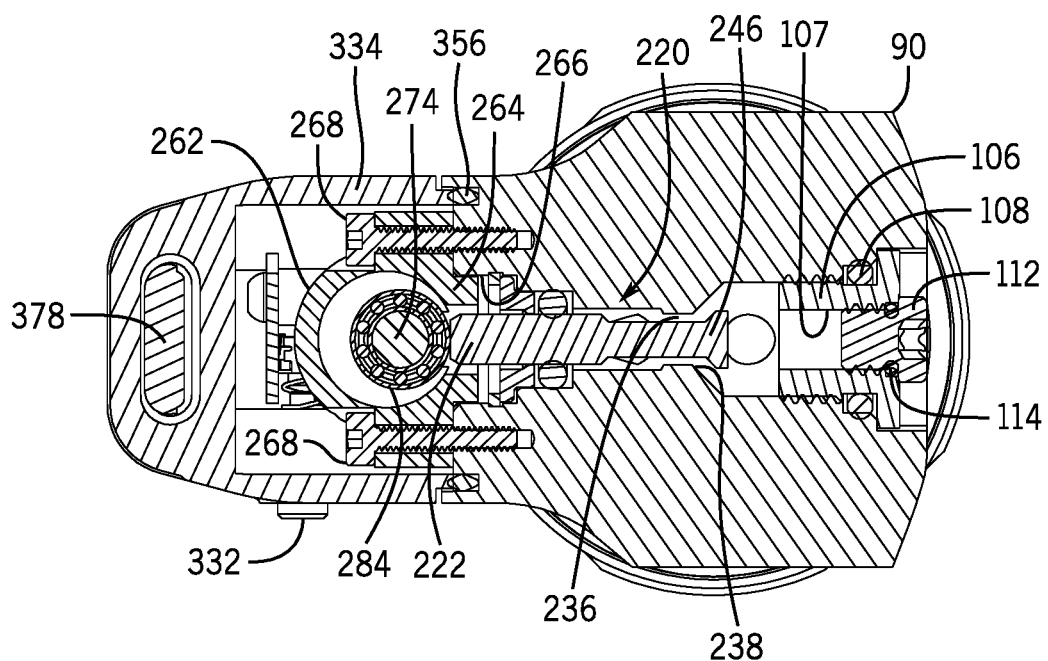
FIG. 9B shows the electronics module of FIG. 9A, but with the cam and the valve assembly in the open position of FIG. 7B.

Referring to FIGS. 6A, 7A, 9A, 9B, and 10, and more specifically to FIG. 9A, the electronics module 92 has a bearing housing 262 that is mounted to the head 90. The bearing housing 262 includes a rear projecting boss 264 that is received within a corresponding bore 266 in the head. In this manner, the bearing housing 262 is accurately positioned relative to the head 90. The bearing housing 262 may be fixed to the head 90, such as by using machine screws 268 or the like. As shown in FIG. 7A, a lower ball bearing 270 and an upper ball bearing 272 are pressed into corresponding bores in the bearing housing 262. A rotary cam 274 is supported within the bearing housing 262 by the bearings 270, 272.

Figure 11A:
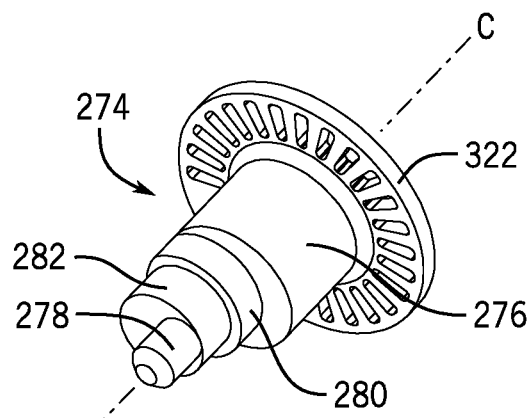
FIGS. 11A-C show various views of the cam and a photo-interrupter of the electronics module depicted in FIGS. 7A and 9A.
Figure 11B:
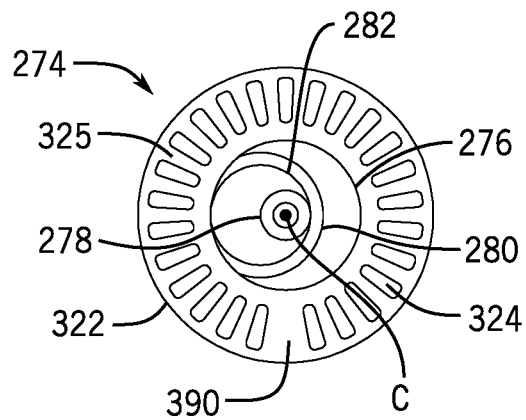
Figure 11C:
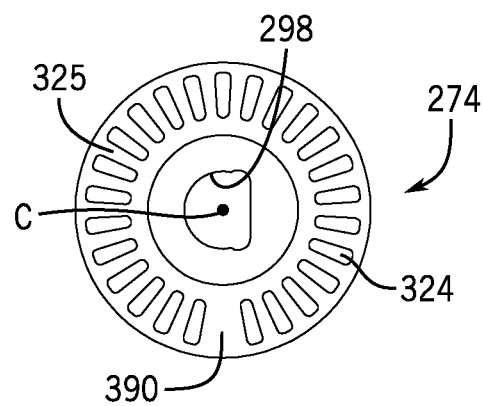

Referring to FIGS. 11A-11C, the rotary cam 274 has first and second portions 276, 278, respectively, that are cylinders both co-axial with one another and with the cam, and that define a cam rotation axis C. The cam 274 also has a third and fourth portions 280 that are also cylinders, but that are eccentric and positioned between the first and second portions 276, 278 along a length of the cam. The eccentric portions 280, 282 are co-axial with each other but are not co-axial with the co-axial portions 276, 278. Thus, as the cam 274 rotates about the cam axis C shared by the first and second co-axial portions 276, 278, the third and fourth eccentric portions 280, 282 rotate in an eccentric manner about and relative to the axis C. Referring to FIG. 7A, the bottom or second co-axial portion 278 of the cam 274 is received in the inner race of the lower bearing 270. The other or first co-axial portion 276 of the cam 274 is received in the inner race of the upper bearing 272. A third ball bearing 284 is press fit onto the eccentric fourth portion 282 of the cam 274.

Referring to FIGS. 12A-12C, the electronics module 92 also includes a gearmotor 290, which has an electric motor 292 and a gearhead 294. In an embodiment, the electric motor 292 is a direct current or DC motor. The gearmotor 290 also has an output shaft 296 projecting from the gearhead 294. The gearhead 294 and output shaft 296 are configured and arranged such that the output shaft rotates slower, but with more torque, than a motor output shaft (not shown) of the motor 292. In one example, the gearmotor 290 may be an off-the-shelf unit, such as a POLOLU ELECTRONICS micro metal 6 volt gearmotor (Pololu Item No. 998). Similar gearmotors are also available from PRECISION MICRODRIVES (London, England) as well as other manufacturers.

Referring to FIGS. 11A, 11C, and 12A-12C, the output shaft 296 of the gearmotor 290 may have a D-shaped or other non-round cross section. Likewise, the cam 274 may have a correspondingly shaped hole 298 at a top end of the cam. The output shaft 296 is received in the hole 298 so that rotation of the shaft rotates the cam 274 in concert therewith.

Figure 13A:
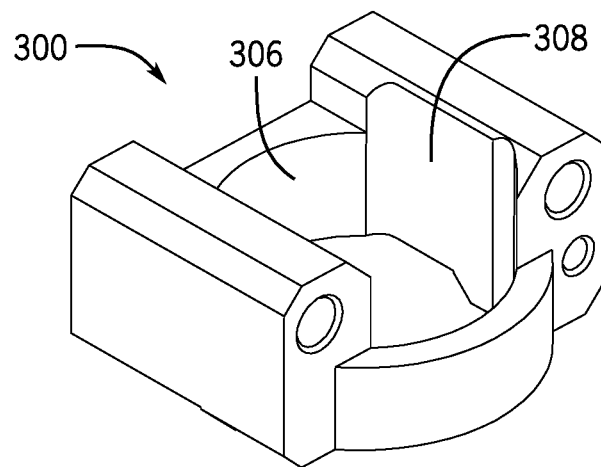
FIGS. 13A and 13B show a perspective view and a top view of a motor support bracket of the electronics module as depicted in FIG. 6A.
Figure 13B:
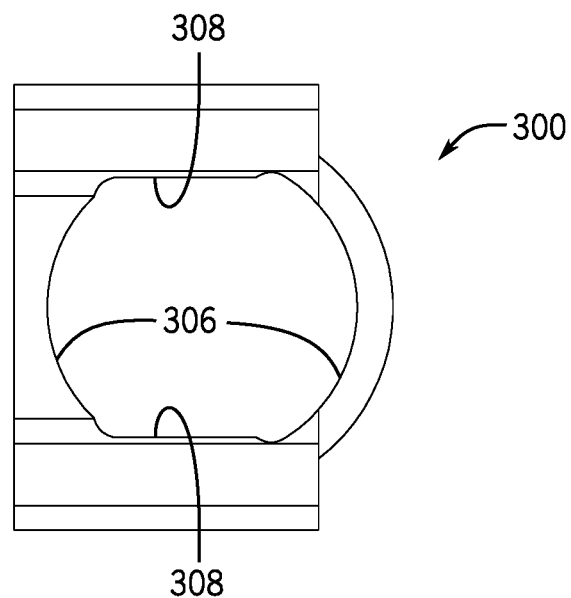
Figure 14:
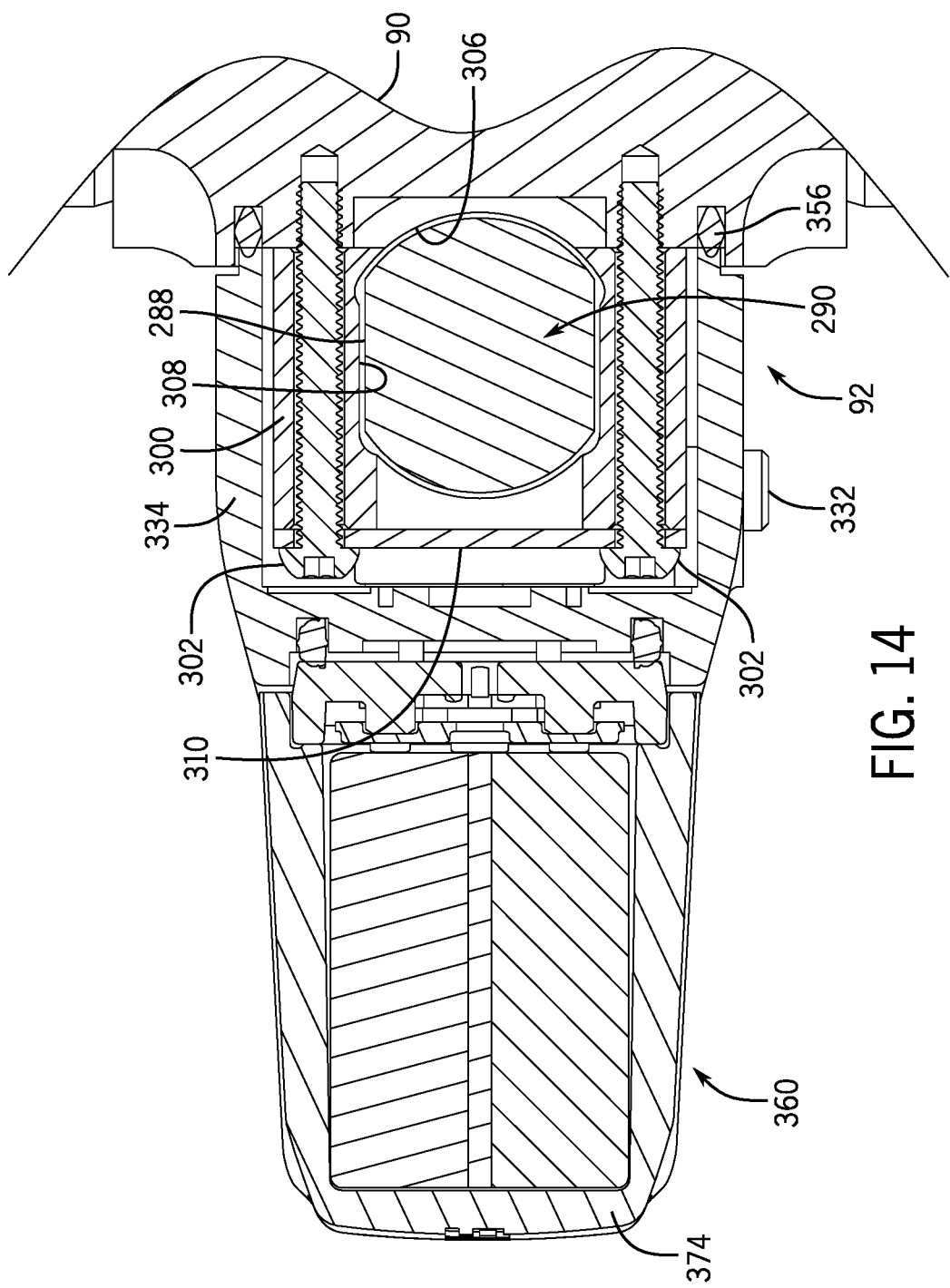
FIG. 14 shows a cross-sectional view taken along line 14-14 of the electronics module of FIG. 6B, and shows the motor support bracket of FIGS. 13A and 13B.
Figure 16:
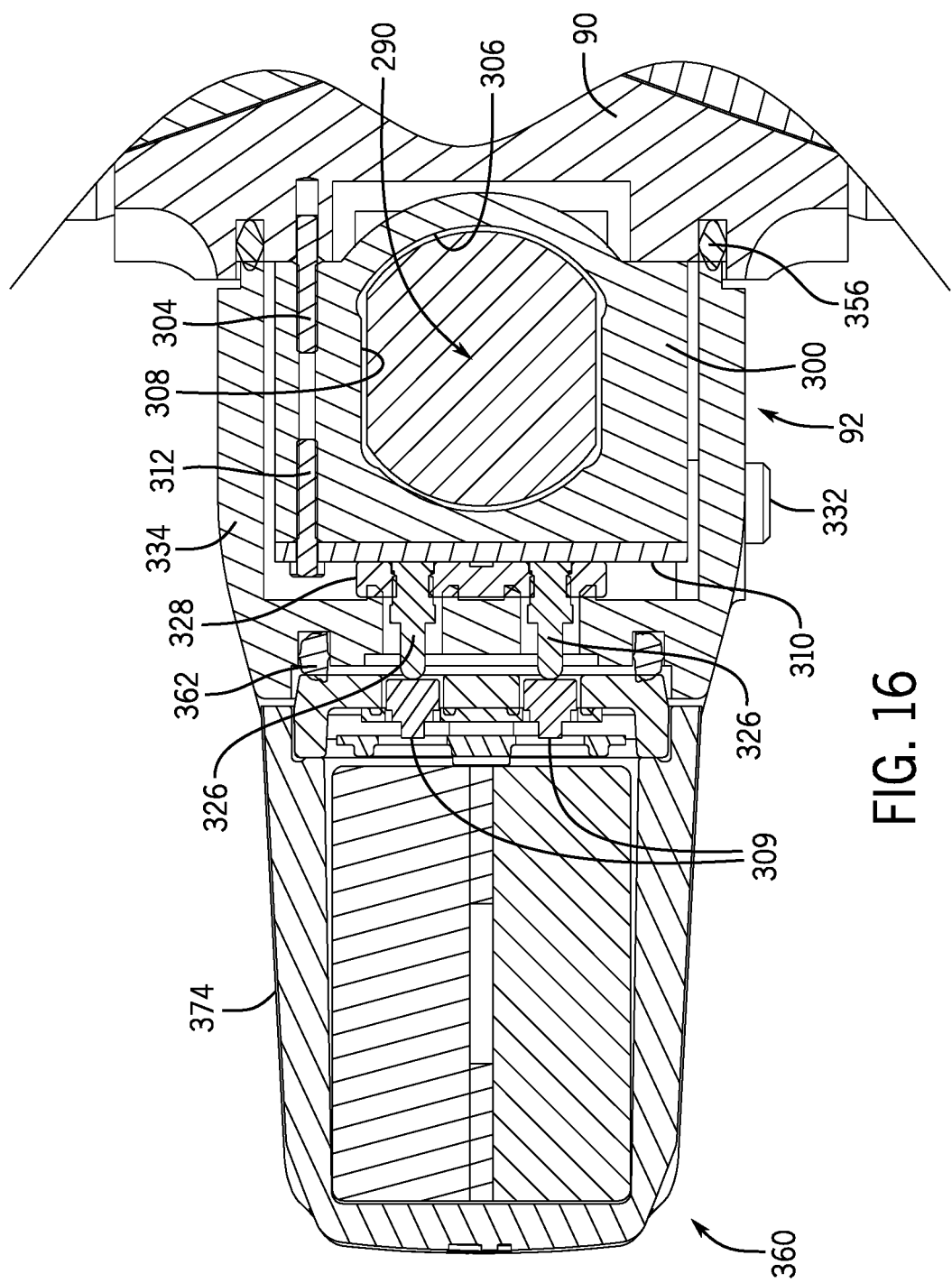
FIG. 16 shows a cross-sectional view taken along line 16-16 of the electronics module of FIG. 6B, and shows pogo pins thereof.

Referring to FIGS. 6A, 10, 13A, 13B, and 14, as shown, a motor support bracket 300 is screwed or otherwise attached to the head 90, such as by machine screws 302. Optionally, the motor support bracket 300 may be accurately positioned relative to the head 90 by a guide pin 304, as shown in FIG. 16. Referring to FIG. 13B, the motor support bracket 300 may have a "double-D" or other non-round shaped interior opening including opposed cylindrical surface segments 306 and opposed planar surface segments or flats 308. The motor 292 may have a body or housing 288 (see FIG. 12A) with a complementary double-D or other shape so as to closely fit within the opening of the motor support bracket 300, as depicted in FIG. 14. There may be a small, but important amount of clearance between the double-D surfaces of the housing 288 of the motor 292 and the double-D surfaces 306 and flats 308 of the motor support bracket 300. The constrained arrangement of the motor 292 within the opening of the motor support bracket 300 allows the motor support bracket 300 to react against a counter-torque of the gearmotor 290 when the gearmotor exerts a torque via the output shaft 296.

Figure 10:
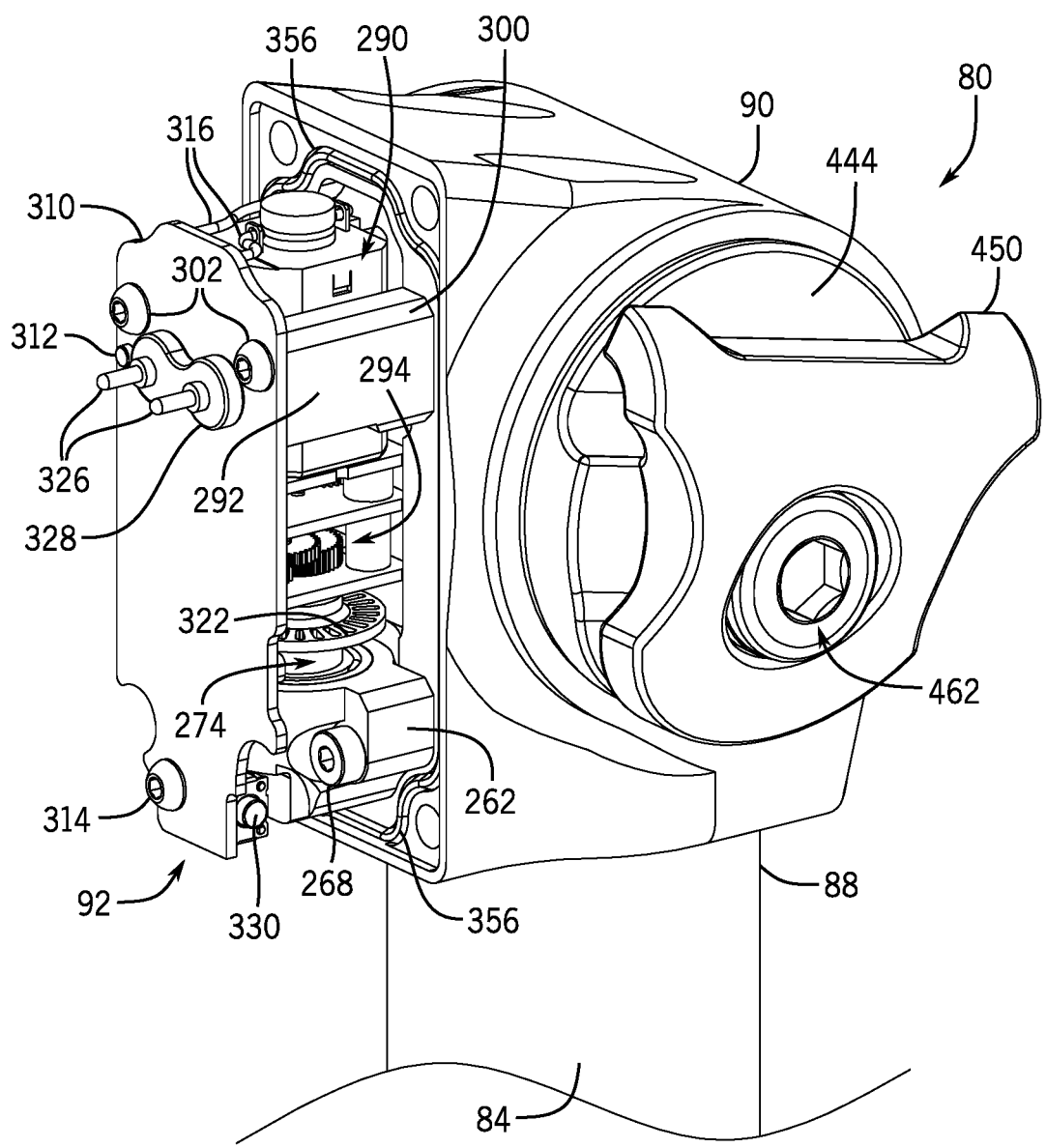
FIG. 10 shows a rear perspective view of the electronics module of FIG. 6A and with a cover and a battery removed.

Referring to FIGS. 6A, 10, and 14, the electronics module 92 may have a printed circuit board or PCB 310. In one example, the PCB 310 may be secured to the motor support bracket 300 by the same screws 302 that attach the motor support bracket to the head 90. Optionally, the PCB 310 may be accurately positioned relative to the motor support bracket 300 by a guide pin 312, as shown in FIG. 16. The PCB 310 may also be secured to the bearing housing 262 by a screw 314 (see FIG. 10). Wires or other conductive elements 316 can electrically connect the motor 292 to the PCB 310.

The electronics module 92 may also include an optical position indicator. For example, referring to FIG. 7A, an optical switch 320, which may be of a known type in the field of electronics, such as for example an OMRON switch (part number EE-SX1131). The optical switch 320 may be a component part of the PCB 310. Referring to FIGS. 7A and 11A-11C, a photo-interrupter 322 may be provided as a part of the cam 274. In this example, the photo-interrupter 322 is a disc on the top end of the cam 274, wherein the disc is perforated with a series of optical openings or windows 324 spaced around and through the disc. The photo-interrupter 322 may be integrally formed as a part of the cam 274 or may be a separate item attached thereto. In one example, the photo-interrupter 322 is integrally formed as a one-piece unitary structure with the portions 276, 278, 280, 282 of the cam 274. The photo-interrupter 322 is positioned so as to selectively interrupt beams of light emitted from the optical switch 320, depending on the rotational or angular position of the cam 274 about the cam axis C.

Referring to FIGS. 10 and 16, electrical contacts 326, such as pogo pins, may be spring loaded electrical contacts biased outward from the PCB 310 and motor 292. The pogo pins 326 may be electrically connected to the PCB 310. A seal 328 may be provided around the base of the pogo pins 326, such as an elastomeric seal.

Figure 15:
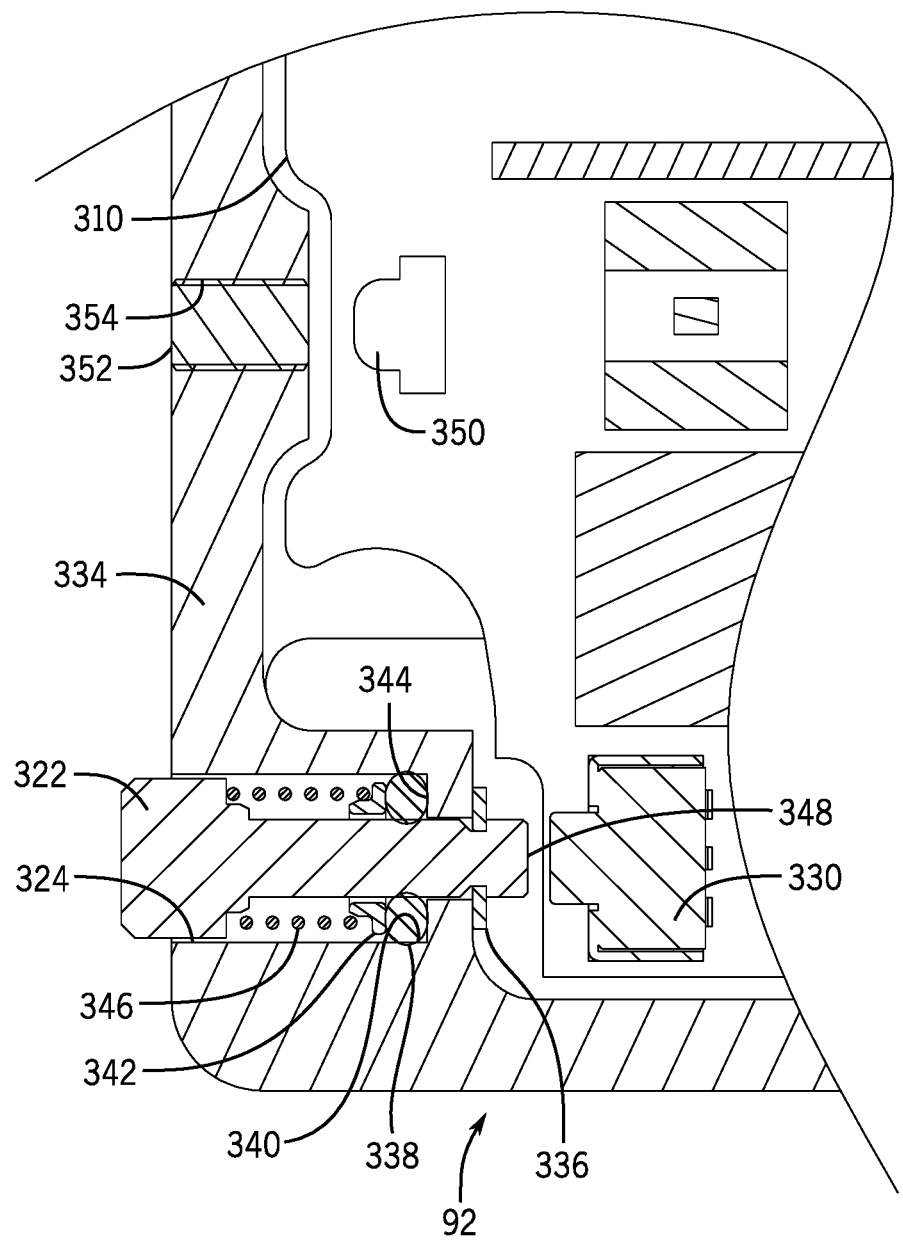
FIG. 15 shows a cross-sectional view taken along line 15-15 of the electronics module of FIG. 6B, and shows an ON/OFF button and an LED.
Figure 17:
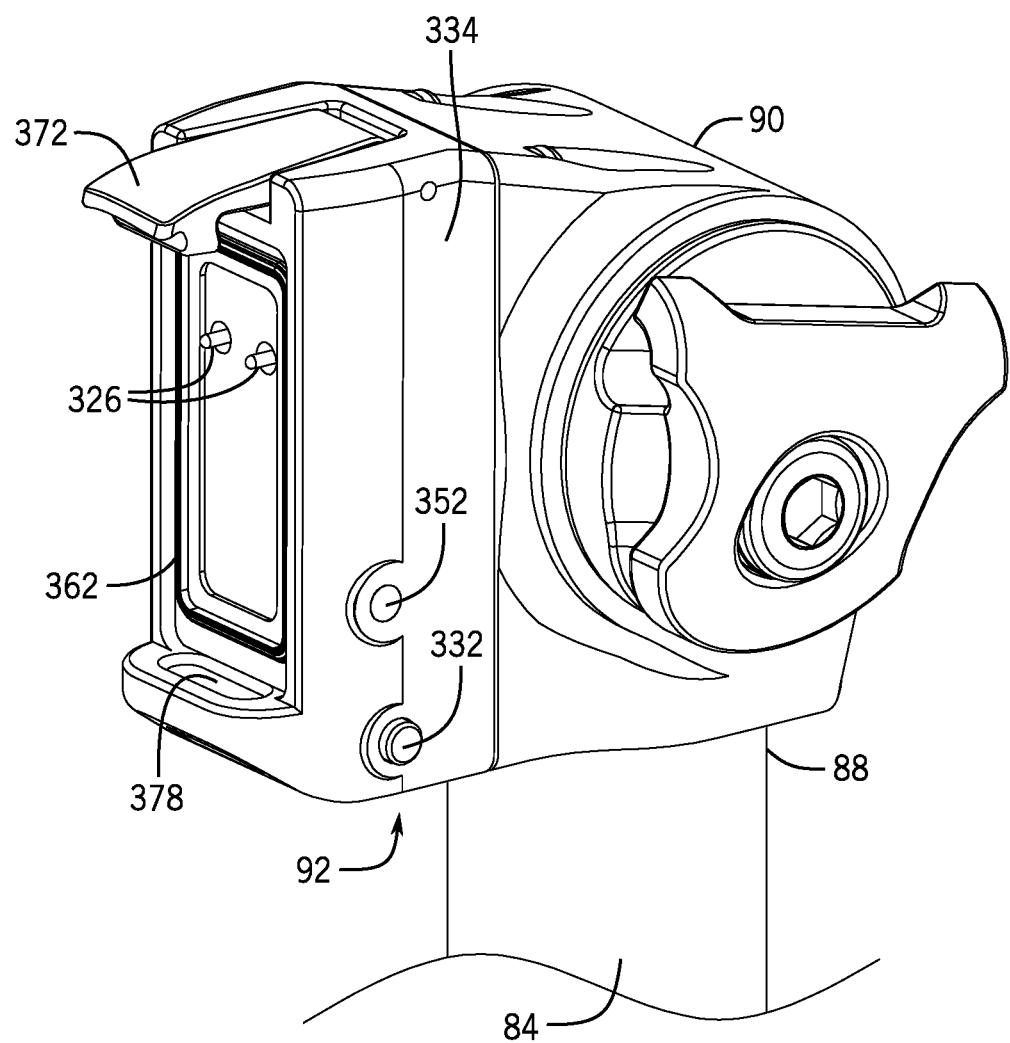
FIG. 17 shows a rear perspective view of the electronics module of FIG. 6A and with a battery removed.

Referring to FIGS. 10, 15, and 17, the PCB 310 may include a pushbutton switch 330. The pushbutton switch 330 may be an off-the-shelf electrical component, such as a momentary-type electrical switch with a button-type actuation. A button 332 projects from a bore 333 in a cover 334 of the electronics module 92 and is retained by a retaining ring 336. An O-ring 338 is contained within a gland 340 formed by the outer surface of the button 332, the cover 334, and a washer 342 surrounding the button 332. The washer 342 captures the O-ring 338 against a step surface 344 within the bore 333. A biasing element, such as a compression spring 346, biases the button 332 outward from the cover 334 (to the left in FIG. 15). The button 332 and its associated parts are configured and arranged such that when the rider presses the button, a distal or interior end 348 of the button contacts and actuates the pushbutton switch 330. Furthermore, when the rider releases the button 332, the spring 346 biases the button out of contact with the pushbutton switch 330, causing the pushbutton switch to turn off.

Referring to FIGS. 15 and 17, the PCB 310 may include a light emitting diode or LED 350. An optically transparent or translucent lens 352 may be fixed to a corresponding hole 354 in the cover 334 that overlies the LED 350. The lens 352 is configured and arranged so when the LED 350 emits light, the emitted light passes through the lens and is visible to the rider. The purpose of the LED 350 is described further below.

Figure 19:
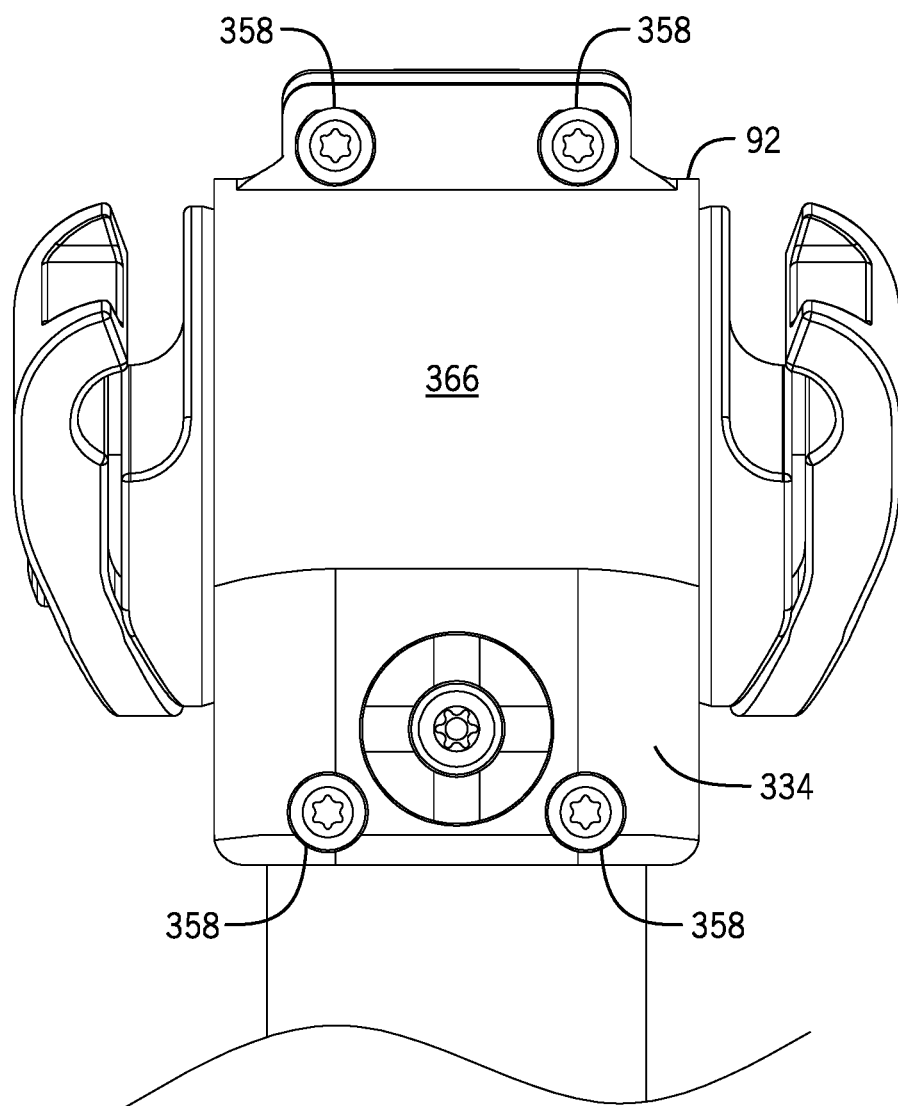
FIG. 19 is a front view of the top of the seat post assembly, showing mounting screws for the battery cover of the electronics module of FIG. 6A.

Referring to FIGS. 6A, and 10, a weatherproof seal 356 may be contained within a groove in the head 90 and surrounding the guts of the electronics module 92. Referring to FIGS. 6A and 17, the cover 334 is positioned as shown relative to the head 90 over the gearmotor 290, PCB 310, and cam 274. The cover 334 may be secured to the head 90 in a suitable manner, such as with four thread-forming screws 358, which can be seen in FIG. 19. The seal 356 is sized such that it is deformed or compressed when the cover 334 is secured with screws 358 to the head 90, forming a fluid-tight weatherproof seal between the head and the cover. The sealed cover 334 protects the internal components of the electronics module 92 from the elements during use. Referring to FIG. 16, the seals 328 adjacent the electrical contacts or pogo pins 326 may be sized to also be deformed or compressed when the cover 334 is secured with the screws 358 to the head 90. The seals 328 form a fluid-tight weatherproof seal against the cover 334 and against the PCB 310. The seals 328 and 356 prevent water and other contaminants from entering the interior volume of the electronics module 92.

Referring to FIGS. 17 and 18A-C, the electronics module 92 also includes a power supply, such as a battery 360 or battery pack that is attachable to the cover 334 to provide power for the module. Another seal, such as an elastomeric seal 362 may be seated in a groove 364 in an outer face 366 of the cover 334. A latch axle or pin 370 may have a knurled end (not shown), and may be pressed into a hole in the cover 334, such as at the top of the cover. The latch pin 370 is also passed through a bore across a latch lever 372 such that the latch lever is rotatable around the latch pin. At least one battery 360 may be provided and sufficient to provide power to components of the PCB 310, the electric motor 292, and other parts of the electronics module 92 as needed. The battery 360 may be a rechargeable battery, such as for example a lithium polymer type battery, which may produce a fully charged voltage of approximately 7.5 volts. The battery 360 may have a shell or case 374 with a foot or projection 376 protruding near a bottom edge of the shell. The projection 376 may engage a corresponding slot 378 in the cover 334.

Figure 18A:
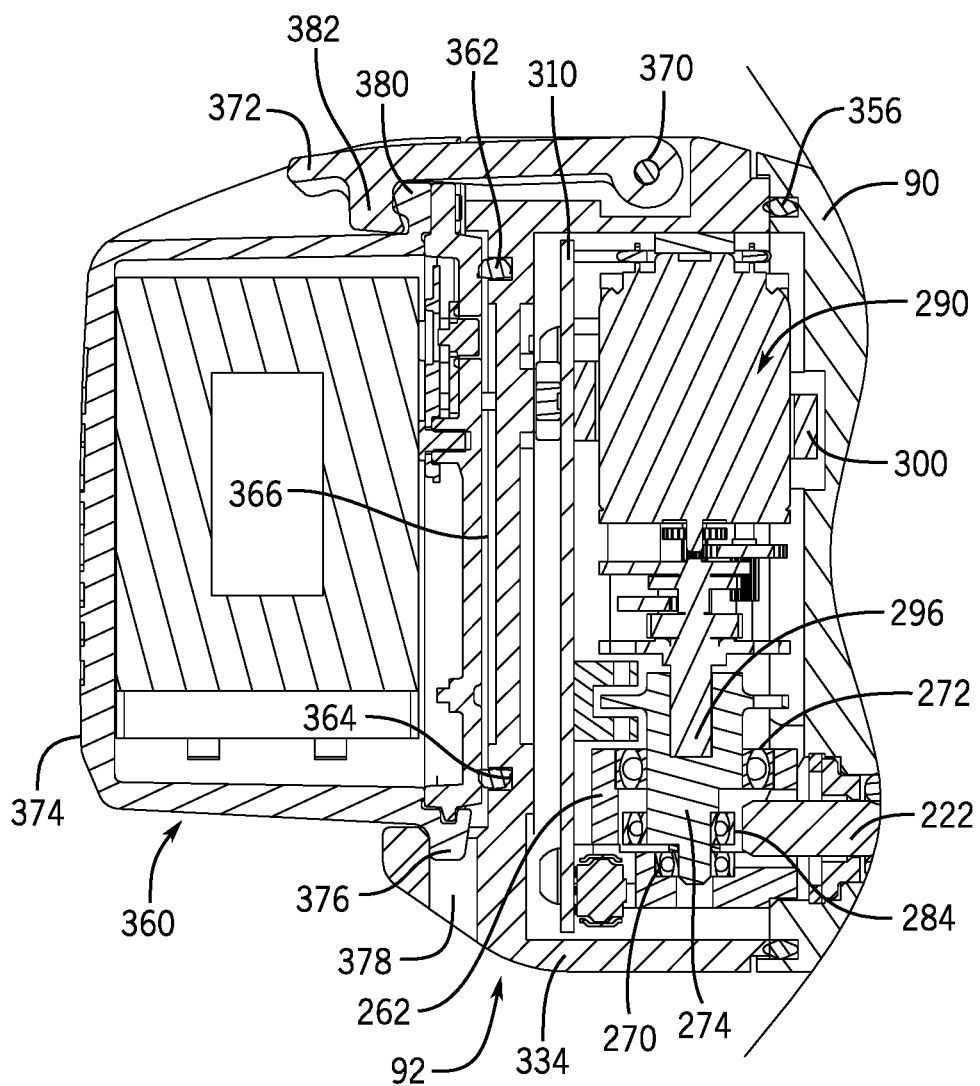
FIG. 18A shows an enlarged close-up cross-sectional view of the electronics module in FIG. 4A and depicting a battery installed and a battery latch in a latched position.

The battery 360 may also have a detent 380 on a top of the shell or case 374. The latch lever 372 may have a corresponding catch 382 configured to engage with the detent 380. The seal 362 in the face of the cover 334 may be sized and configured so that when the battery 360 is positioned as shown in FIG. 18A, the seal is under compression. This forms the waterproof seal between the mating surfaces of the battery shell 374 and the cover 334. The compressive force in the seal 362 bias the battery 360 away from the face 366 of the cover 334 (to the left in FIG. 18A). This pushing the foot or projection 376 firmly against a surface of the slot 378 to and ensure a tight or secure connection between the catch 382 of the latch lever 372 and the detent on the shell 374 of the battery 360. When the battery 360 is attached to the cover 334, as in FIG. 18A, the electrical contacts or pogo pins 326 of the PCB 310 contact electrical contacts 309 on the battery (see FIG. 16). Thus, when the battery 360 is attached to the cover 334, electrical contact is made and maintained between the battery and the PCB 310.

Figure 30:
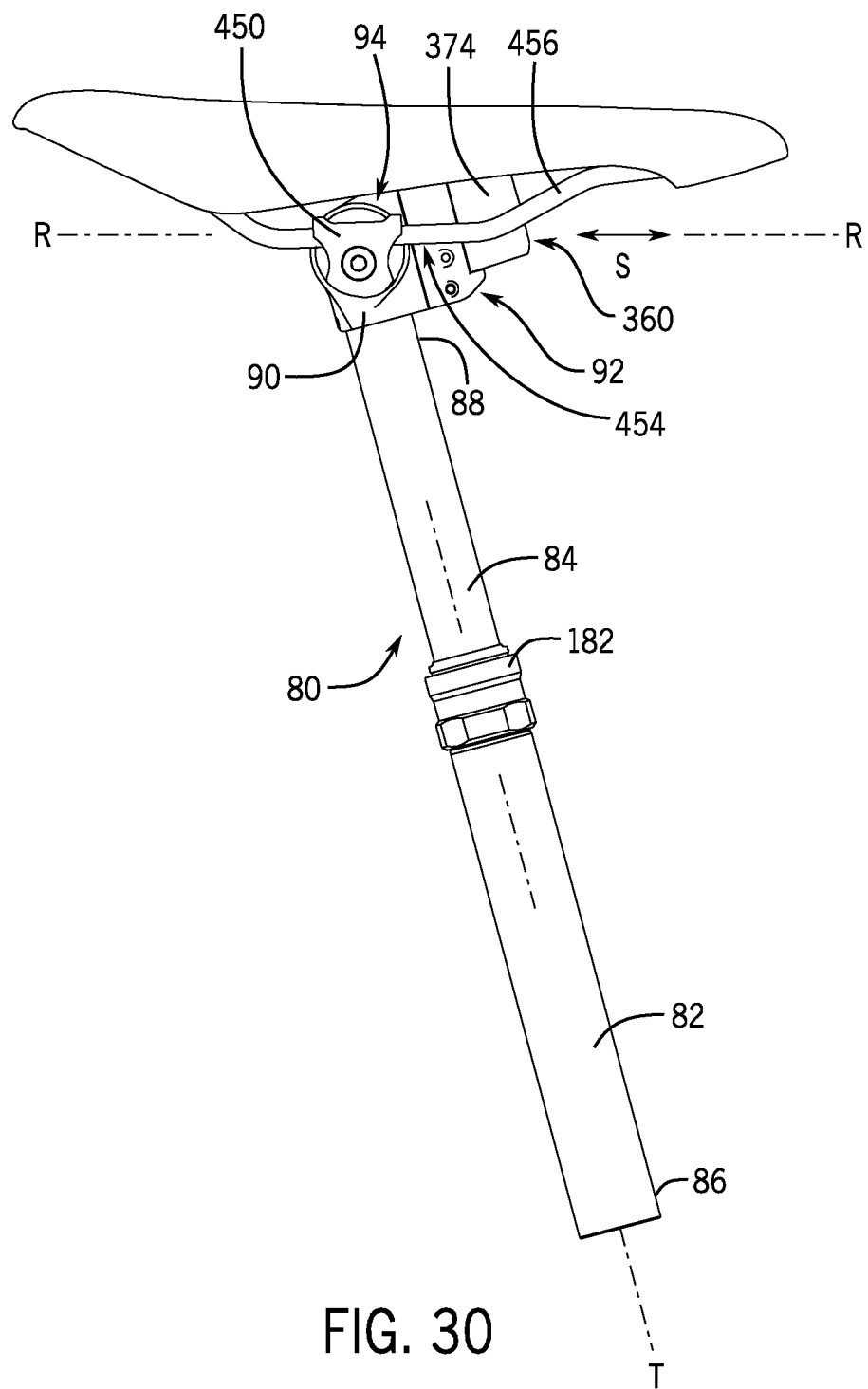
FIG. 30 shows another embodiment of a seat post assembly.

In the disclosed example, the battery 360 or battery pack is positioned beneath the saddle 56. In FIG. 1, the arrow A depicts a normal riding or forward moving direction of the bicycle 50. In an embodiment, the battery 360 or battery pack is also disposed on the rearward side of the seat post assembly 80 on the rear side of the head 90 behind the upper tube 84 relative to the forward direction A of the bicycle 50. By positioning the battery 360 or battery pack in this manner and location, the battery is protected in the vertical by the saddle 56 and a horizontal direction by the upper post 84 and head 90. The battery 360 or battery pack is also disposed in an aerodynamically advantageous position that minimizes drag as the bicycle moves in the forward direction R. However, other mounting positions for the battery 360 or battery pack are also possible. In one example, such as that shown in FIG. 30, the battery or battery pack may be positioned on the front or forward side of the seat post assembly 80 or head 90 and/or may be placed in a different vertical location on the seat post assembly. Such placement may have additional or alternative advantages, for example such forward placement may protect the battery 360 from contact by external items, such as brush, or from contact with the rear wheel in a rear suspensioned bicycle. Further, as can be seen in FIG. 30, at least part of the battery 360 may be disposed vertically above the axis R of the of the rails 454. Alternatively, as shown in FIG. 2, the battery may be disposed partially or entirely below the axis R of the of the rails 454.

Figure 18B:
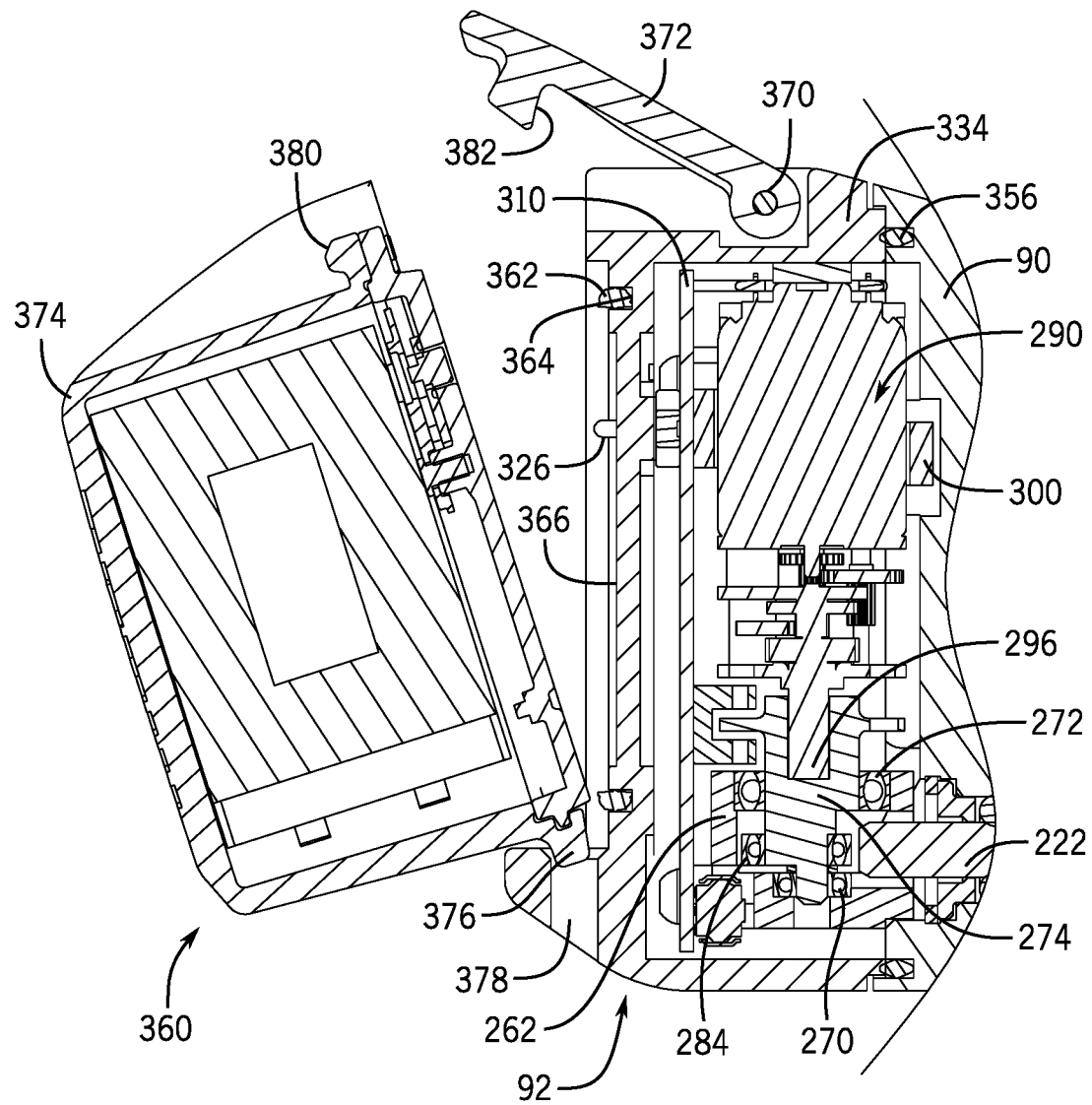
FIG. 18B shows the electronics module of FIG. 18A but depicting the battery latch in a released position and the battery partially removed.
Figure 18C:
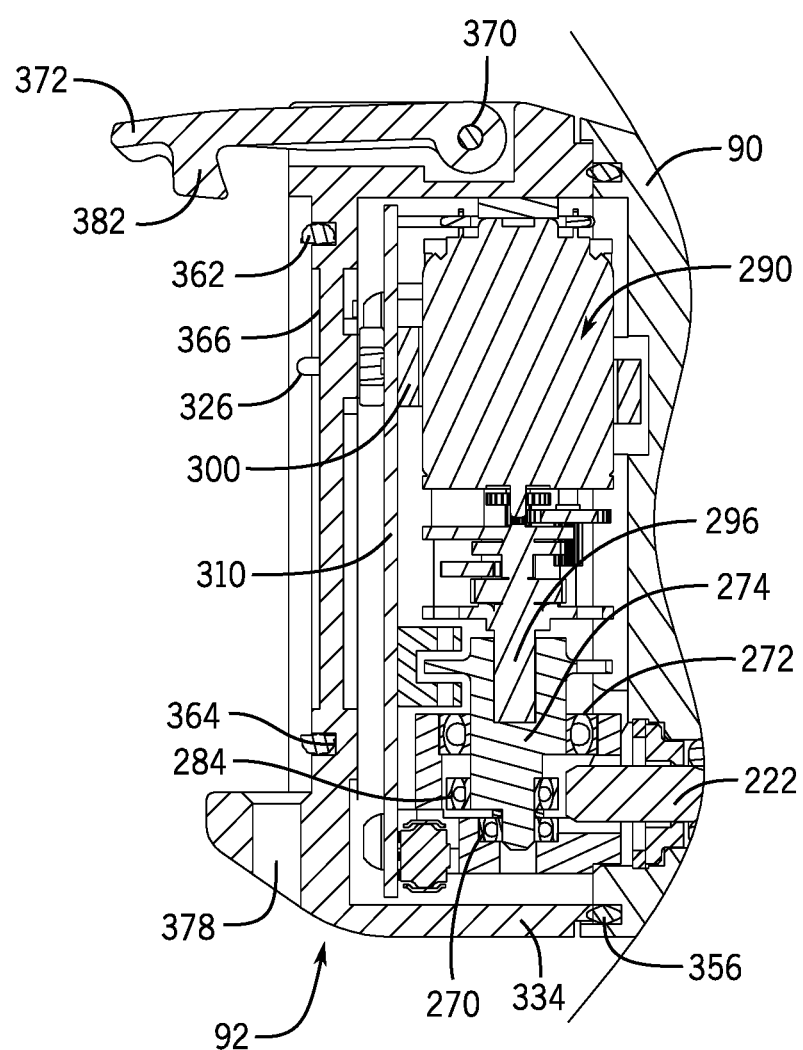
FIG. 18C shows the electronics module of FIG. 18B but depicting same with the battery completely removed, as in FIG. 17.

FIGS. 18B and 18C illustrate a procedure to remove the battery 360 from the seat post assembly 80, in reverse, to attach the battery. Referring to FIG. 18B, a rider may use a finger to lift upwardly on the free end of the latch lever 372, rotating the latch lever upward about the latch pin 370. This disengages the catch 382 of the latch lever 372 from the latching portion or detent 380 of the battery shell 374. The rider can then rotate the battery 360 forward about the projection or foot 376 and then lift the battery up and away from the cover 334. FIGS. 17 and 18C show the seat post assembly 80 with the battery 360 removed. In order to install the battery 360, the rider simply reverses the battery removal procedure. The latch lever 372 may be spring biased to the downward position shown in FIGS. 18A and 18C. The latch pin may include a torsion spring (not shown) to accomplish this feature. The latch lever 372 may then automatically snap into place, securing the battery 360 to the cover when the battery is installed.

Upon installation of the battery 360, the electronics module 92 may be configured to initiate a homing procedure. A microprocessor (not shown) on the PCB 310 can send a signal to a motor controller (not shown) on the PCB, which in turn allows the motor 292 to draw current from the battery 360. The motor 292, when actuated or instructed, may convert electrical energy from the battery 360 into rotational mechanical energy. When actuated, the motor 292 can then run and transmit power through the gearhead 294 to the output shaft 296. As previously described, the D-shaped output shaft 296 of the gearmotor 290 is mated in the corresponding D-shaped hole 298 of the cam 273. Therefore, the output shaft 296, when driven by the motor 292, rotationally drives the cam 274 about the cam axis C. Referring to FIGS. 7A and 11A-11C, as the cam 274 rotates about its rotational axis C, the windows 324 and bars 325 between the windows of the photo-interrupter 322 alternately interrupt light beam(s) from the optical switch 320. This allows the microprocessor to detect and determine the resulting electrical pulses generated by the photo-interrupter 322 as the cam 274 rotates.

One bar 390 of the photo-interrupter 322 may be much wider than the other bars 325 separating the windows 324. The wider bar 390 may be positioned at a known angular or rotational position relative to one of the eccentric portions, such as the lowest eccentric or fourth portion 282 on the cam 274. The wider bar 390 may be utilized by the electronics module 92 to detect or determine the precise position of the cam 274 to properly control the operation of the valve 220. As the cam 274 rotates, the electrical pulse associated with the wider bar 390 will have a much longer duration than the electrical pulses associated with the other bars 325. In this way, the microprocessor can recognize when the wider bar 390 breaks the light beam(s) of the optical switch 320, thereby also "recognizing" the precise rotational or angular position of the eccentric cam portion 282 at that moment. Thereafter, in one example, the microprocessor need only count through a predetermined additional number of pulses before stopping the gearmotor 290 and the cam 274 in the position shown in FIGS. 7A and 8A. In this position, there is clearance between the ball bearing (24) that resides on the eccentric portion 282 of the cam 274 and the first end 242 of the isolator 222. The valve 220 and its associated parts, as described above, are thus in the closed or isolation position of FIG. 7A. This position of the cam 274 may be referred to as the home position or an unactuated position.

The wireless actuator 260, which in this example is mounted to the handlebars 54, is configured to send wireless signals to the seat post assembly 80, and more specifically, to the electronics module 92. In order for the wireless actuator 260 and the seat post assembly 80 to uniquely identify one another, i.e., to pair with one another, the following sequence of actions may be performed. Referring to FIG. 17, a rider first presses and holds the button 332. The LED 350, which is visible through the lens 352, will then start flashing slowly, indicating to the rider that the system is in pairing mode. Next, the rider releases the button 332 and presses and holds a pairing button (not shown) on the wireless actuator 260. Once the seat post assembly 80 and the wireless actuator 260 have been successfully paired, the LED 350 may begin flashing rapidly, indicating to the rider that the pairing was successful. The rider may then release the button on the wireless actuator 260, at which time the electronics module 92 and wireless actuator 260 will exit the pairing mode. Other alternative rider interface schemes and/or sequences for pairing are also possible. Once paired, the wireless actuator 260 can be utilized by a rider to manipulate and adjust the seat post assembly 80.

While riding with the saddle 56 positioned at any given vertical position, or height, the cam 274 is positioned in the home position, and the valve 220 is closed, as shown in FIGS. 7A and 9A. When the rider wishes to adjust the vertical position of the saddle 56, the rider may press and hold an actuator or button on the wireless actuator 260 mounted on the handlebars 54 of the bicycle. As long as the actuator or button is being pressed and held by the rider, a wireless signal to open the valve 220 may be repeatedly transmitted by the wireless actuator 260, and may be repeatedly received by a receiver, such as an antenna of a radio chip and/or wireless antennae (not shown) on the PCB 310. A signal is transmitted from the radio chip to the microprocessor of the PCB 310, and the microprocessor sends a signal to the motor controller of the PCB 310. The motor controller then allows the motor 292 to draw current from the battery 360. The motor 292 converts electrical power from the battery 360 into rotational mechanical power, which is transmitted from the motor 292 through the gearhead 294, to be output as rotation of the output shaft 296. As previously described, the D-shaped output shaft 296 of the gearmotor 290 is mated with a correspondingly D-shaped hole 298 of the cam 274. Thus, rotation of the output shaft 296 rotationally drives the cam 274 about the axis C.

As the cam 274 rotates, the photo-interrupter 322 on the cam 274 also rotates therewith, alternately breaking the beam(s) of light emitted by the optical switch 320. The microprocessor of the PCB 310 may count the resulting electrical pulses generated by the optical switch 320. In this manner, the PCB 310 and the microprocessor can determine and/or maintain data representing the rotational position of the cam 274. Since the eccentric surface, i.e., the fourth portion 282 of the cam 274, and the third bearing 284 carried thereby along with the ball bearing 284, are eccentrically positioned relative to the rotational axis C of the cam 274, rotation of the cam 274 causes the ball bearing 284 to rotate about and translate relative to the rotational axis C. As the cam 274 rotates, the bearing 284 will come into contact with the first end 242 of the isolator 222. As the cam 274 continues to rotate, the ball bearing 284 will force the isolator 222 from the closed or isolation position shown in FIGS. 7A and 9A to the open position shown in FIGS. 7B and 9B. In this example, while the ball bearing 284 pushes the isolator 222, sliding is limited between the outer race of the ball bearing and the first end 242 of the isolator. In this example, there is also minimal sliding between the inner race of ball bearing 284 and the cam 274. The lack of sliding, which is created by the bearing being carried on the cam 274 and being positioned at the contact point with the isolator 222, eliminates the substantial majority, if not all, sliding friction that would result. This component arrangement greatly reduces the amount of energy required of the battery 360 and gearmotor 290 to open the valve 220.

Further, since the microprocessor of the PCB 310 may count pulses from the optical switch 320, the microprocessor can recognize when the valve 220 is nearly fully open (by noting the rotational position of the cam 274). The microprocessor can thus be programmed to manage the power flow or delivery to the motor 292, such as by using a proportional-integral-derivative or PID control algorithm. Doing so can result in the motor 292 being stopped when the valve 220 is fully open. Once the valve 220 is open, the rider may vertically position the saddle 56 in the manner as previously described, either by putting weight on the saddle 56 to lower it, or by removing weight from the saddle to allow it to rise. Once the saddle 56 is in the desired position, the rider may release the actuator or button on the wireless actuator 260 at the handlebars 54. This will send a wireless signal to the PCB 310 to close the valve 220 and move the isolator 222 to the closed position. The wireless signal is received by the radio chip on the PCB 310, is processed by the microprocessor, and then the motor 292 is controlled to rotate the cam 274 to move the ball bearing 284 away from and out of contact with the first end 242 of the isolator 222. This will allow the previously described system fluid pressure to force the isolator 222 to return from the open position shown in FIGS. 7B and 9B to the closed position of FIGS. 7A and 9A. As the cam 274 rotates and nears the above-described home position, the microprocessor may count electrical pulses from the optical switch 320. The microprocessor may then manage the power flow or delivery to the motor 292 using a PID control algorithm such that the motor stops when the cam 274 is in the home position with the valve 220 closed. The saddle 56 will then remain in the position it maintained at the time the valve 220 closed.

Figure 32:
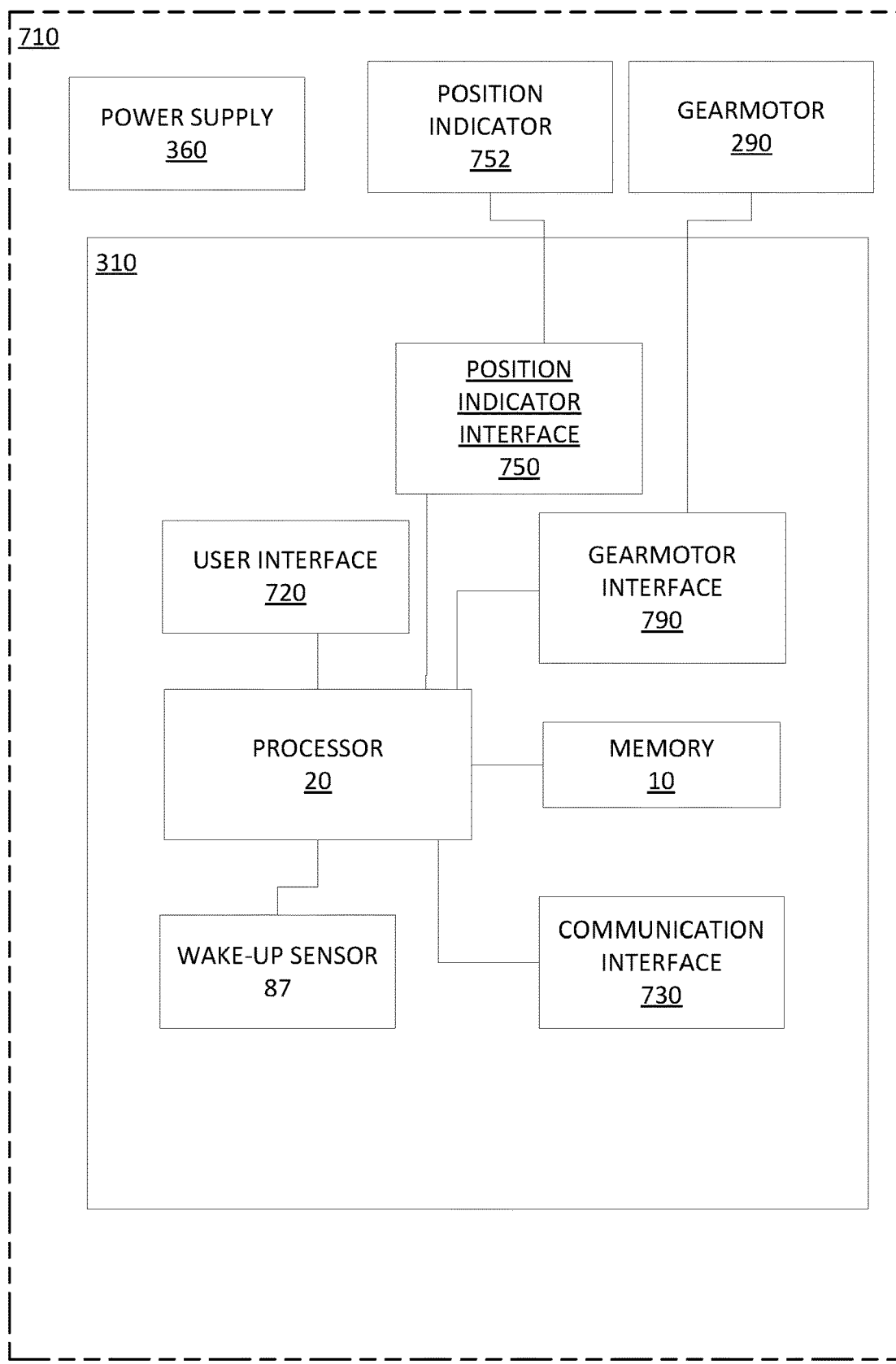
FIG. 32 shows a block diagram of the electronic portion of the seat post assembly.

A block diagram illustrating the components of the electronic portion, or electronic apparatus 710, is displayed in FIG. 32. The PCB 310 includes a processor 20, memory 10, and a communication interface 730. The PCB 310 may also include or be communicatively coupled to a wake-up sensor 87, a user interface 720, a position indicator interface, and/or a gearmotor interface 790. The processor 20 also refers to the microprocessor as described herein, and may include a general processor, digital signal processor, an application specific integrated circuit (ASIC), field programmable gate array (FPGA), analog circuit, digital circuit, combinations thereof, or other now known or later developed processor. The processor 20 may be a single device or combinations of devices, such as through shared or parallel processing.

The memory 10 may be a volatile memory or a non-volatile memory. The memory 10 may include one or more of a read only memory (ROM), random access memory (RAM), a flash memory, an electronic erasable program read only memory (EEPROM), or other type of memory. The memory 10 may be removable from the apparatus 710, such as a secure digital (SD) memory card. In a particular non-limiting, exemplary embodiment, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored. The memory is used to store instructions for the processor 20.

The memory 10 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The power supply 360 is a portable power supply, such as the battery described as part of embodiments described herein. The power supply may involve the generation of electric power, for example using a mechanical power generator, a fuel cell device, photo-voltaic cells, or other power generating devices. The power supply may include a battery such as a device consisting of two or more electrochemical cells that convert stored chemical energy into electrical energy. The power supply 360 may include one battery or a combination of multiple batteries or other power providing devices. Specially fitted or configured battery types, or standard battery types such as CR 2012, CR 2016, and/or CR 2032 may be used.

The communication interface 730 provides for data and/or signal communication from the apparatus 710 to another component of the bicycle, such as one or more wireless actuators, or an external device such as a mobile phone or other computing device. The communication interface 730 communicates the data using any operable connection. An operable connection may be one in which signals, physical communications, and/or logical communications may be sent and/or received. An operable connection may include a physical interface, an electrical interface, and/or a data interface. The communication interface 730 is configured to communicate wirelessly, and as such includes one or more antennae or radio device. The communication interface 730 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth®, ANT+™, ZigBee, WiFi, and/or AIREA™ standards may also, or alternatively, be used. Accordingly, replacement standards and protocols having the same or similar functions as those disclosed herein are considered equivalents thereof. In an embodiment, the communication interface 730 may be configured to transmit a signal indicative of a determined and/or detected pedaling state of a bicycle drivetrain. Further, the determined pedaling state may be transmitted wirelessly.

The gearmotor interface 790 provides for data and/or signal communication the gearmotor 290 to the circuitry of the PCB 310. The interface 790 communicates using wired techniques. For example, the interface 790 communicates with the gearmotor 290 using a system bus, or other communication technique. The interface 790 may include additional electric and/or electronic components, such as an additional processor and/or memory for detecting, communicating, and/or otherwise processing signals of the gearmotor 290. In an embodiment, a dedicated and distinct gearmotor interface 790 may not be used, but the processor 20 may be configured to control, read, and/or process the gearmotor signals, thus integrating the gearmotor interface 790 with the processor 20 in whole or in part.

The apparatus 710 may also include a position indicator 752 of the gearmotor 290 or gearing coupled thereto, such as the optical switch 320 described herein. The position indicator interface 752 provides for data and/or signal communication from the position indicator 752 to the circuitry of the PCB 310. The interface 750 communicates using wired techniques. For example, the interface 750 communicates with the position indicator 752 using a system bus, or other communication technique. The interface 750 may include additional electric and/or electronic components, such as an additional processor and/or memory for detecting, communicating, and/or otherwise processing signals of the position indicator 752. In an embodiment, a dedicated and distinct position indicator interface 750 may not be used, but the processor 20 may be configured to control, read, and/or process the gearmotor signals, thus integrating the position indicator interface 750 with the processor 20 in whole or in part.

The user interface 720 may be one or more buttons, lights, or other device or component for communicating data between a user and the apparatus 710. The user interface 720 may include a liquid crystal display ("LCD") panel, light emitting diode ("LED"), LED screen, thin film transistor screen, or another type of display or light emitting devices. The user interface 720 may also include audio capabilities, or speakers.

In an embodiment, the user interface 720 includes an LED indicator, such as the LED 350 described herein. The LED indicator lights to indicate input of the commands or other actions of the apparatus 710.

In an embodiment, the apparatus 710 and/or the PCB 310 may include a wake-up sensor 87, which also may be used to conserve the power supply 360. The wake-up sensor 87 may be configured to detect motion and to provide power to the processor 20 and/or other components once such motion has been detected. One example of the wake-up sensor may include a ball-in-cage-type switch, where movement of the ball within a conductive cage causes the ball to contact the cage and complete a circuit. In another example the wake-up sensor may be a tilt sensor. It also is contemplated that other types of wake-up sensors may be used as well, for example single or multiple axis accelerometers may be used. In an embodiment using an accelerometer as a wake-up sensor, a threshold value from the accelerometer indicative of bicycle use may be used to determine whether to provide power to apparatus 710 components.

In this manner, the processor 20 may consume power very little to no power unless the apparatus 710 detects motion, and the antenna may not consume power unless the apparatus 710 determines that that motion corresponds to pedaling as opposed to some other cause.

In accordance with various embodiments of the present disclosure, methods described herein may be implemented with software programs executable by a computer system, such as the circuitry included on the PCB 310. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or an apparatus 710 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Other examples of the rider interface, pairing procedure, wireless signal transmission and receiving, and the like are possible within the spirit and scope of the present disclosure. In the above-described example, the rider presses and holds an actuator or button on a wireless actuator to adjust the saddle position, and releases the actuator or button to achieve and maintain the selected position. In one alternative example, the rider may press and release an actuator or button to adjust the vertical position of the saddle and may again press and release the same actuator or button to then hold and maintain a selected saddle position. In another example, the rider may press and release a first actuator to adjust the saddle position and may then press and release a second different actuator to hold and maintain the selected saddle position.

Other aspects, features, and components of the disclosed seat post assembly 80 may also be modified within the spirit and scope of the present disclosure. In one example, the electronics module may include hard stops on one or more of the parts to limit the rotations travel of the cam and/or motor. In one example, the motor support bracket and cam may each include a hard stop element.

Figure 20:
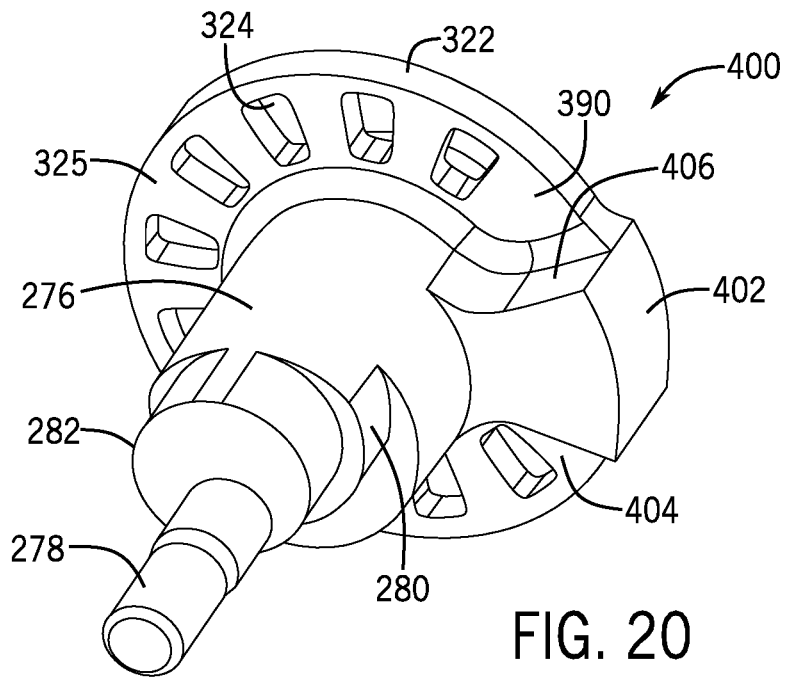
FIG. 20 shows a perspective view of one alternative example of a cam for the seat post assembly and constructed in accordance with the teachings of the present disclosure.

As shown in FIG. 20, a cam 400 is illustrated and which is substantially the same as the cam 274 described above. In this example, like reference numerals denote like parts in comparing the two cams. The cam 400 can include a stop projection 402 with opposed stop surfaces 404, 406. The stop surfaces 404, 406 may be configured to face in opposite circumferential directions. In this example, the stop projection 402 protrudes radially relative to a first co-axial portion 276 and protrudes axially from a bottom of the disc shaped photo-interrupter 322.

Figure 21:
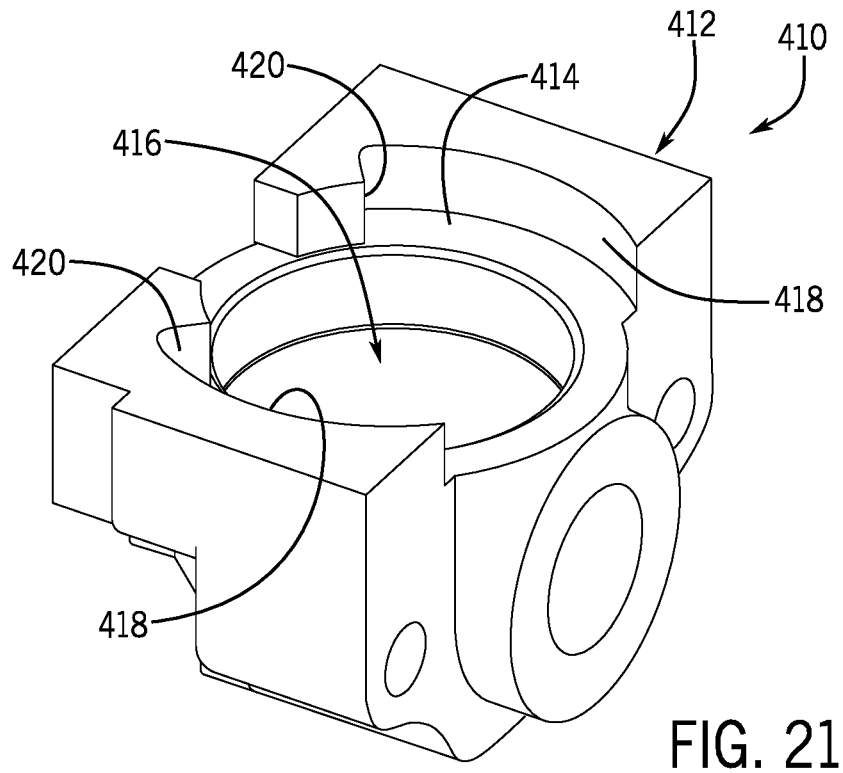
FIG. 21 shows a perspective view of one alternative example of a cam bearing housing for the seat post assembly and constructed in accordance with the teachings of the present disclosure.

As shown in FIG. 21, a bearing housing 410 is illustrated and which is substantially similar to the bearing housing 262 described above. In this example, like reference numerals denote like parts in comparing the two motor support brackets. The bearing housing 410 can include an upper portion 412 modified to include a ledge 414 surrounding a central opening 416 through the housing and which would receive the cam 400 and associated bearings 270, 272, and 284 described above. The ledge 414 can be configured so that the stop projection 402 on the cam 400 can ride along the ledge 414 as the cam rotates. The bearing housing 410 also had two guide walls 418 projecting up adjacent the ledge 414 and disposed opposite one another across the housing. A pair of stops 420 are closely spaced apart from one another on one side of the ledge 414 and the guide walls 418. The two stops 420 protrude up from the ledge 414 and are positioned so as to contact a respective one of the stop surfaces 404, 406 as the stop projection rotates around the ledge and depending on the rotational position of the cam 400.

Figure 22A:
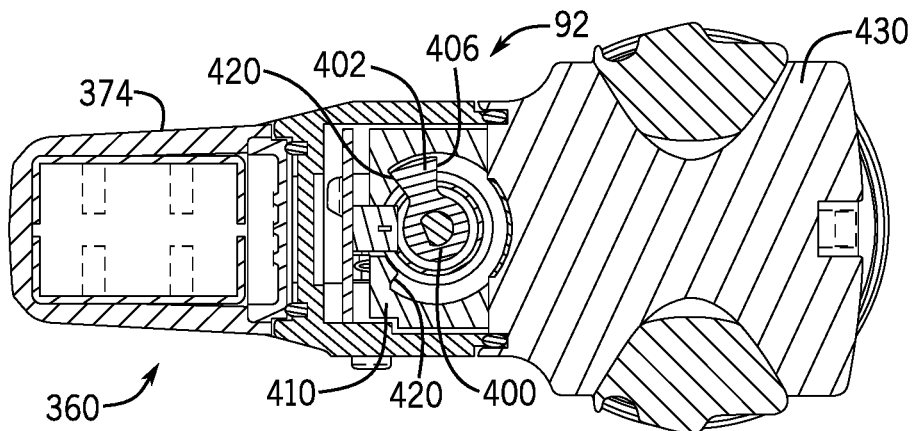
FIGS. 22A-22C show cross sectional view taken through a seat post head that is similar to that depicted in FIGS. 9A and 9B but modified to include the cam of FIG. 20 and the bearing housing of FIG. 21.
Figure 22B:
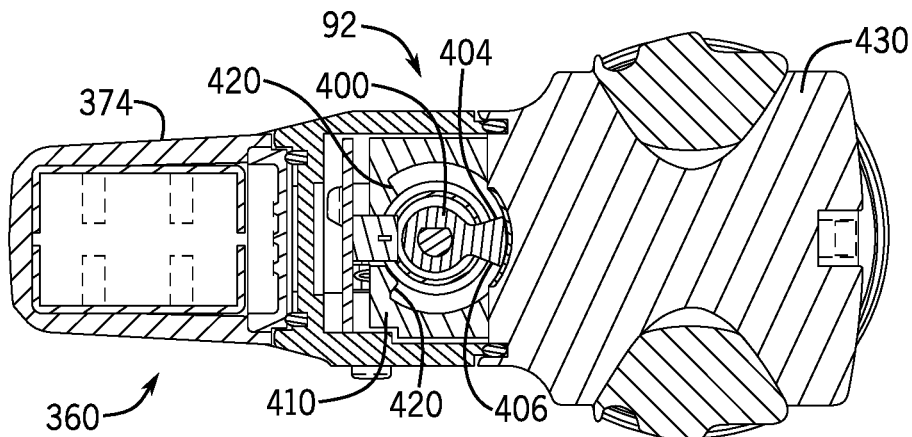
Figure 22C:
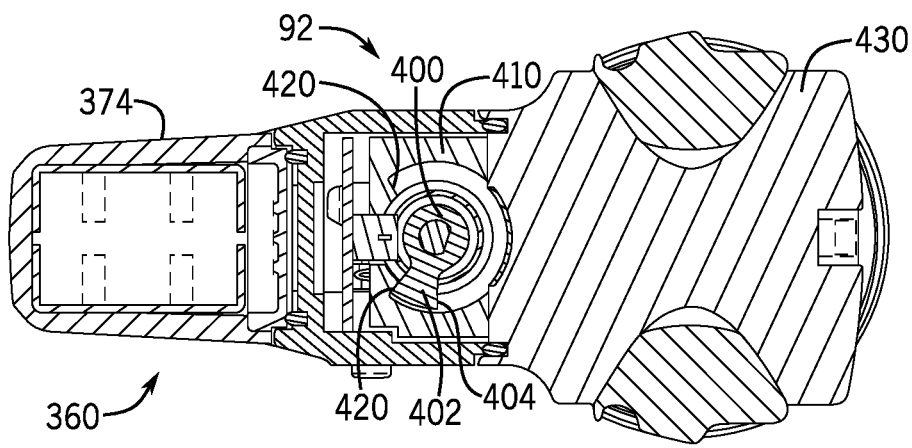

FIGS. 22A-22C depict cross sectional views of a head 430, which has been modified to include the cam 400 and the bearing housing 410. FIG. 22A shows the cam in a home position, rotated so that the isolator (not shown) is closed and not in contact with a portion of the cam. In this position, the stop surface 404 of the stop projection 402 on the cam 400 contacts one of the stops 420 on the ledge 414. FIG. 22B shows the cam 400 and stop projection 402 in an intermediate position rotated away from the home position. FIG. 22C shows the cam 400 fully rotated to a valve open position whereby the stop surface 406 of the stop projection 402 abuts the other stop 420 protruding up from the ledge 414. Hard stops, such as those disclosed in FIGS. 20, 21, and 22A-22C may be incorporated as a back-up to or as a fail-safe mode for the above described example of the operating procedure of the electronics module 92. Alternatively, such hard stops may be incorporated to allow the componentry of the module and the programming of the microprocessor on the PCB 310 to be simplified. The hard stops can be used to stop the motor 292 rotating in either direction instead of or in addition to the optical switch 320.

The addition of hard stops to the electronics module 92 is only one of many possible modifications that one may make to the configuration, construction, and operation of the seat post assembly 80. Other changes to the operating procedures and components may also be made within the spirit and scope of the present disclosure.

Figure 23:
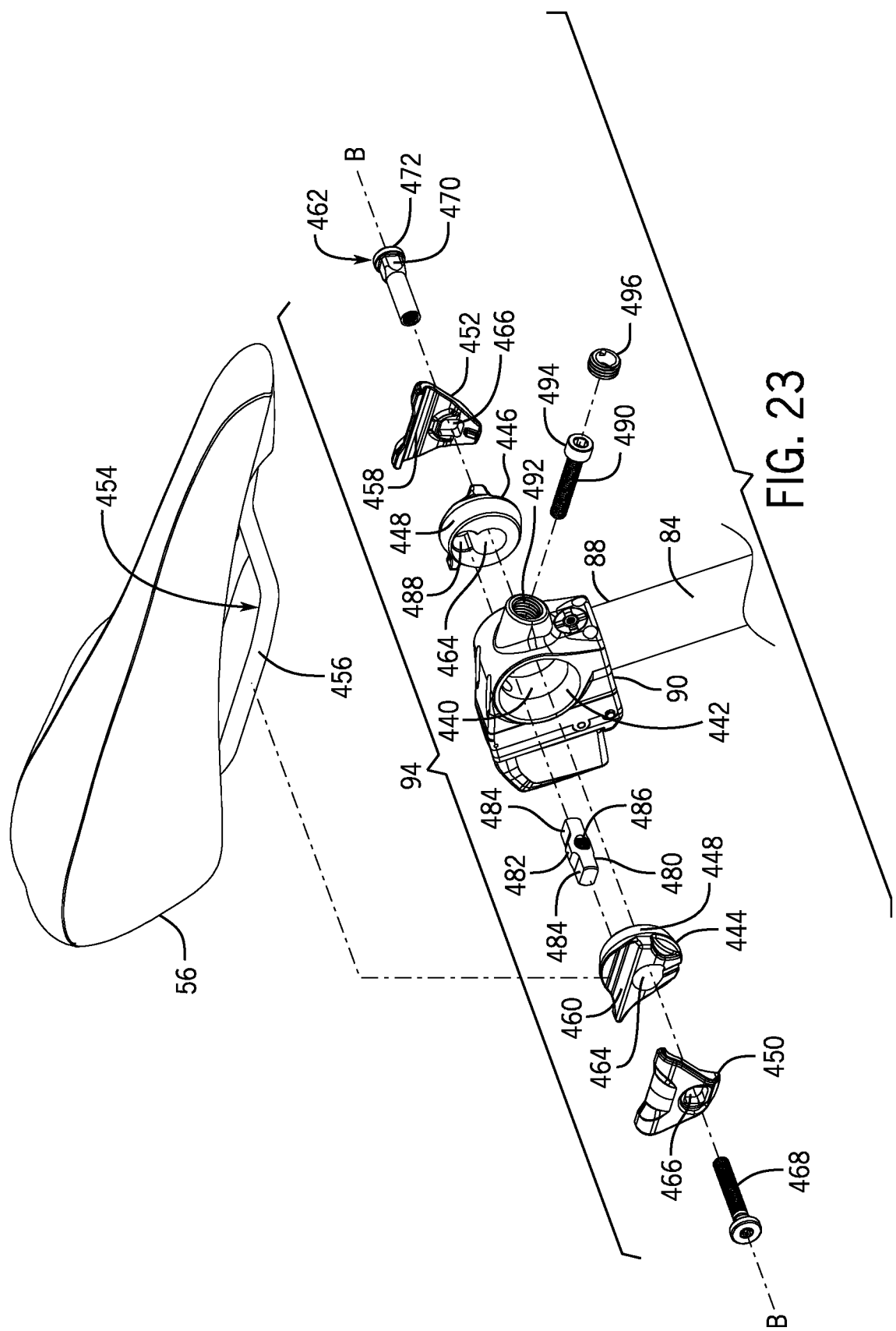
FIG. 23 shows a partial exploded view of the head of the seat post assembly of FIG. 2 and constructed in accordance with the teachings of this disclosure.

Referring to FIGS. 2 and 23, the saddle 56 is fixedly attached to the head 90. In one example, the head 90 may be constructed to allow a rider to further adjustment the saddle position, other than just the saddle height relative to the bicycle frame 52, as described above. In this example and referring to FIGS. 23-25, the head 90 is configured to include the afore-mentioned saddle clamp mechanism 94. In this example, the head 90 has a relatively large through bore 440 extending transversely through the head and forward of the electronics module 92. A bearing surface 442 leading into the through bore 440 on each side of the head 90 are tapered or cone-shaped. Each bearing surface 442 of the through bore 440 tapers gradually to a smaller diameter moving from the outside of the head 90 to the interior of the head. A first or right side cap 444 and second or left side cap 446, respectively, are configured to seat in and cover or cap off a corresponding side of the through bore 440 on the head 90. Each cap 444, 446 has a male conical or tapered surface 448 that is shaped or contoured to correspondingly engage the respective bearing surface 442 on the corresponding side of the through bore 440.

Figure 24:
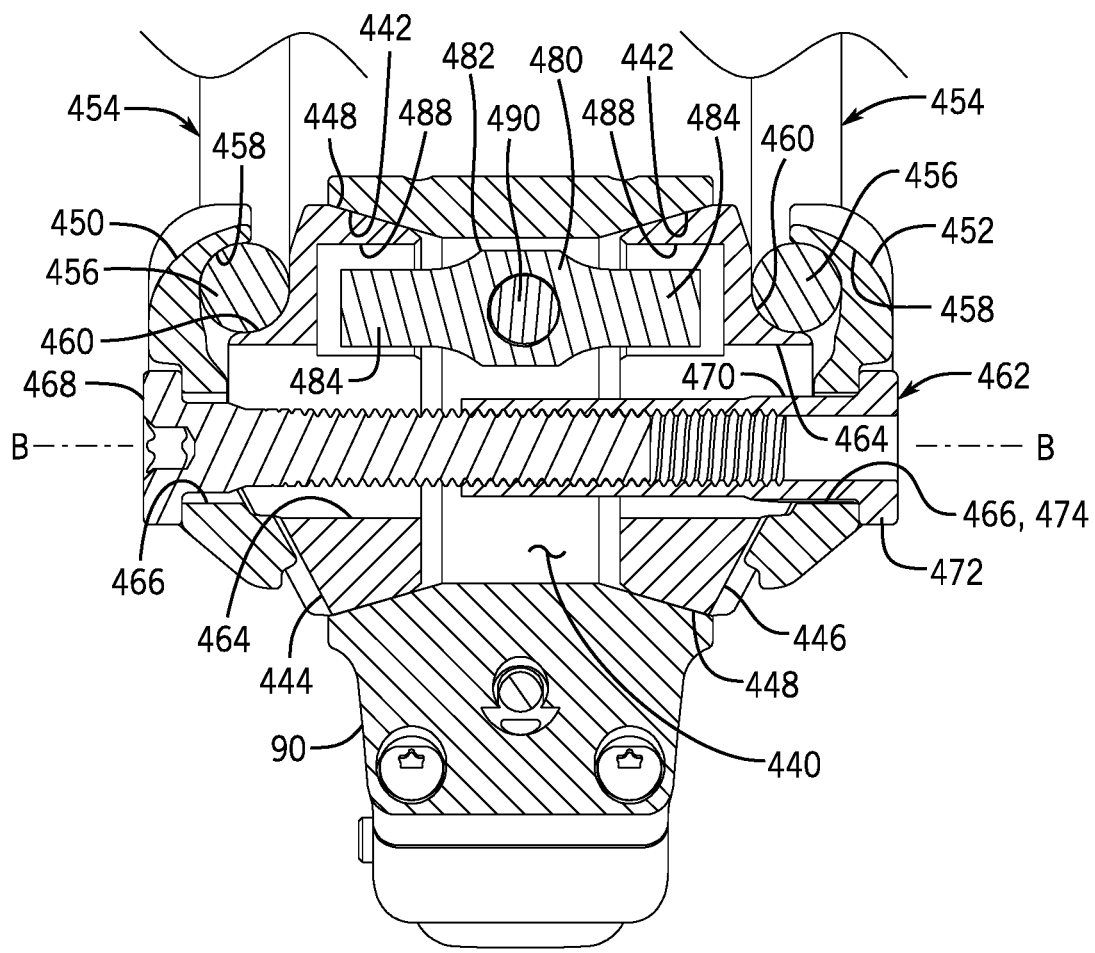
FIG. 24 shows a cross-sectional view taken along line 24-24 of the seat post head of FIG. 2.

Still referring to FIGS. 2 and 23, a first or right side clamp 450 and a second or left side clamp 452 are located immediately outboard of the respective first and second clamps 450, 452. The saddle 56 has a pair of rails 454 that extend lengthwise along and under the saddle. The rails 454 are spaced apart widthwise from one another, as shown in FIGS. 23 and 24, and each has a substantially linear segment 456, as shown in FIG. 2. One of the rails 454 is captured between the first clamp 450 and the first cap 444 on the right side of the head 90 and the other of the rails is captured between the second clamp 452 and the second cap 446 on the left side of the head. As depicted in FIGS. 23 and 24, each of the clamps 450, 452 has a linear groove 458 with a semi-circular cross-section shape. Each of the caps 444, 446 has a corresponding linear groove 460 with a semi-circular cross-section. With the clamps installed, as described below, each linear segment 456 of each of the rails 454 resides within one of the pairs of the grooves 458, 460 and are clamped thereby.

Figure 25:
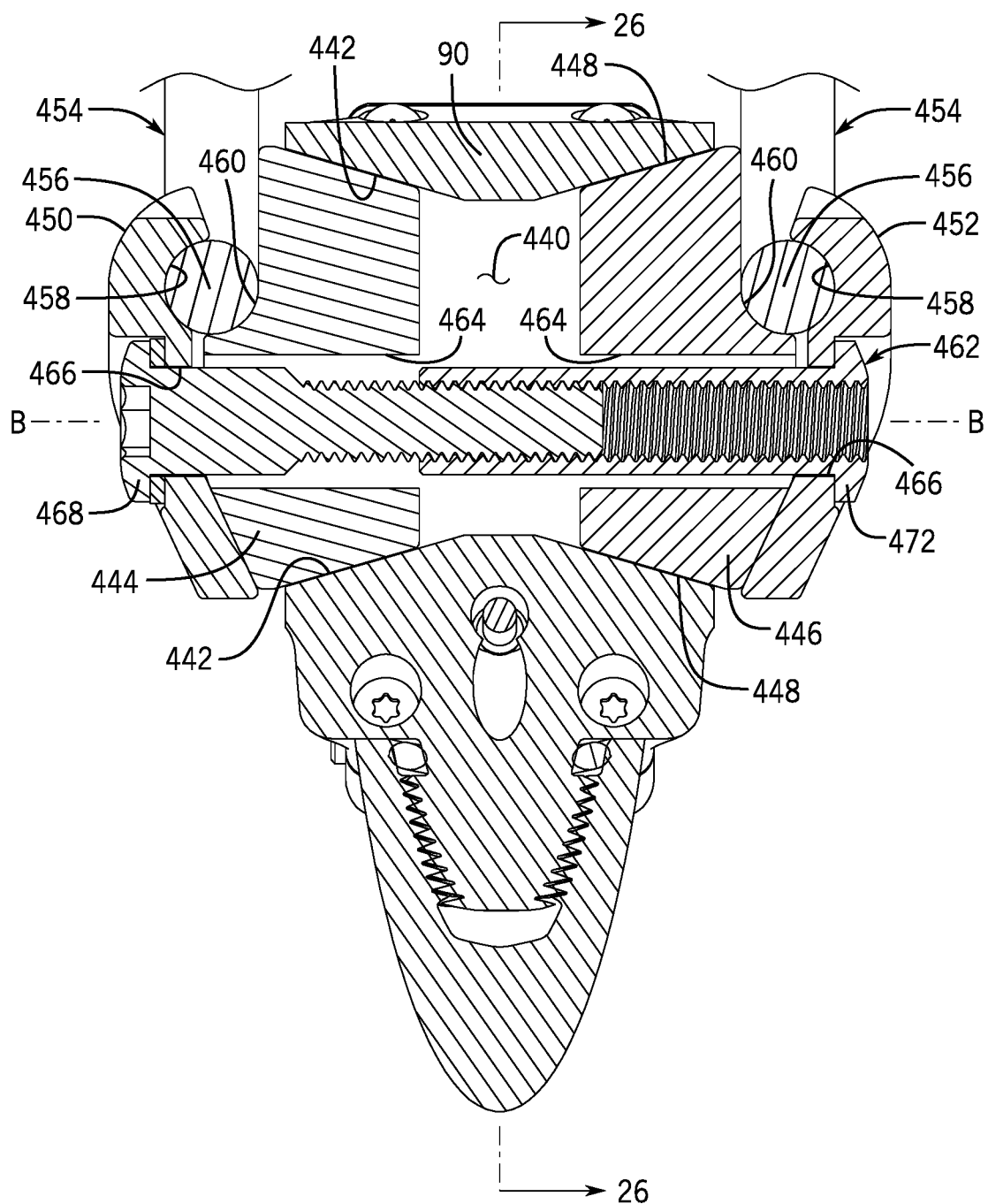
FIG. 25 shows a cross-sectional view taken along line 25-25 of the seat post head of FIG. 6B, and depicting the saddle mounting and tilt adjust hardware.

Referring to FIGS. 23-25, a seat clamp nut 462 is received through aligned holes 464, 466 in the second cap 446 and the second clamp 452, respectively. A seat clamp bolt 468 is likewise received through aligned holes 464, 466 in the first cap 444 and the first clamp 450, respectively. The seat clamp bolt 468 has male threads that engage like female threads within the seat clamp nut 462. The bolt 468 and nut 462 can be loosely secured to hold the components, i.e., the clamps 450, 452 and caps 444, 446 to the head 90 and to hold the rails 454 between the clamps and caps. While loosely connected, the rider may adjust the fore-aft and/or tilt positions of the saddle 56.

Figure 26A:
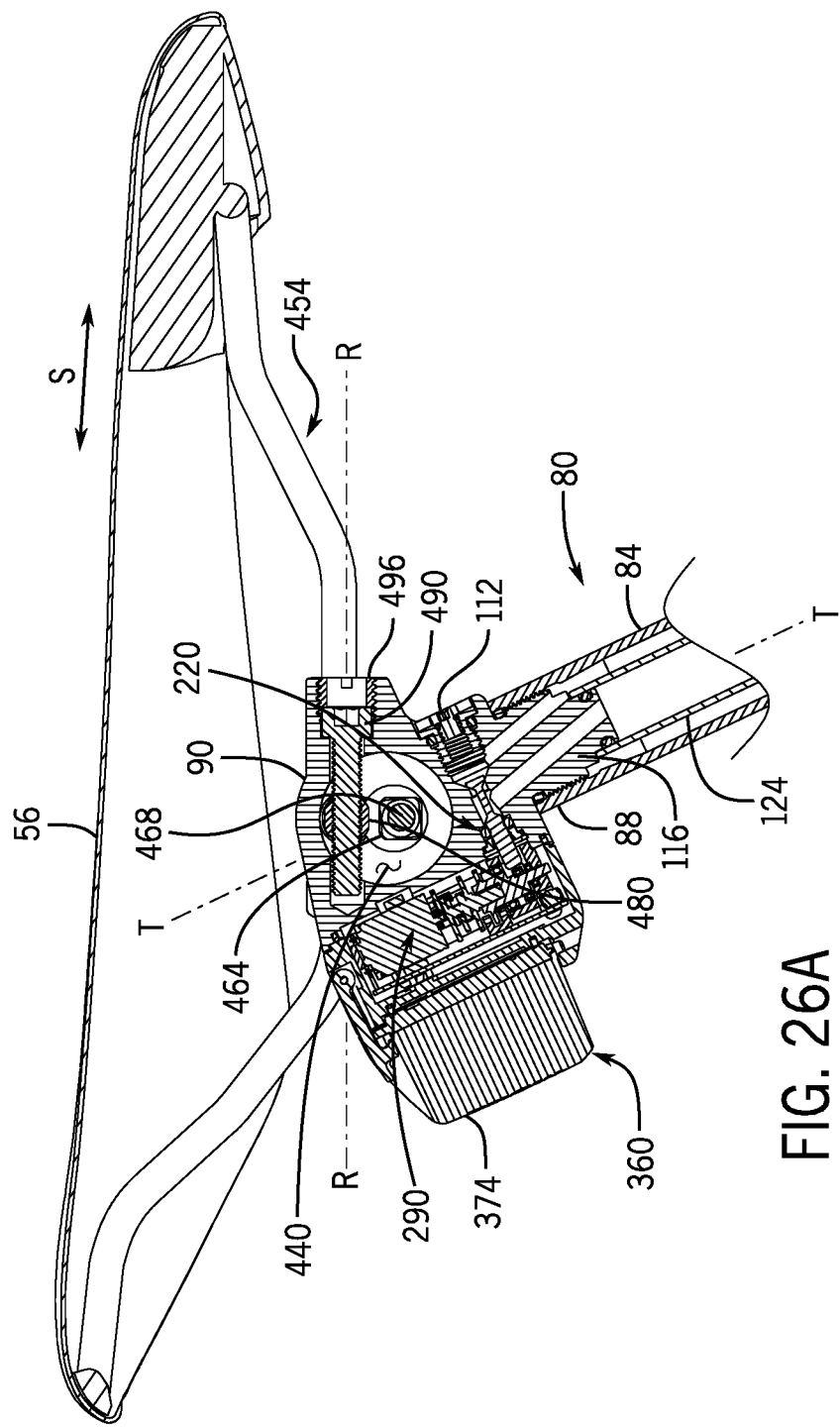
FIGS. 26A-26C shows, in part, cross-sectional views taken along line 26-26 of the seat post head of FIG. 25, but also including the upper portion of the seat post assembly and the saddle shown in FIG. 2, and depicting the saddle in various states of tilt adjustment.
Figure 26B:
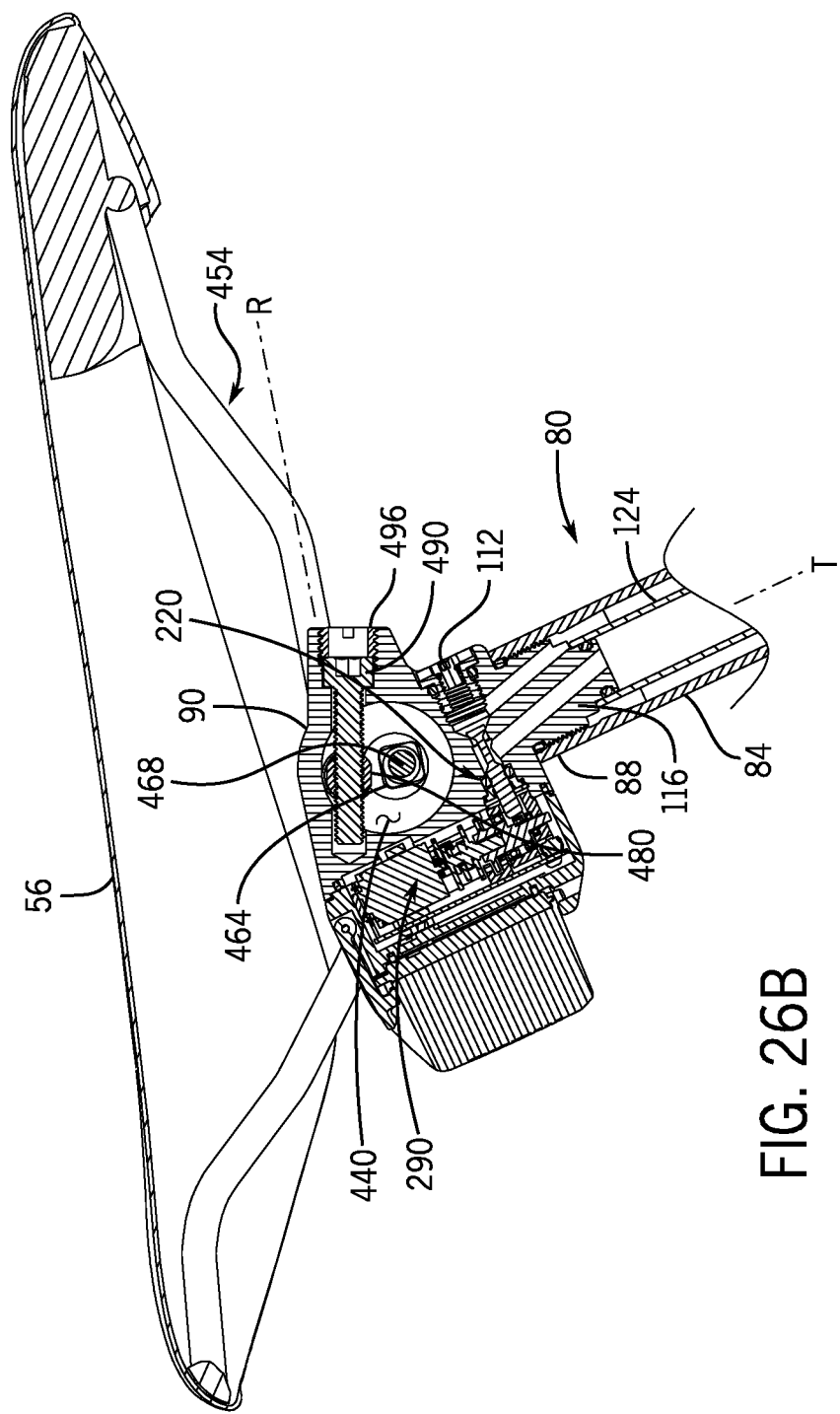
Figure 26C:
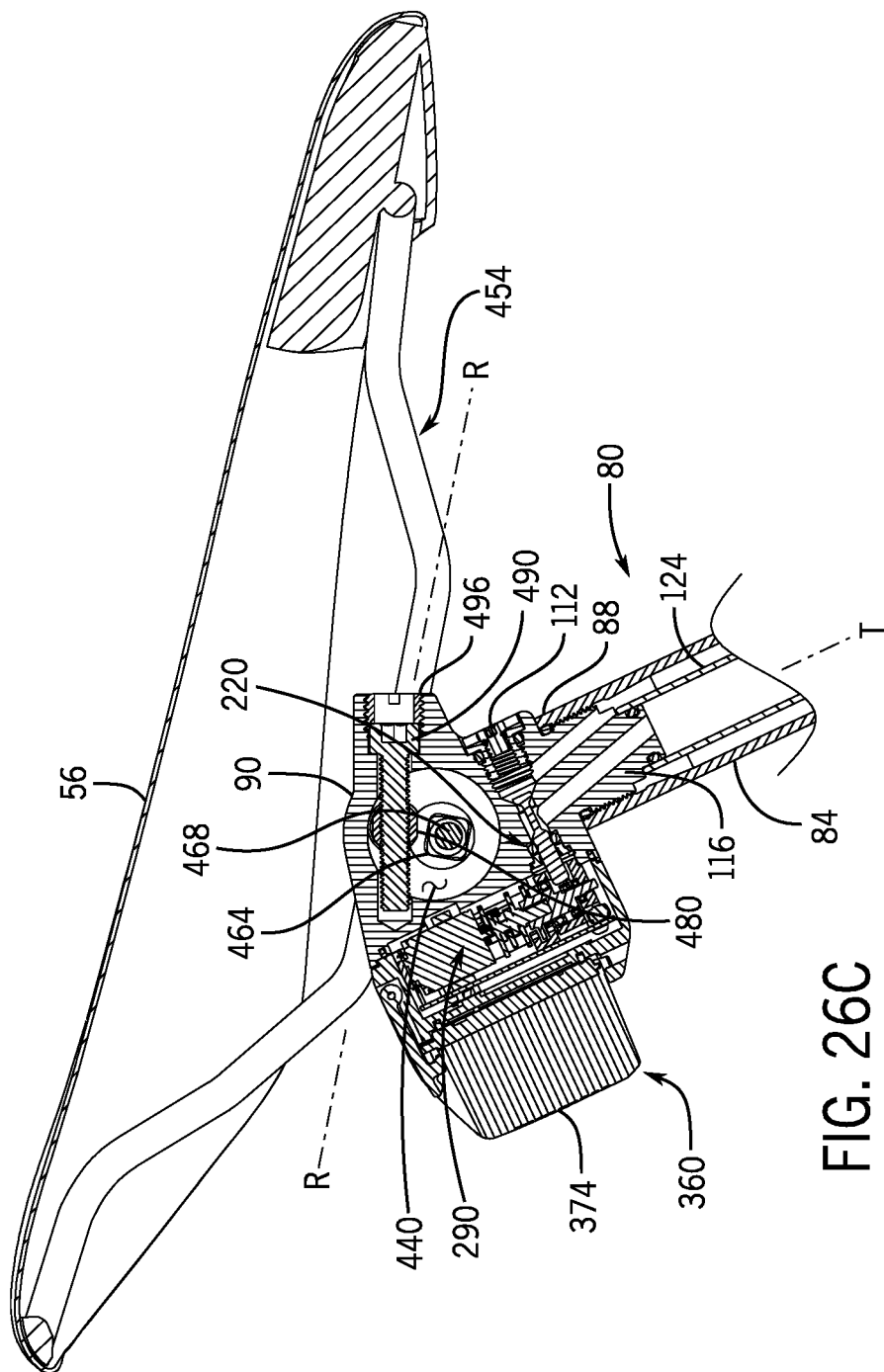

The saddle 56 can be adjusted in a linear fore-aft direction along an axis R of the rails 454. The rider can simply push or pull the saddle in the direction of the rail axes and slide the saddle to a desired fore-aft position in the direction of the arrows S in FIG. 26A. Additionally, the saddle 56 and rails 454, along with the first and second clamps 450, 452 and first and second caps 444, 446, can be rotated as a unit about a transverse axis B defined by the through bore 440 across the head 90. The tapered surfaces 448 on the caps 444, 446 can rotate relative to the bearing surfaces 442 on the head 90 within the through bore. By doing so, the rider can adjust the forward or rearward angle or tilt angle of the saddle, such as to a level position (FIGS. 26A and 27A), a rearward tilted position (FIGS. 26B and 27B), a forward tilted position (FIGS. 26C and 27C), or any number of intermediate positions. The manner that the rider may use to rotate the caps to adjust the tilt angle of the saddle 56 is described in further detail below. Once the rider has adjusted both the axial or fore-aft position and the rotational or tilt position of the saddle 56 to the desired position(s), the rider may tighten the seat clamp bolt 468. The combination of the bolt 468 and seat clamp nut 462 can apply a large compressive force across the head 90. The force can fully seat the caps 44, 446 in the bearing surfaces 442, the clamps 450, 452 over the caps, and the rails 454 within the grooves 458, 460, thus fixing the saddle 56 in place relative to the head 90.

The seat clamp nut 462 can have a square section 470, such as directly adjacent a nut head 472, as shown in FIG. 23. The square section 470 can seat in a like square shaped receptacle portion 474 in the hole in the clamp 452. The respective square shapes of the section 470 and portion 474 can combine to prevent the nut from rotating as the seat clamp bolt 468 is tightened.

The head 90 also includes a mechanism to assist in adjusting the tilt angle of the saddle 56. As shown in FIGS. 23, 24, and 27A-27C, the head 90 can also include a cross-dowel 480. A body 482 of the cross-dowel 480 is cylinder-like but has a non-circular cross-section. In one example, the body 482 may be a cylinder near the middle but may have a double-D shape with flats, or another non-round shape, at each of its two ends 484. The middle part has a threaded adjuster hole 486 that is oriented perpendicular to the length of the body 482. A first of the ends 484 of the cross-dowel 480 engages a hole 488 in the first cap 444. A second of the ends 484 of the cross-dowel 580 engages a hole 488 in the second cap 446.

Figure 27A:
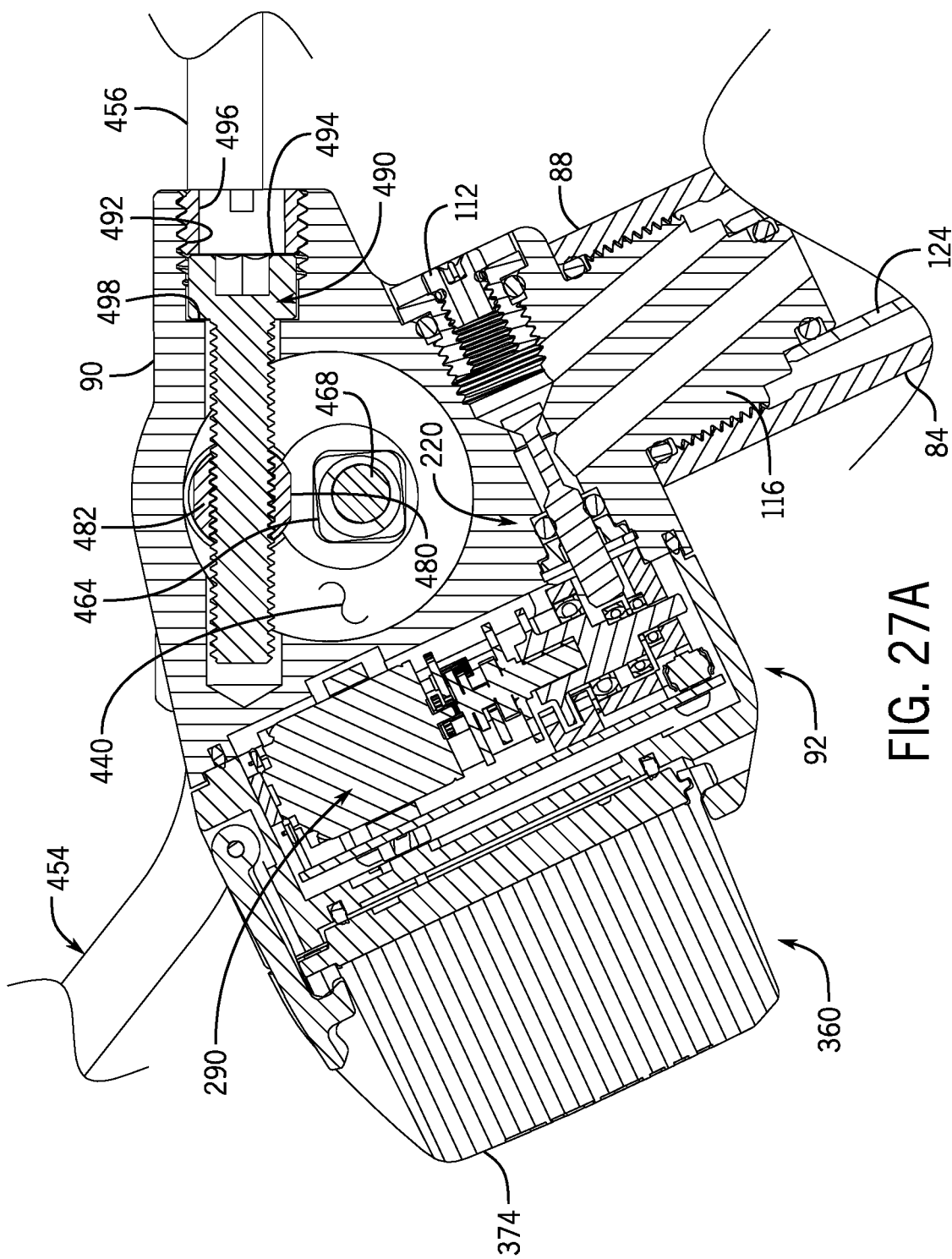
FIGS. 27A-27C show enlarged close-up views of the seat post head of FIGS. 26A-26C, respectively.
Figure 27B:
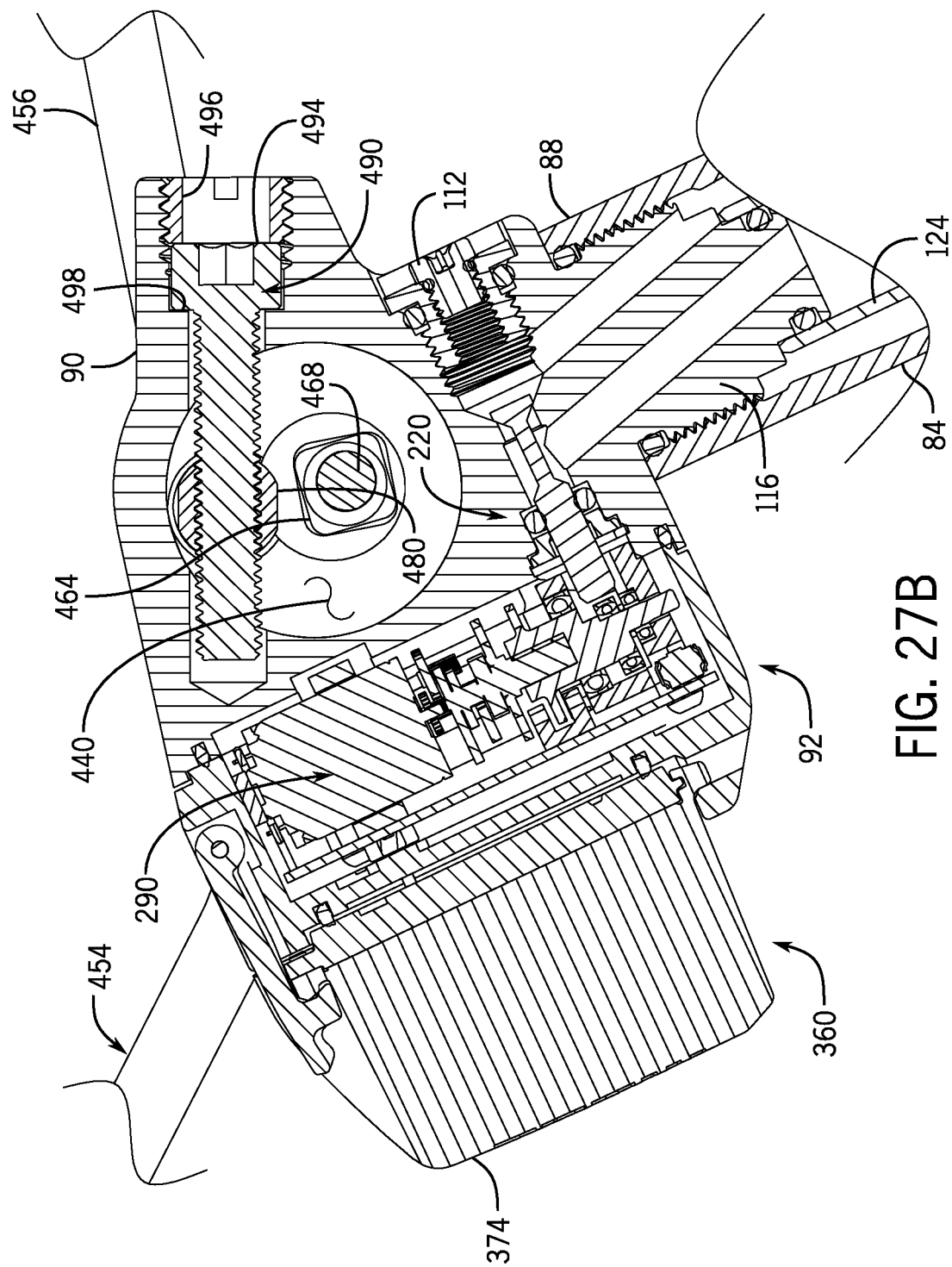
Figure 27C:
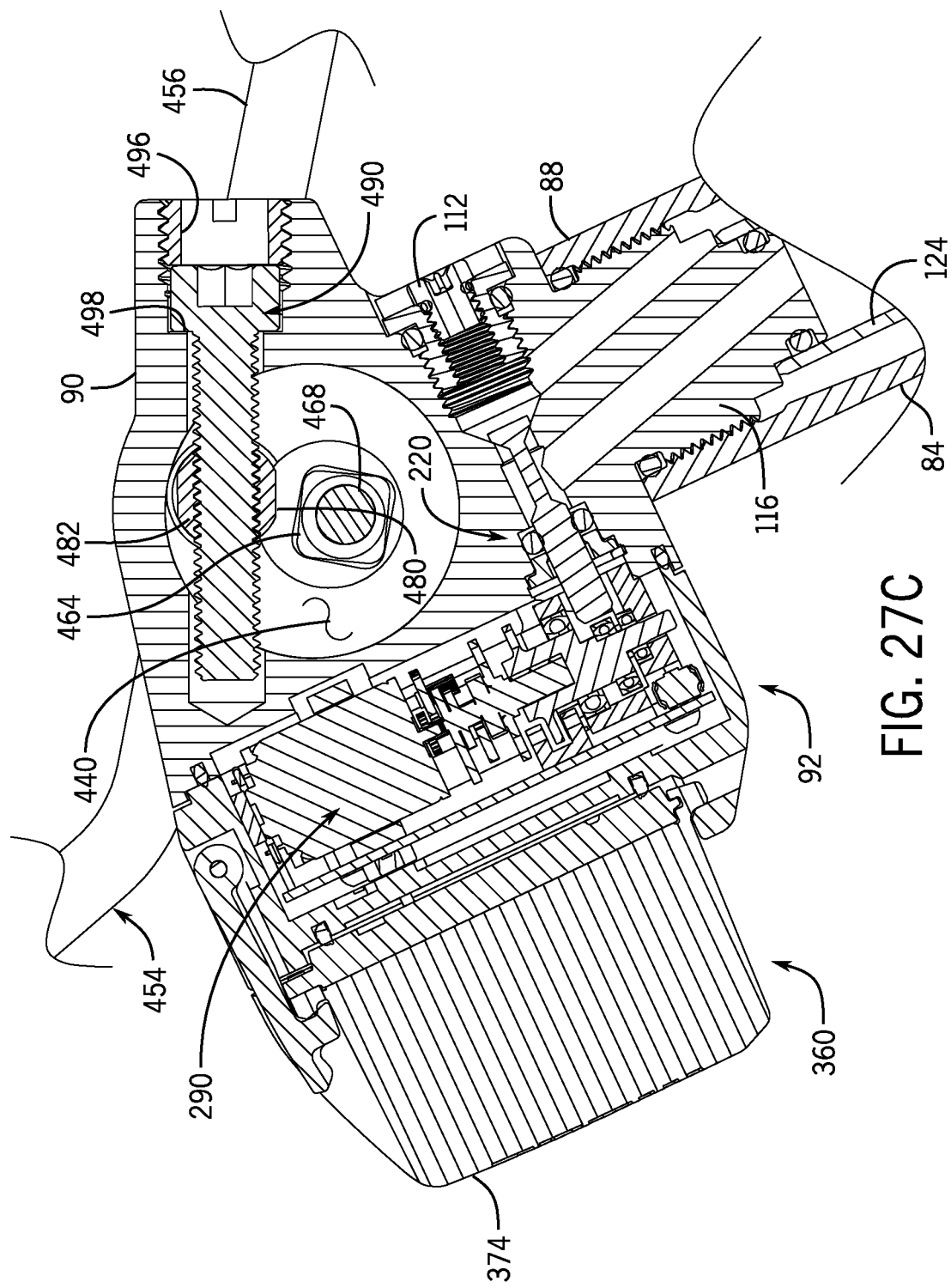

An adjuster bolt 490 is received through an install hole 492 in a front of the head 90, as depicted in FIGS. 23 and 27A. The adjuster bolt 490 is threaded into the adjuster hole 486 in the cross-dowel 480. The install hole 492 is also threaded but has a diameter large enough to loosely pass the adjuster bolt 490, including its bolt head 494 into the head 90. Instead, a retainer 496 is threaded into the install hole 492, as shown in FIG. 27A. For the adjustment mechanism to function properly, the retainer 496 is assembled, i.e., installed to a depth wherein it does not quite contact or "bottom out" on the bolt head 494 of the adjuster bolt 490. For example, during assembly, the retainer 496 may be threaded into the install hole 492 contacts the bolt head 494, but can then be reversed or "backed off" slightly such that the retainer no longer contacts the bolt head. In one example, the retainer 496 may be installed and held in place with a commercially available thread-locking compound such as LOCTITE "Threadblocker Blue 242" adhesive. The cross-dowel 480, adjuster bolt 490, and retainer 496 my preferably be pre-installed in the head 90 at the factory. Unlike other parts in the head 90 assembly, the cross-dowel 480, adjuster bolt 490, and retainer 496 may not be intended to be removed from the head 90 by the user during normal use.

The operation of the tilt adjuster mechanism is as follows. Again, the rider can loosely install the caps 444, 446 and clamps 450, 452 onto the head 90, as described above. In doing so, the hole 488 in each clamp 450, 452 will engages the corresponding exposed end 484 on the cross-dowel 480. The holes 488 in the clamps 450, 452 and the ends 484 on the cross-dowel 480 should be cooperatively configured so as to permit some play or clearance between the ends and the holes, both laterally and rotationally. However, the degree of play or clearance should still maintain the general lateral position and rotational orientation of the cross-dowel having the adjuster bolt 490 and adjuster hole 486 loosely centered within the head 90 and directed generally forward and rearward. Such increased clearance between the cross-dowel ends 484 and the holes 488 can help prevent over-constraint or binding of the cross-dowel 480.

With the seat clamp bolt 468 still slightly loose, the user then an appropriate tool to turn the adjuster bolt 490. Within the head 90, the bolt head 494 is loosely constrained or captured in its axial direction between a step or shoulder 498 within the install hole 492 and the retainer 496. Thus, the adjuster bolt 490 can essentially only rotate. Thus, as the adjuster bolt 490 is turned, depending on the direction of rotation, the bolt either draws cross-dowel 480 toward the bolt head 494 or pushes the cross-dowel away from the bolt head. Because the ends 484 of the cross-dowel 480 are engaged in the holes 488 in the first and second caps 444, 446, and because the caps are constrained to only rotate about the through bore axis B, the caps will rotate about the axis B as the cross-dowel moves via rotation of the adjuster bolt. More specifically, the first and second caps 444, 446, and, thus, the saddle 56, may rotate clockwise in FIGS. 26A-27C if the rider rotates the adjuster bolt 490 clockwise (in looking directly at the bolt head 494 from the right-hand side of the figures). The caps 444, 446 and saddle 56 may rotate counter-clockwise if the rider rotates the adjuster bolt 490 counter-clockwise (looking directly at the bolt head 494 from the right-hand side in the figures). Because cross-dowel 480 is constrained to move in an arcuate path along with first and second caps 444, 446, the adjuster bolt 490 will pivot slightly at its head. The bolt head 494 should be free to do so, since, as previously described, the retainer 496 is not threaded tightly against bolt head. Further, because the saddle 56, first and second clamps 450, 452, seat clamp nut 462, and the seat clamp bolt 468 are all still loosely held together with the caps 444, 446, these parts also will rotate as the caps rotate. Simply by rotating the adjuster bolt 490, the rider can adjust the angle of the saddle 56 to the desired orientation. Once the desired angle is achieved, and the rider has positioned the saddle 56 axially along the rails 454, as described above, the rider can tighten the seat clamp bolt 468, such as to a specified or desired torque. The saddle 56 is then set to the rider's preferences and ready for use.

Figure 28:
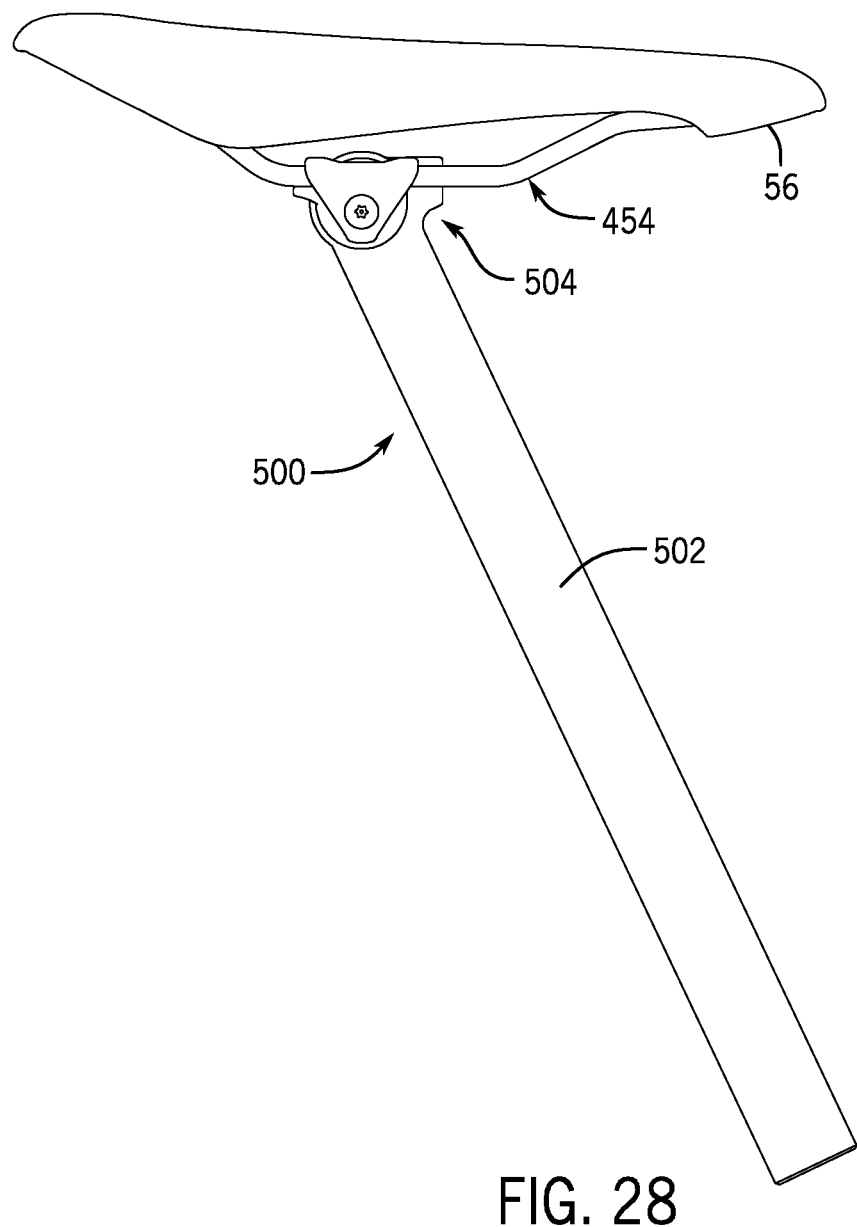
FIG. 28 shows a side view of another example of a portion of a seat post assembly, with a saddle installed thereon, and constructed in accordance with the teachings of this disclosure.
Figure 29:
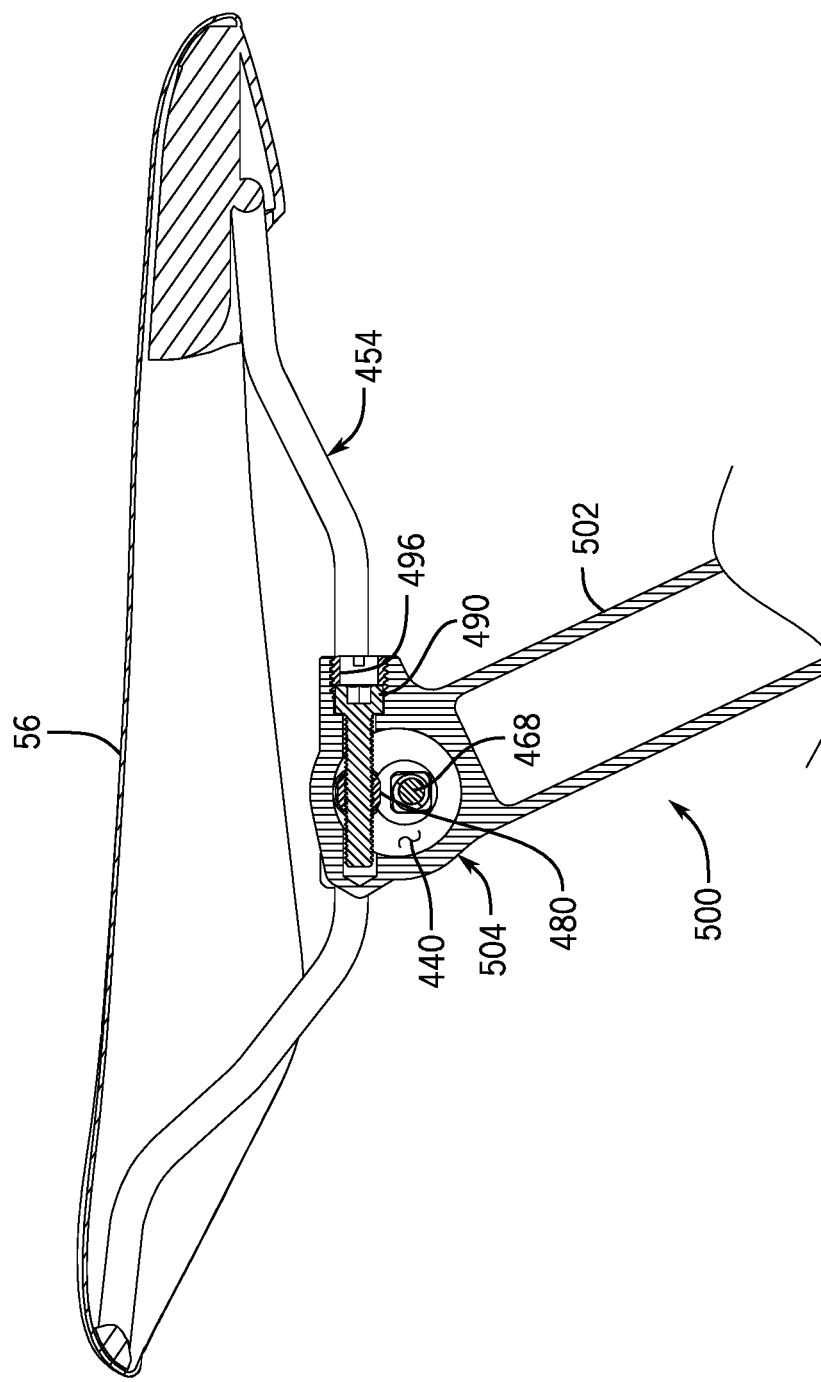
FIG. 29 shows a vertical cross-sectional view of the seat post assembly of FIG. 28.

An alternate example of a seat post assembly 500 is depicted in FIGS. 28 and 29. In this example, the seat post assembly 500 does not include any of the height adjustable components that are described above referring to FIGS. 1-22C. Whereas the seat post assembly 80 included a wireless, electric, height-adjustable seat post, the seat post assembly 500 has a simple, fixed length seat post or tube 502, which may slide up and down directly within a frame tube 89 of a bicycle frame 52 to adjust a saddle height. The parts of the head 504 used in this example for adjusting the saddle tilt angle are identical to the parts used in the previous example described referring to FIGS. 23-27C, with the exception that the head 504 may be integrally formed with the main body of the seat post or tube 502, and does not include any features for accommodating an electronics module 92, a valve 220, or the like. Alternatively, the head 504 may be a separate part that is fixedly attached to the top portion of the seat post or tube 502. The construction, assembly, and installation of the saddle clamp mechanisms are identical to those of the example referring to FIGS. 23-27C. This aspect of the adjustable seat post assembly, therefore, does not rely on or require the presence of electronics or a height-adjustable seat post arrangement in order to work.

Figure 31:
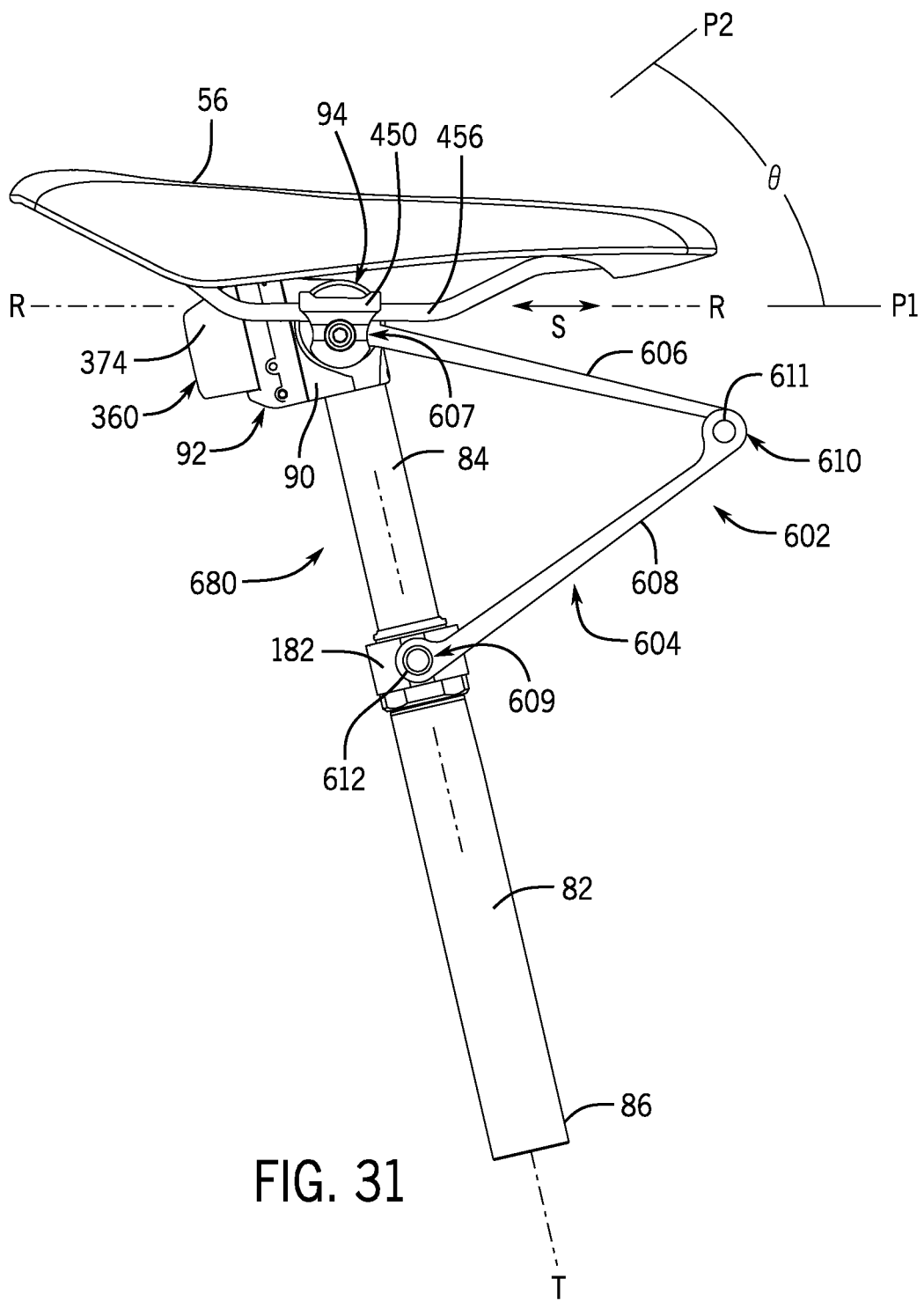
FIG. 31 shows another embodiment of a seat post assembly.

Another alternate example of a seat post assembly 680 is depicted in FIG. 31. This embodiment integrates an automatic seat angle adjustment system 602. In the displayed embodiment the automatic seat angle adjustment system includes a linkage 604. The linkage 604 includes at least an upper link 606 and a lower link 608. The lower link 608 is attached to the collar 182 of the lower tube 82 at a first joint 609. The upper link 606 is attached to the saddle clap mechanism 94 at a second joint 607. The upper link 606 is attached to the lower link 608 at a third joint 610. The first and third joints 609, 610 include friction reducing devices 611, 612 that facilitate relative rotational movement between the attached components, such as bearings or bushings. The second joint 607 includes rotationally fixed attachment to the saddle clamp mechanism 94, but the saddle clamp mechanism is rotatable relative to the head or housing 90. As such, the saddle 56 may be rotatable through an angle θ from a first angular position P1 to a second angular position P2, as correlated through the seat angle adjustment system 602 to the height of the seat along the tube axis T. For example, when the height adjustable seat post assembly 680 is in a fully retracted position, or lowest height, the linkage 604 causes the seat to be configured in the second angular position P2. When the height adjustable seat post assembly 680 is in a fully extended position, or highest height, the linkage 604 causes the seat to be configured in the first angular position P1. The automatic seat angle adjustment system 602 enables the saddle 56 to be automatically positioned in preferred angular positions P1, P2 for the extended orientation and the retracted orientation, as well as any angular position therebetween depending on extension amount, as the seat angle is coupled to the seat post height through the automatic seat angle adjustment system 602.

Although embodiments have been described for illustrative purposes, those skilled in the art will appreciate that various modifications, additions, and substitutions are possible, without departing from the scope and spirit of the disclosure as disclosed in the accompanying claims. It is therefore intended that the foregoing description be regarded as illustrative rather than limiting, and that it be understood that all equivalents and/or combinations of embodiments and examples are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

Although certain adjustable seat post assembly parts, components, features, and methods of operation and use have been described herein in accordance with the teachings of the present disclosure, the scope of coverage of this patent is not limited thereto. On the contrary, this patent covers all embodiments of the teachings of the disclosure that fairly fall within the scope of permissible equivalents.

The claims are as follows:
1. A seat post assembly for a bicycle, the seat post assembly comprising:
a first tube having a first distal end;
a second tube having a second distal end, the first tube and second tube movable relative to one another to establish a distance between the first distal end and the second distal end along a tube axis;
a first pressure chamber having a loaded pressure proportional to a load applied along the tube axis;
a second pressure chamber having a second pressure not proportional to the load;
a flow path connecting the first pressure chamber and the second pressure chamber; and
a valve having an isolator disposed along the flow path and configured to move between a closed position closing the flow path and an open position opening the flow path between the first pressure chamber and the second pressure chamber,
wherein an actuation axis of the isolator is non-parallel to the tube axis.

2. A seat post assembly of claim 1, wherein the second pressure is a preset pressure and wherein an isolation force produced by the preset pressure in the second pressure chamber acts on a distal end of the isolator.

3. A seat post assembly of claim 2, wherein the isolator, in the closed position, is biased against a valve seat by the isolation force produced by the preset pressure in the second pressure chamber acting on the isolator.

4. A seat post assembly of claim 1, wherein the isolator, in the closed position, is biased against a valve seat by an isolation force produced by a preset pressure in the second pressure chamber acting on a portion the isolator.

5. A seat post assembly of claim 1, wherein a loaded force that is produced by the loaded pressure in the first pressure chamber acts on an intermediate portion of the isolator.

6. A seat post assembly of claim 5, wherein the intermediate portion of the isolator includes opposing surface areas in a direction along an axis of the isolator.

7. A seat post assembly of claim 1, wherein a loaded force that is produced by the loaded pressure in the first pressure chamber and that acts on the isolator is balanced along an isolation axis.

8. A seat post assembly of claim 7, wherein the loaded force is balanced through opposing surface areas on the isolator along the isolation axis.

9. A seat post assembly of claim 1, wherein the actuation axis is perpendicular to the tube axis.

10. A seat post assembly of claim 1, wherein an actuation force required to actuate the valve under a larger load that is applied to the second distal end of the second tube is less than the actuation force required to actuate the valve under a smaller load that is applied to the second distal end of the second tube.

11. A seat post assembly of claim 1, wherein, in the closed position, the isolator is biased closed by a fluid closing force acting on the isolator and produced by the second pressure, the fluid closing force being greater than a fluid opening force acting on the isolator and produced by the loaded pressure, whereby the distance between the first and second distal ends is maintained, and
wherein, in the open position, the isolator is opened against the fluid closing force by a combination of the fluid opening force and an actuation force that acts on the isolator whereby fluid can be exchanged between the first and second pressure chambers via the flow path and whereby the distance between the first and second distal ends can be adjusted.

12. A seat post assembly of claim 1, wherein the first tube has an inner diameter and the second tube has an outer diameter that is smaller than the inner diameter so that the second tube is telescopically slidable along the tube axis to extend and retract the second tube relative to the first tube to adjust the distance between the second distal end and the first distal end.

13. A seat post assembly of claim 1, further comprising:
a first fluid reservoir including the first pressure chamber, the second chamber, and the flow path.

14. A seat post assembly of claim 1, wherein the isolator is configured having opposing surfaces such that a fluid opening force acting on one surface of the opposing surfaces is balanced by a fluid closing force acting on another surface of the opposing surfaces that opposes the one surface, the fluid opening and closing forces acting along an axis of the isolator.

* * * * *